United States Patent [19]
Andó

[11] Patent Number: 5,349,592
[45] Date of Patent: Sep. 20, 1994

[54] SUPER-RESOLUTION OPTICAL ELEMENT FOR USE IN IMAGE FORMING APPARATUS

[75] Inventor: Hideo Andó, Tokyo, Japan

[73] Assignee: Kabushiki Kaisha Toshiba, Kawasaki, Japan

[21] Appl. No.: 22,559

[22] Filed: Feb. 25, 1993

[30] Foreign Application Priority Data

Feb. 27, 1992 [JP] Japan .................................. 4-040884
Jul. 30, 1992 [JP] Japan .................................. 4-204022

[51] Int. Cl.⁵ .............................................. H01S 3/13
[52] U.S. Cl. ...................... 372/32; 372/103; 369/112
[58] Field of Search ................. 372/32, 103; 369/112

[56] References Cited

U.S. PATENT DOCUMENTS 4,940,308 7/1990 Debesis ............................. 372/103
5,121,378 6/1992 Hirose et al. ..................... 369/112

FOREIGN PATENT DOCUMENTS 1315041 12/1989 Japan .
2306440 12/1990 Japan .

OTHER PUBLICATIONS

H. Ando, "Phase-Shifting Apodizer of Three or More aPortions", Jpn. J. Appl. Phys., vol. 31, (1992) pp. 557–567, Part 1, No. 28, Feb. 1992.

Primary Examiner—Georgia Y. Epps
Attorney, Agent, or Firm—Cushman, Darby & Cushman

[57] ABSTRACT

An apodizer according to the present invention subjects a light beam to wavefront splitting, to thereby split it into a plurality of beam components such that each adjacent pair of them have phases differing from each other. The light beam components through the apodizer have phases inverted to one another, and are converged in a desired position of an image-forming surface. The beam spot of the converged light beam is smaller than a size limited by the refractive index of an objective lens. The intensities of sidelobes occurring around the beam spot are sufficiently reduced. When the apodizer is incorporated in an optical head device, the intensity of the center beam spot of a reflected laser beam is emphasized, which enables data reading from a disk medium of a high recording density.

31 Claims, 40 Drawing Sheets

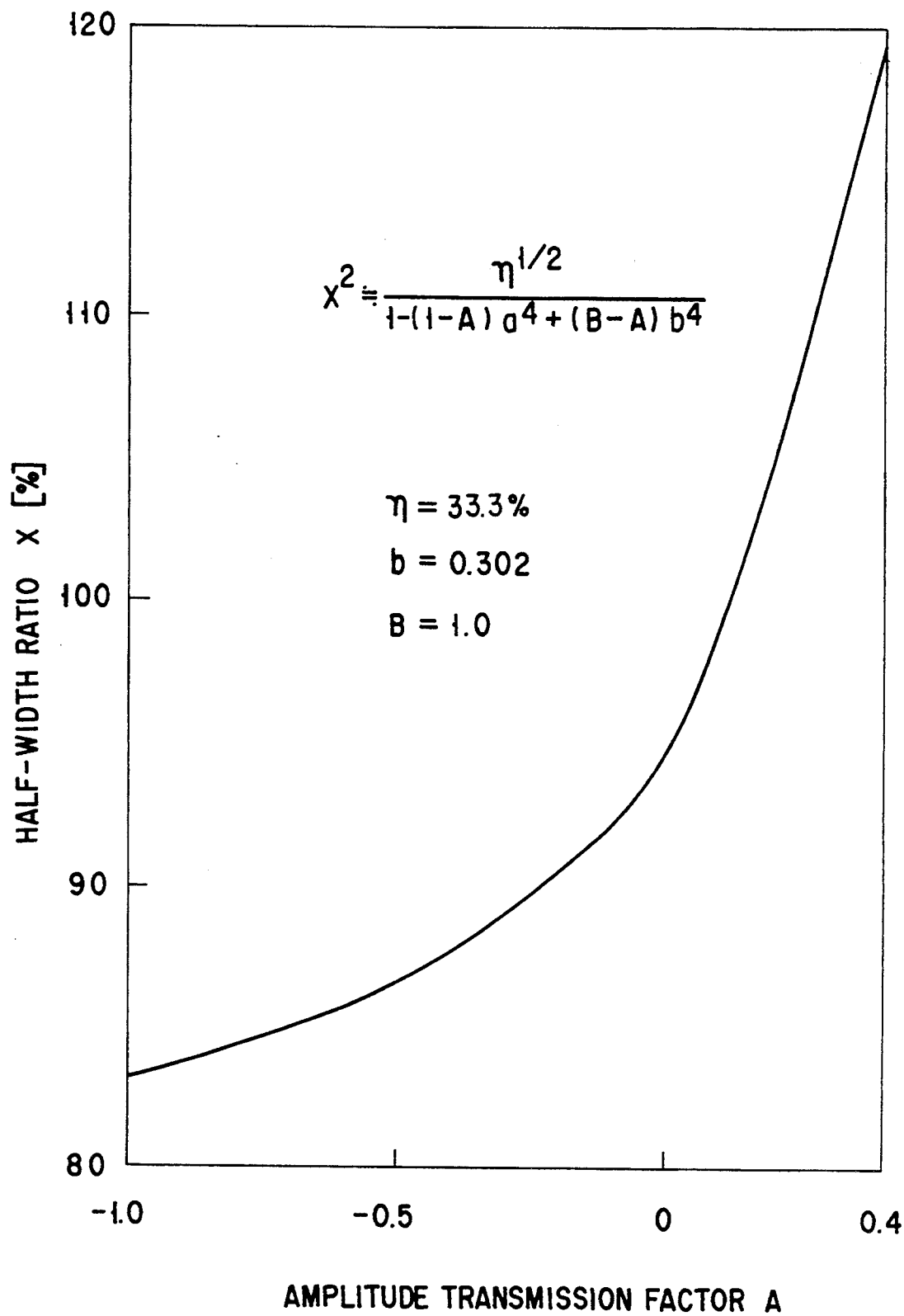
F I G. 4

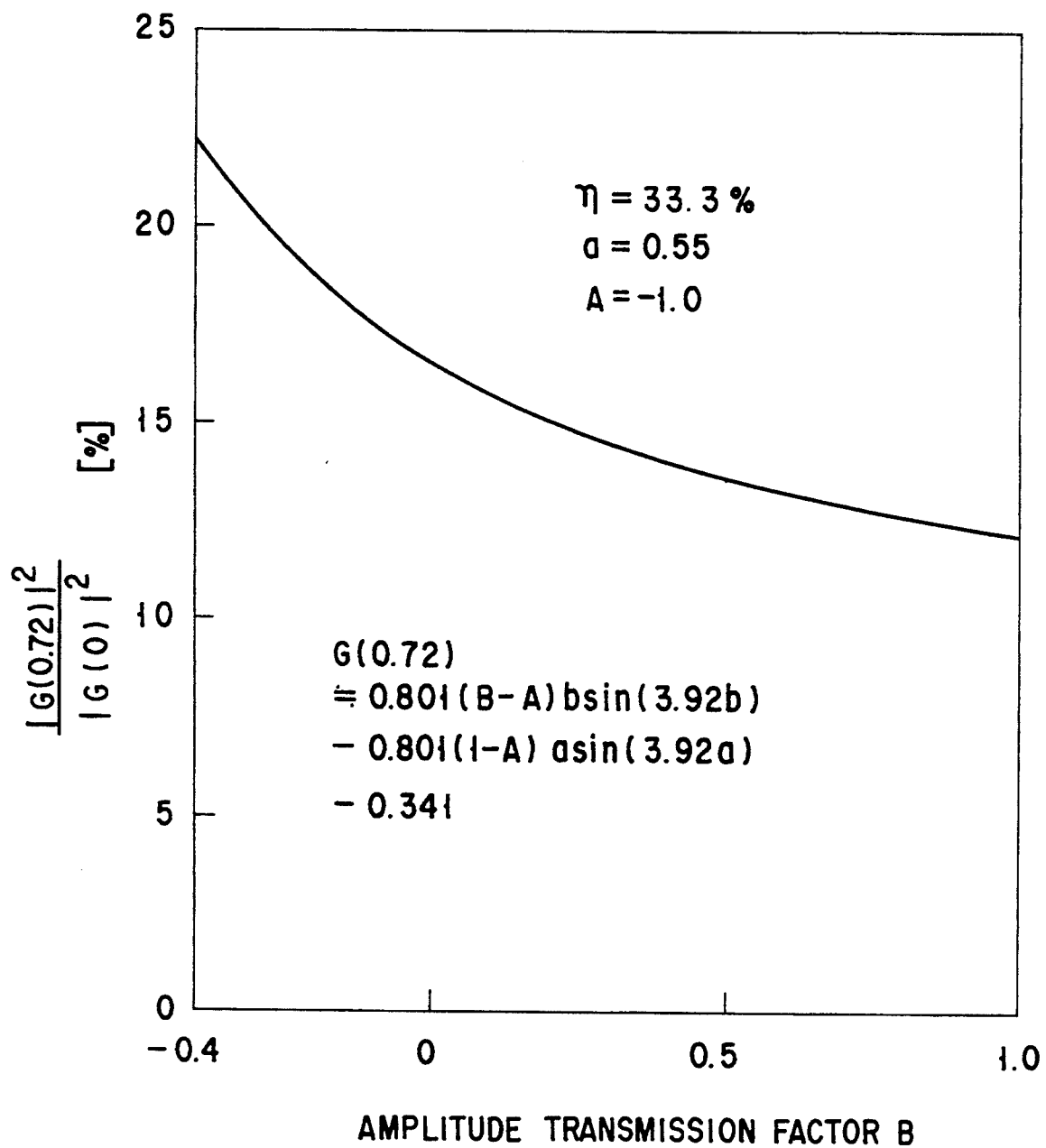
F I G. 5

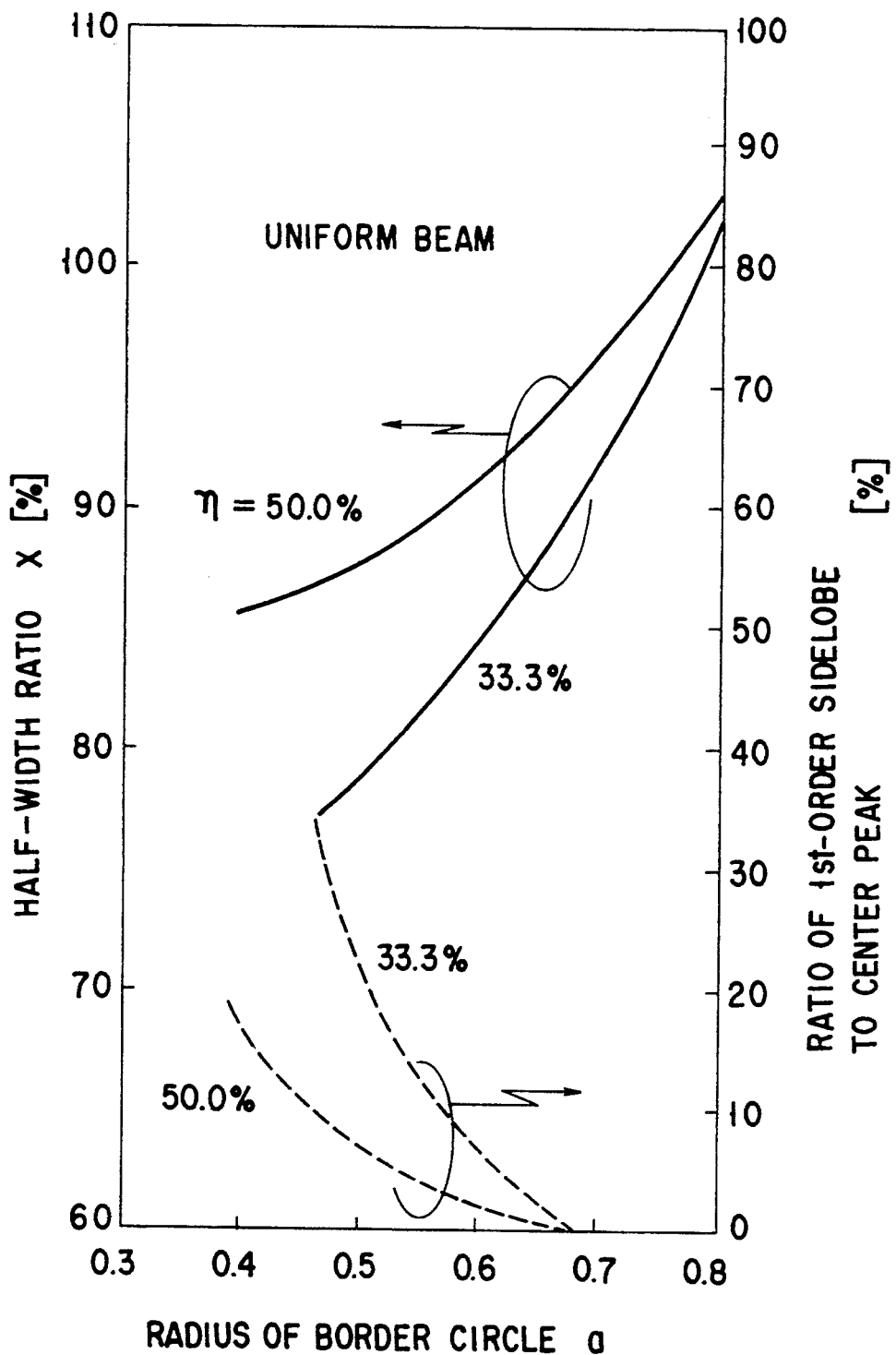
F I G. 6

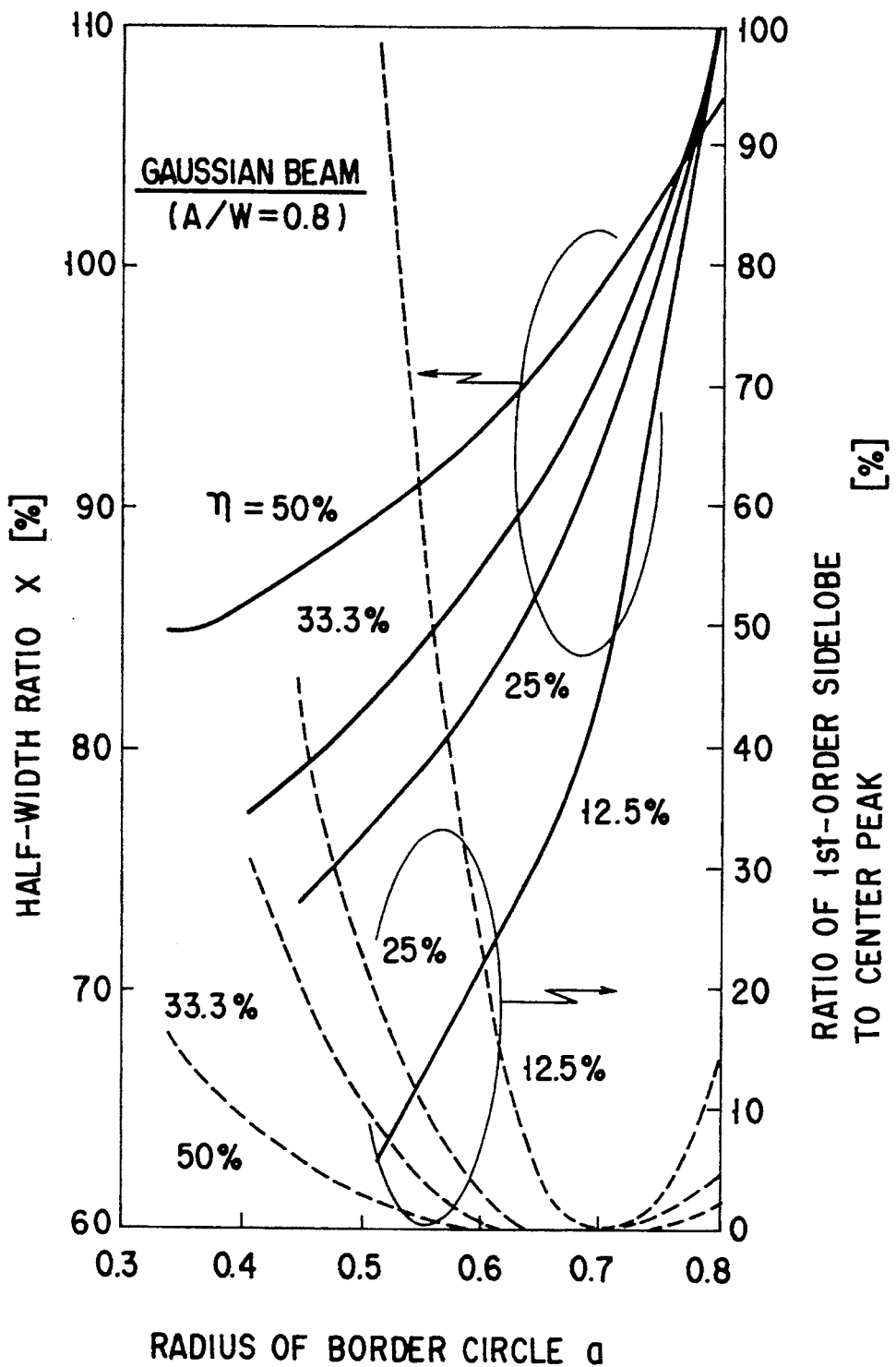
F I G. 7

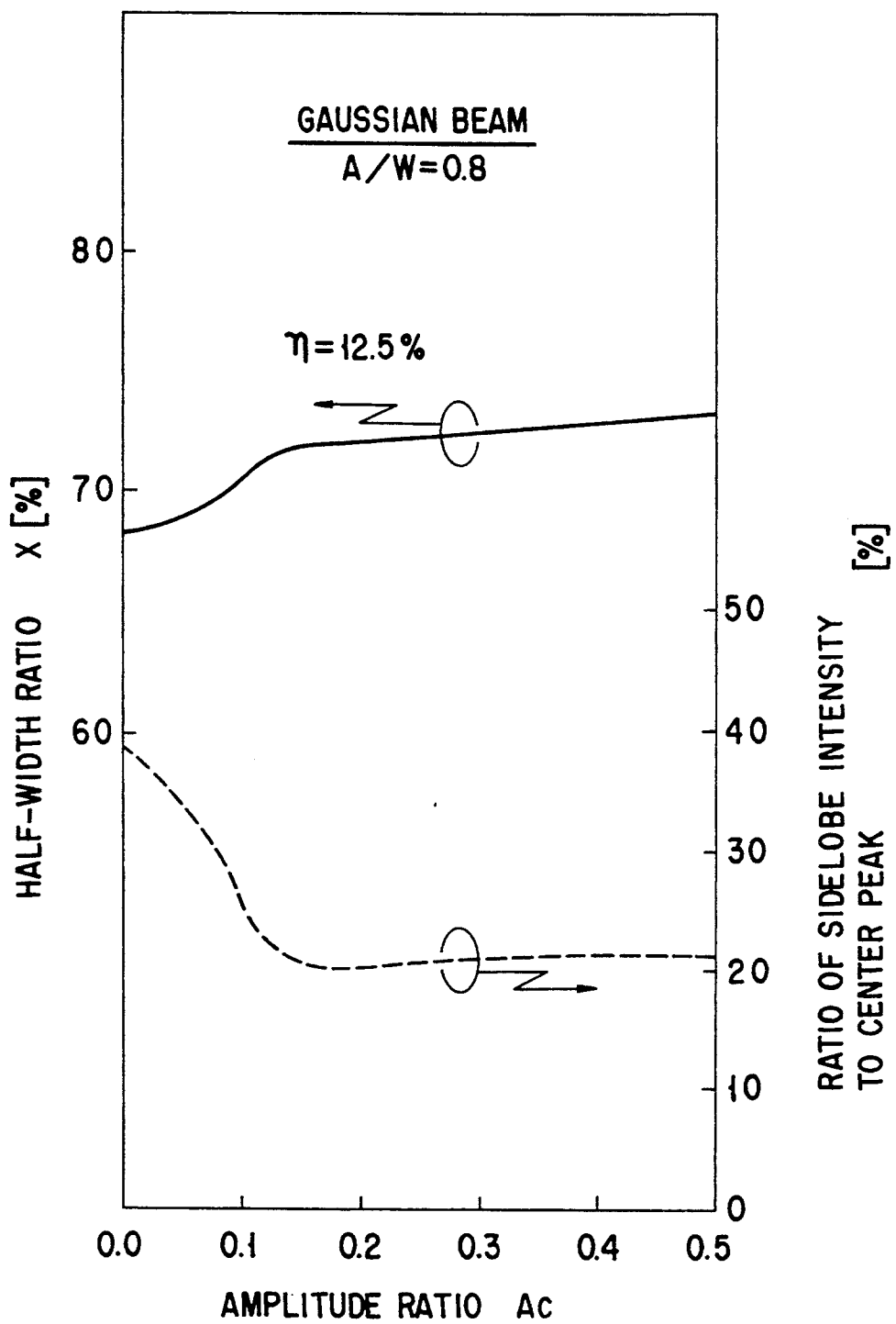
F I G. 9

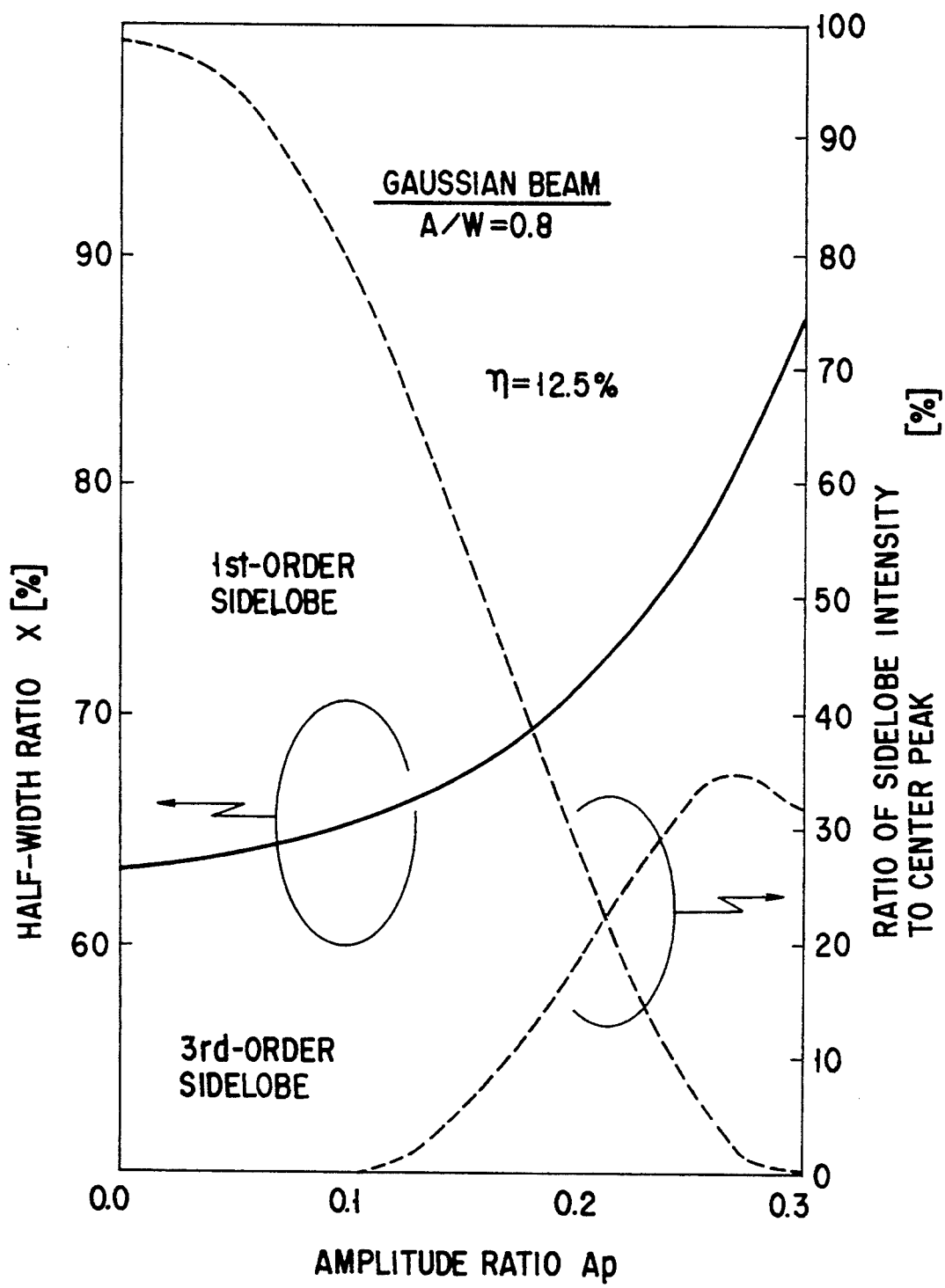
F I G. 12

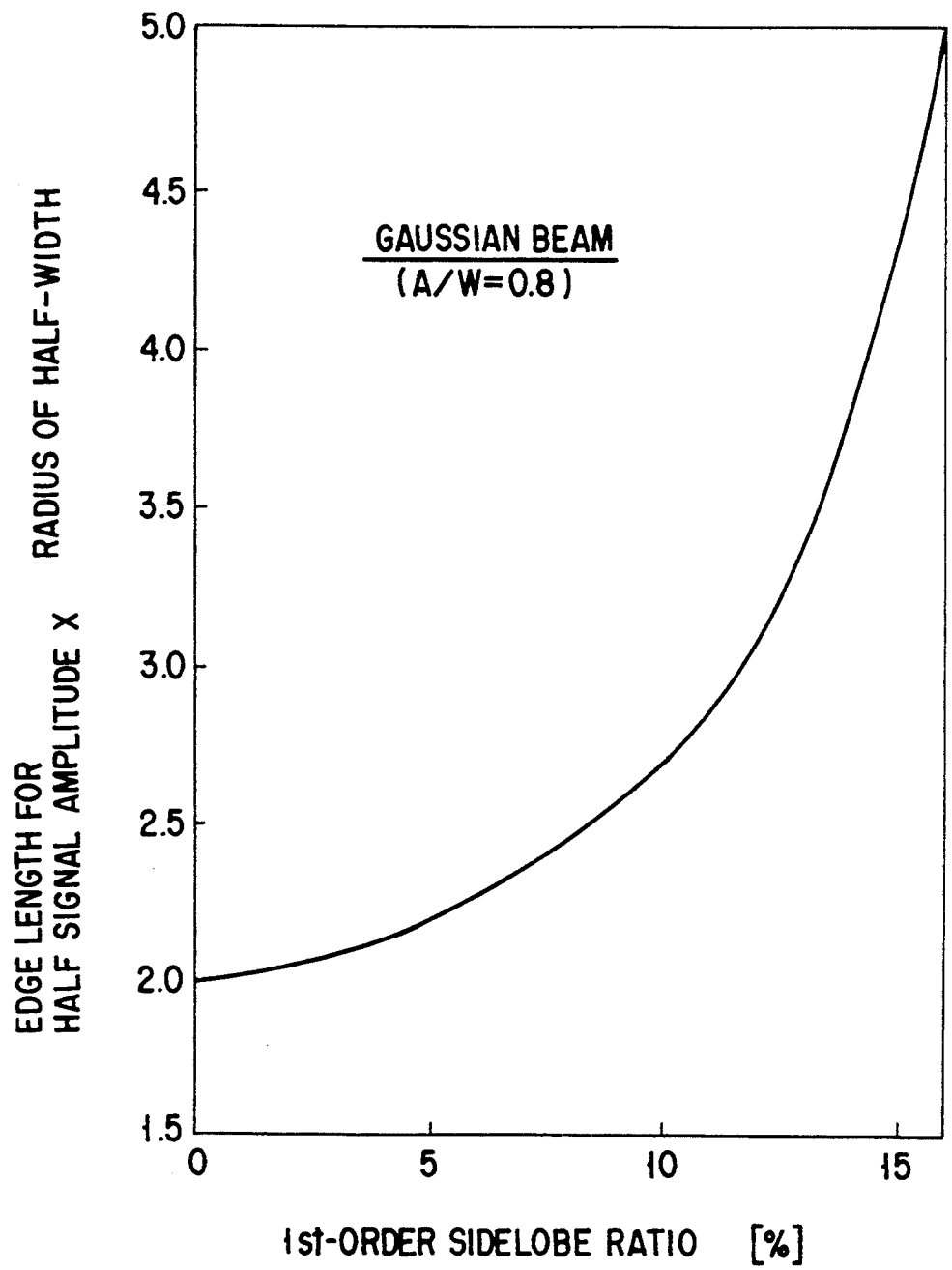
F I G. 14

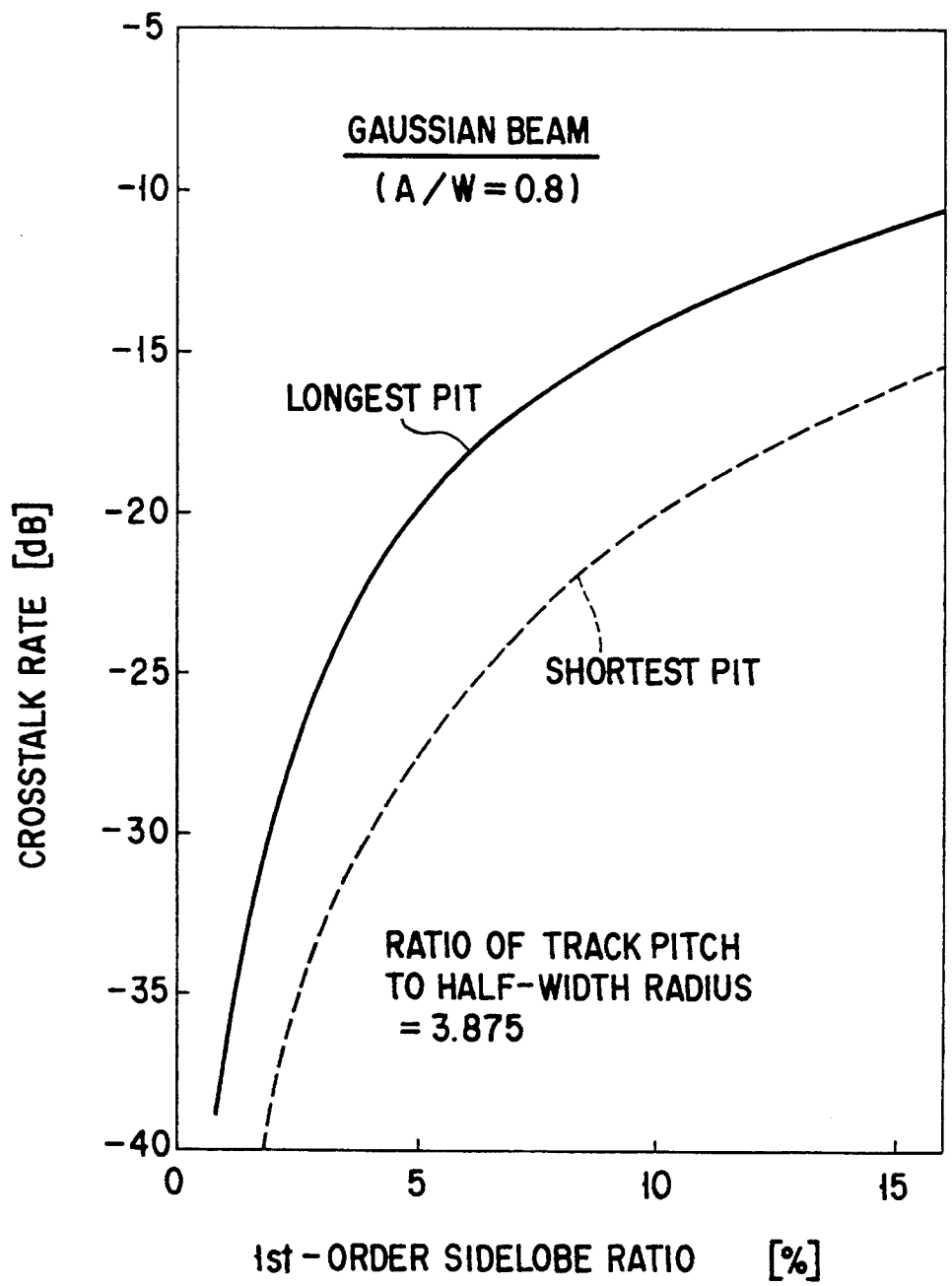
F I G. 16

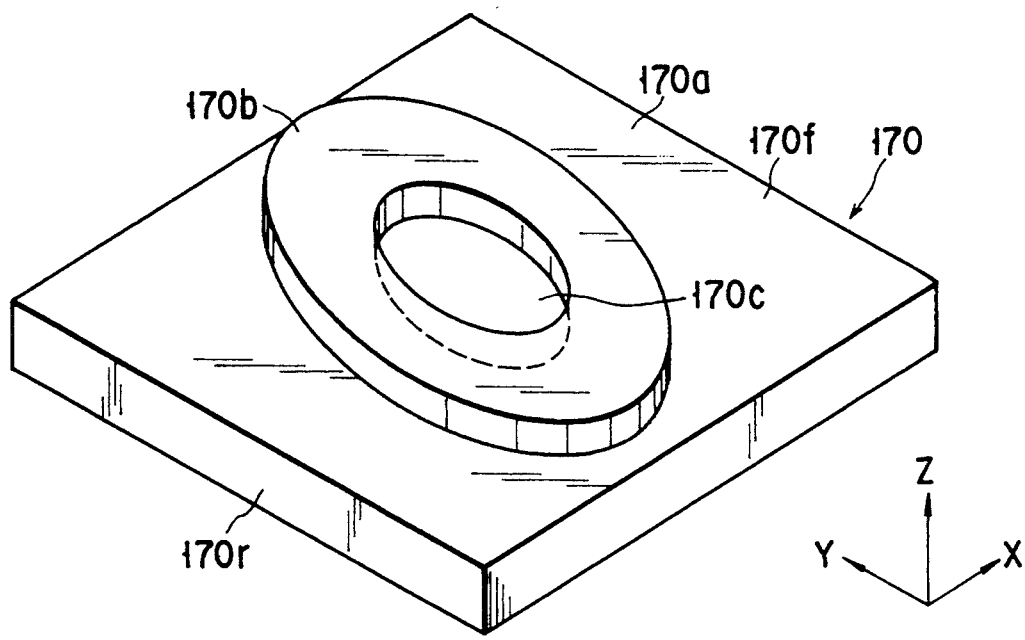
F I G. 17
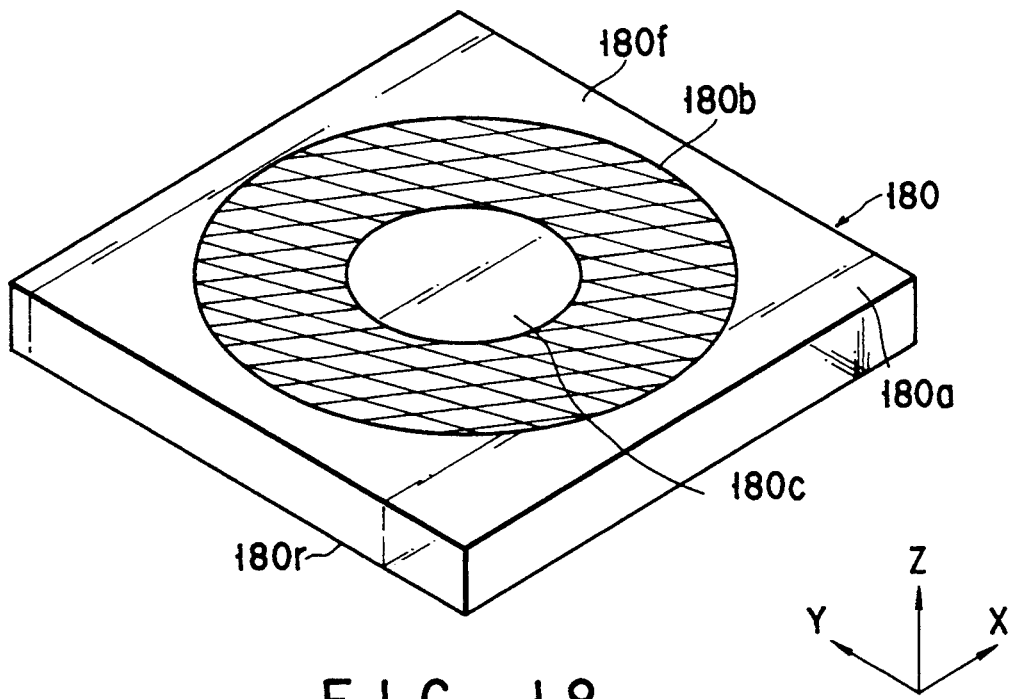
F I G. 18

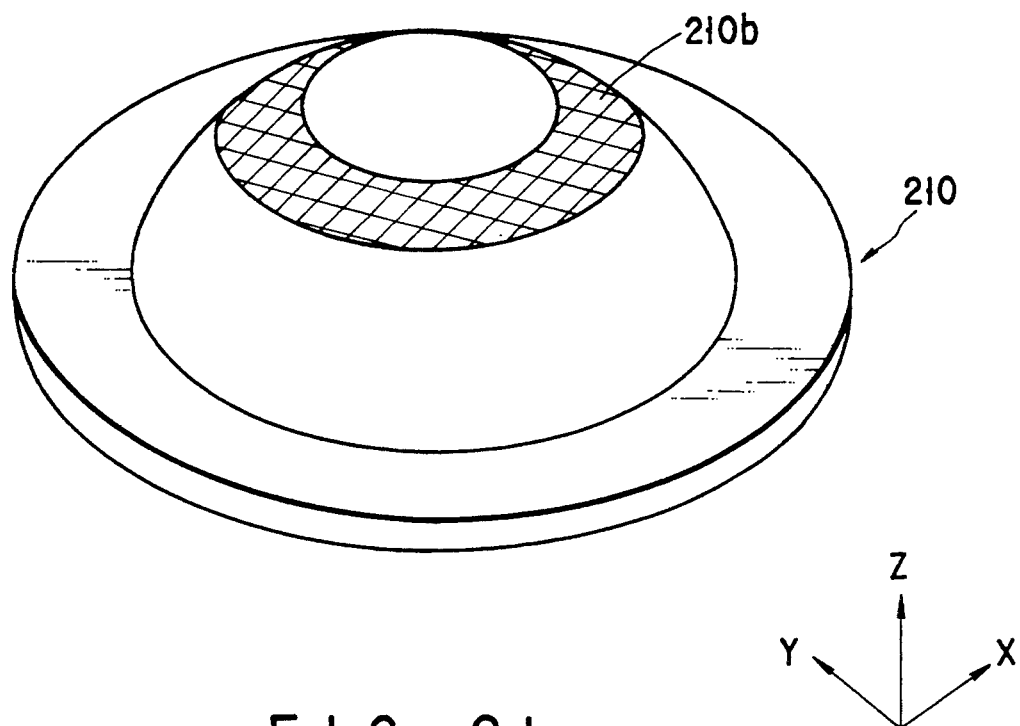
F I G. 21
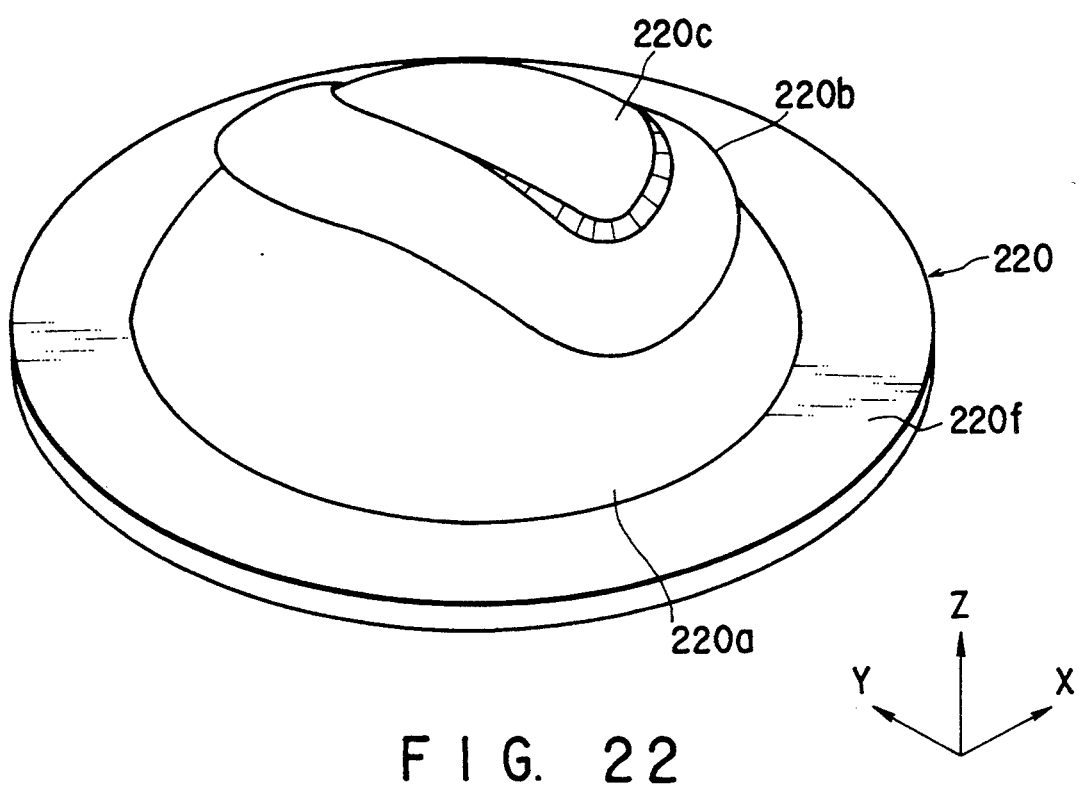
F I G. 22

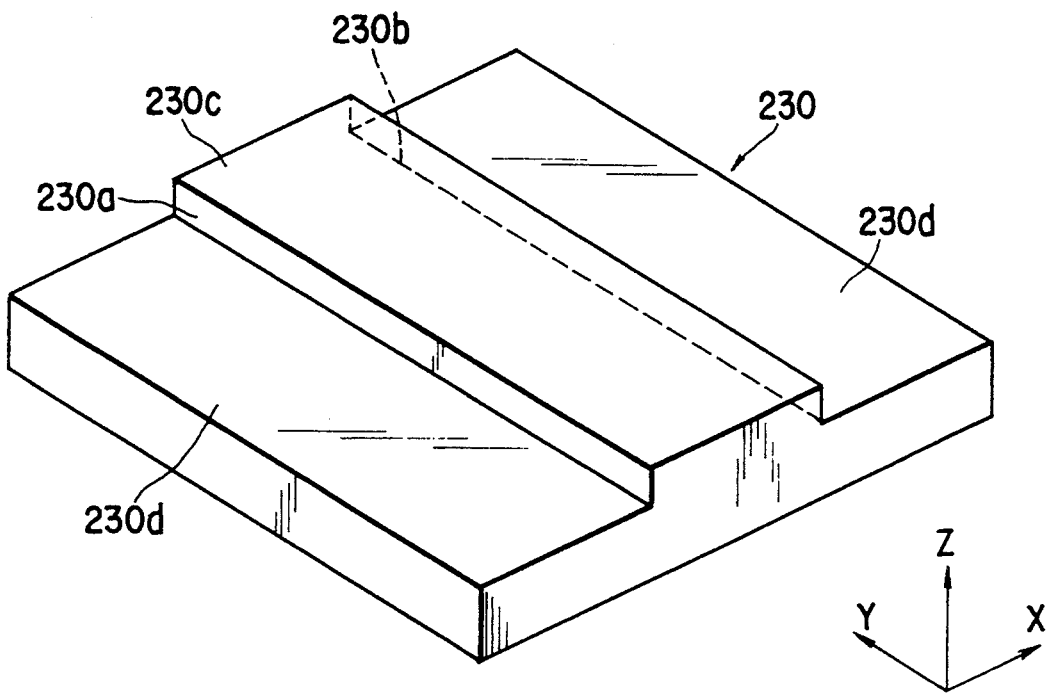
F I G. 23
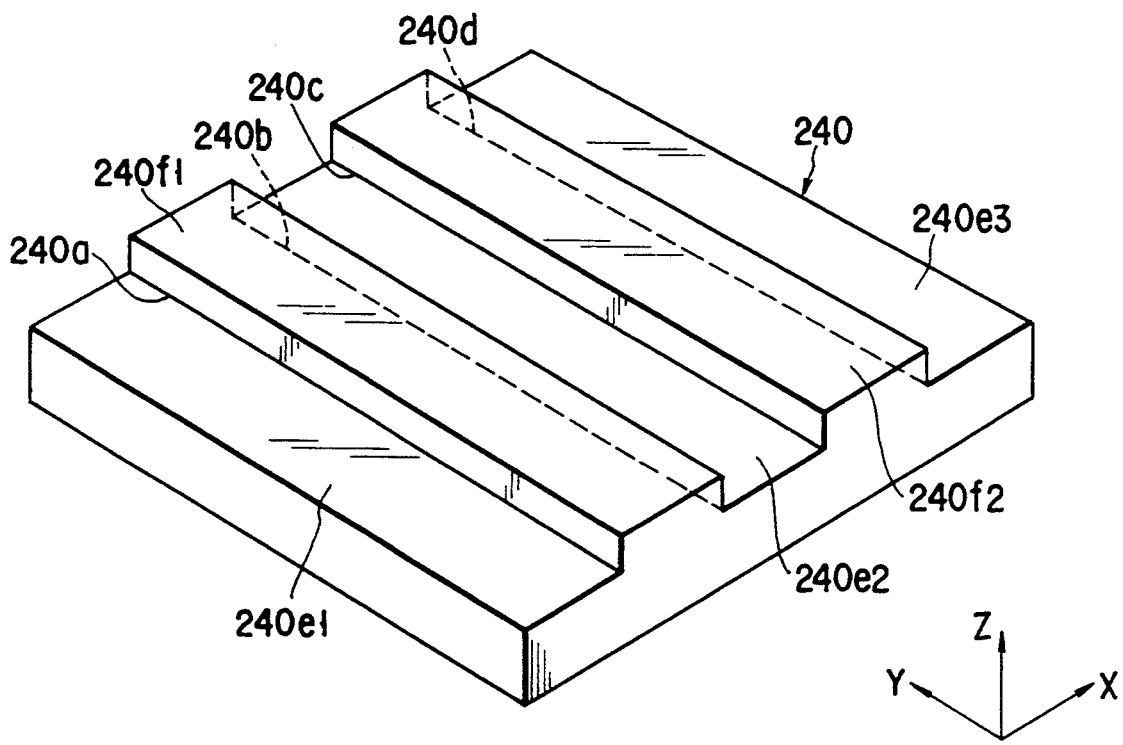
F I G. 24

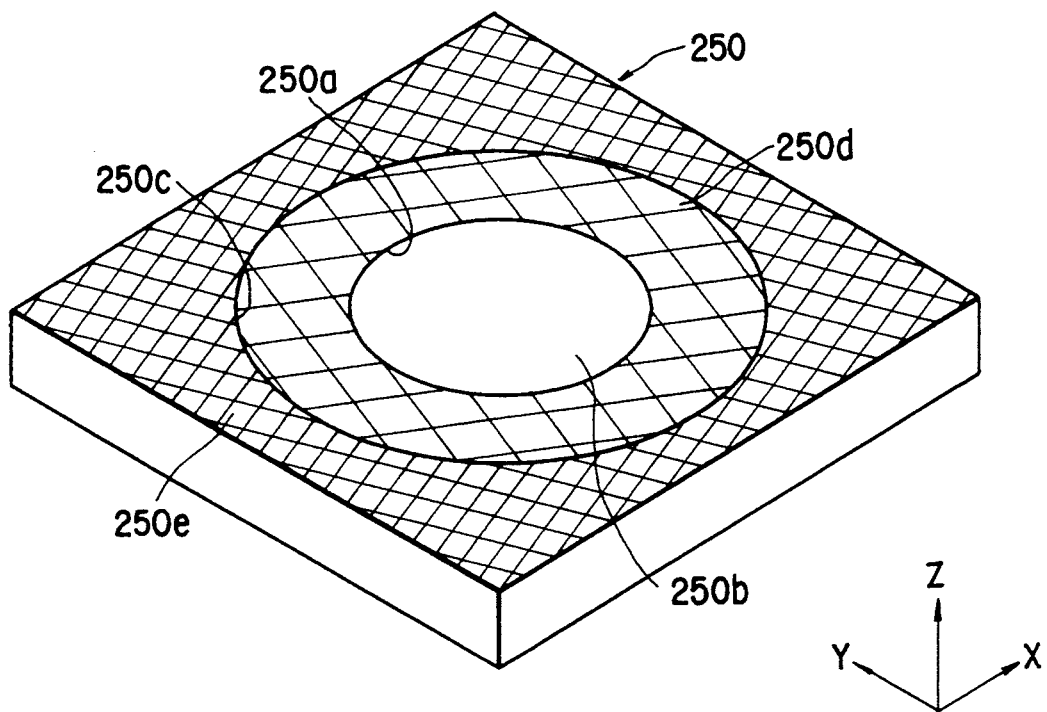
F I G. 25
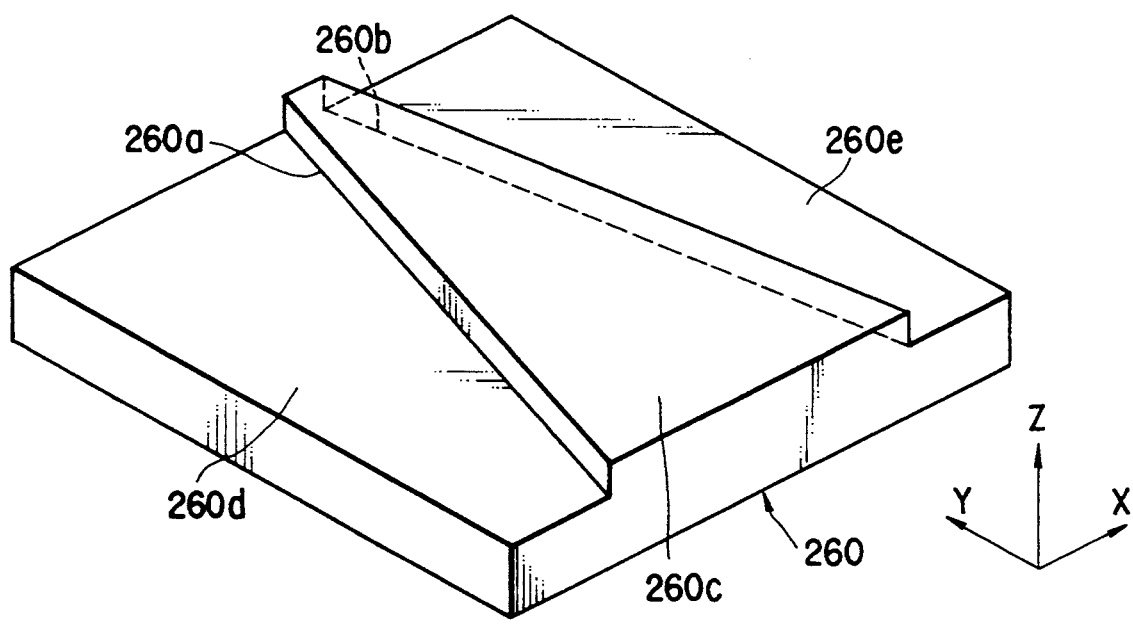
F I G. 26

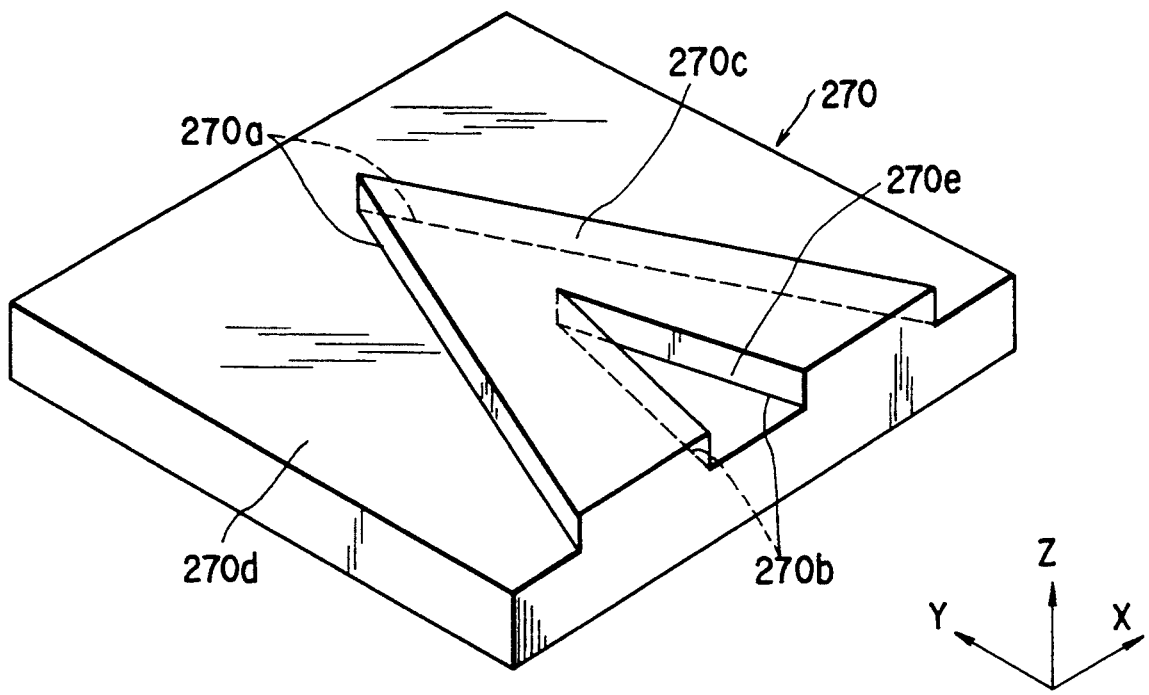
F I G. 27
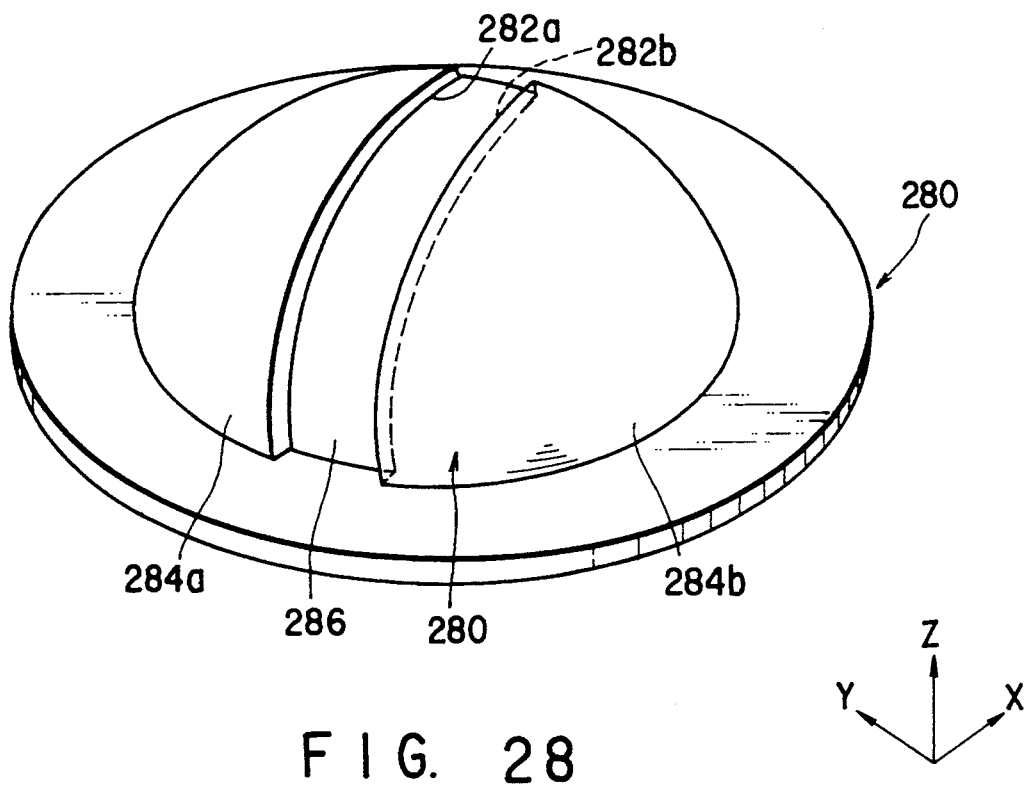
F I G. 28

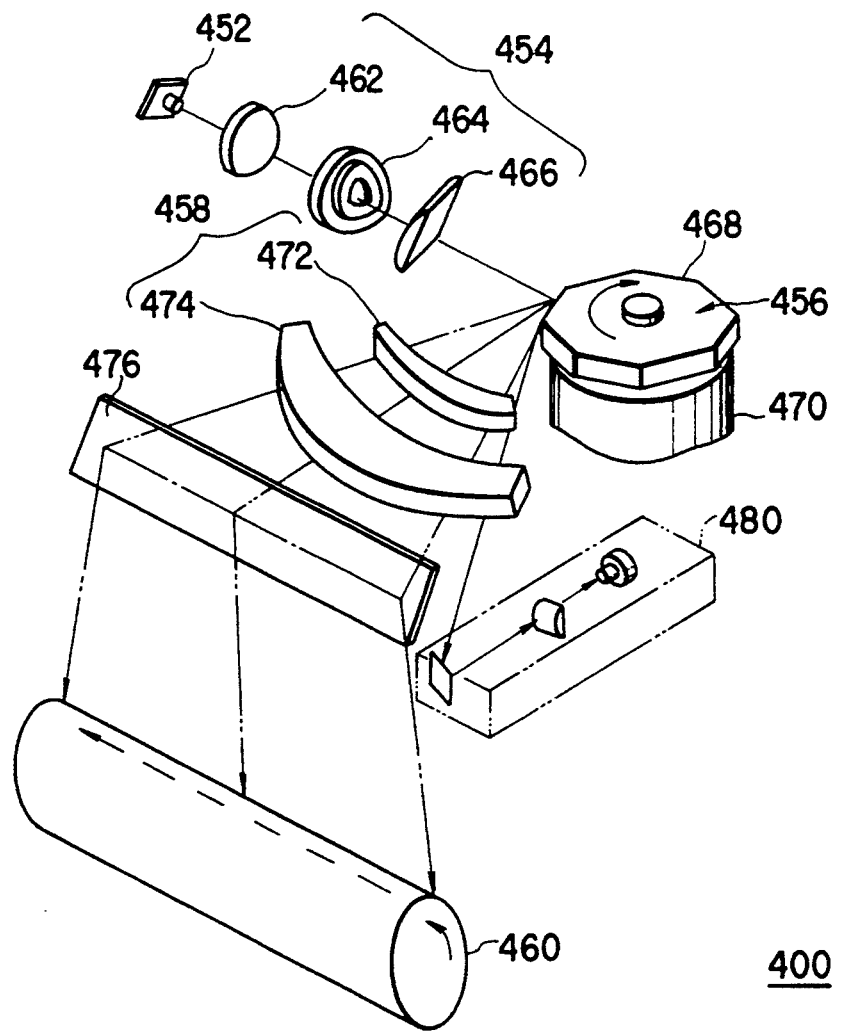
F I G. 31

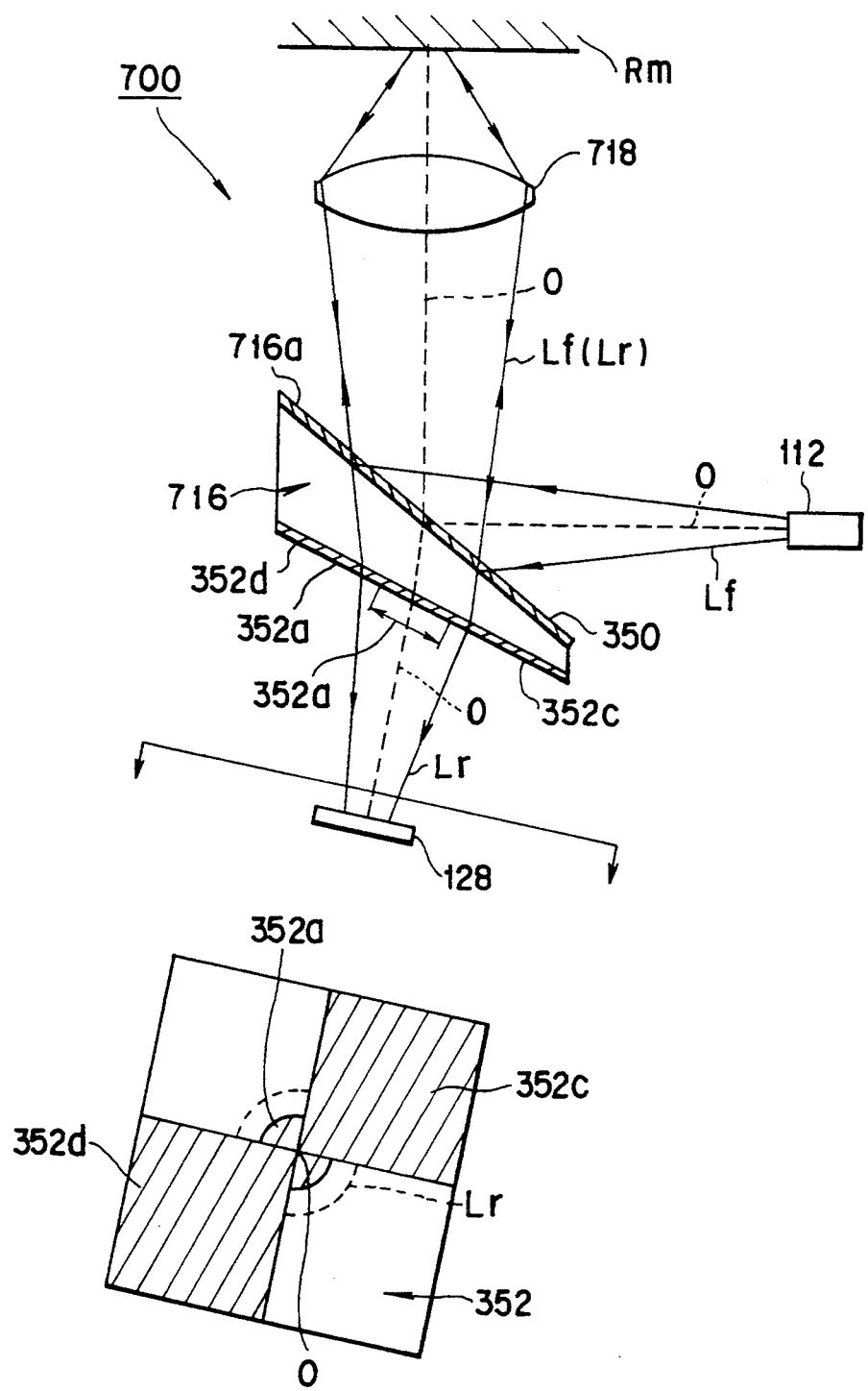
F I G. 35

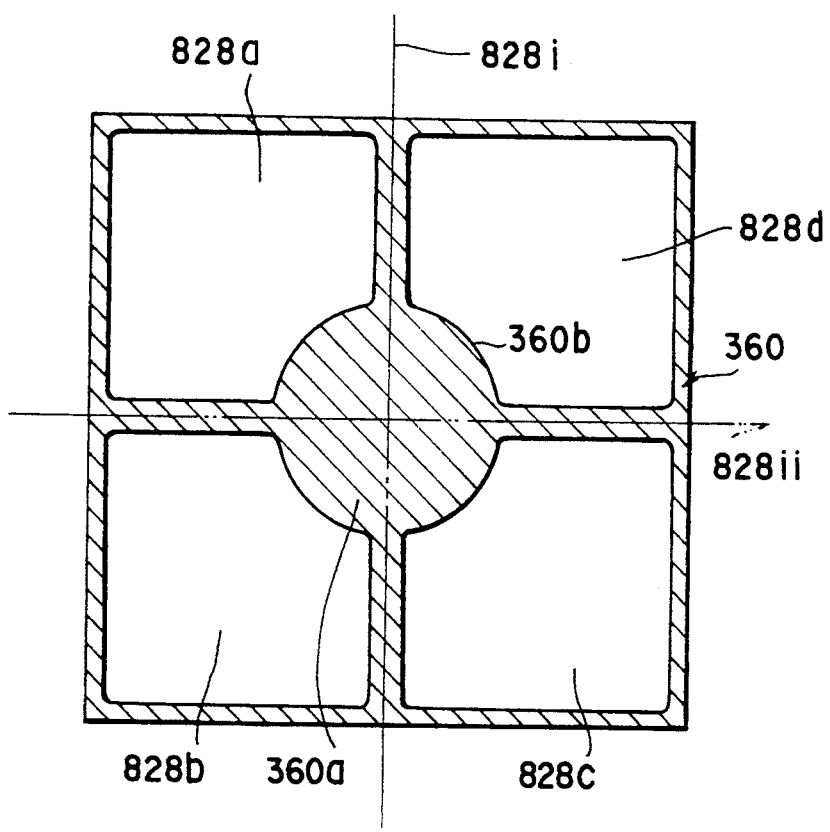
F I G. 36

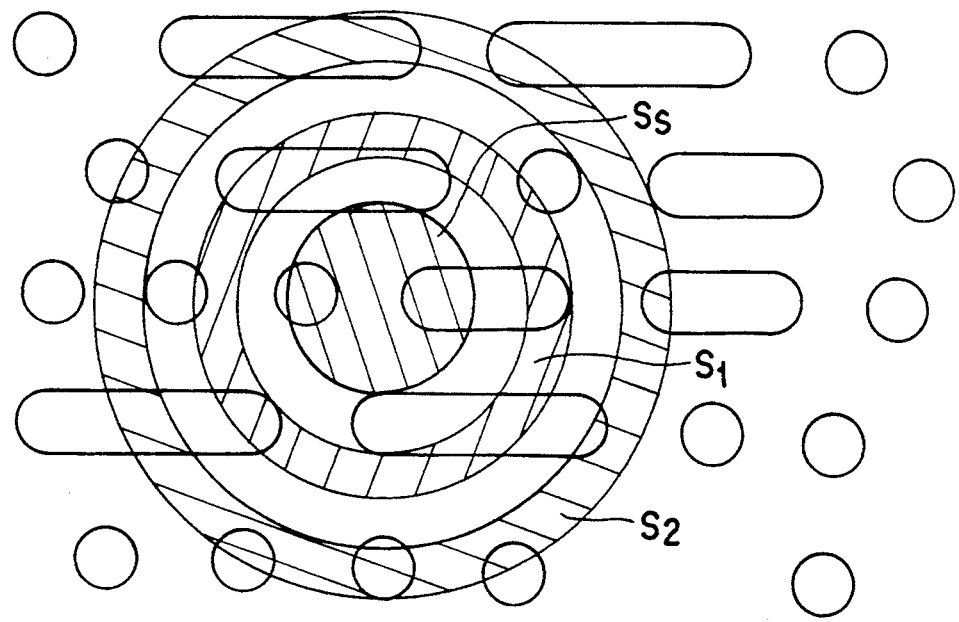
F I G. 38
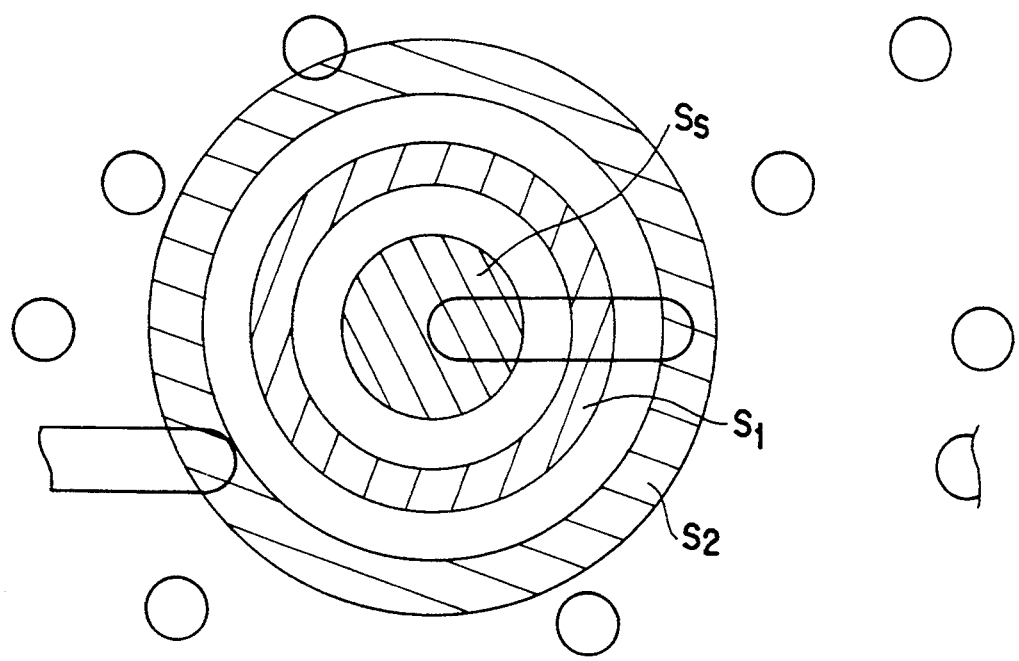
F I G. 39

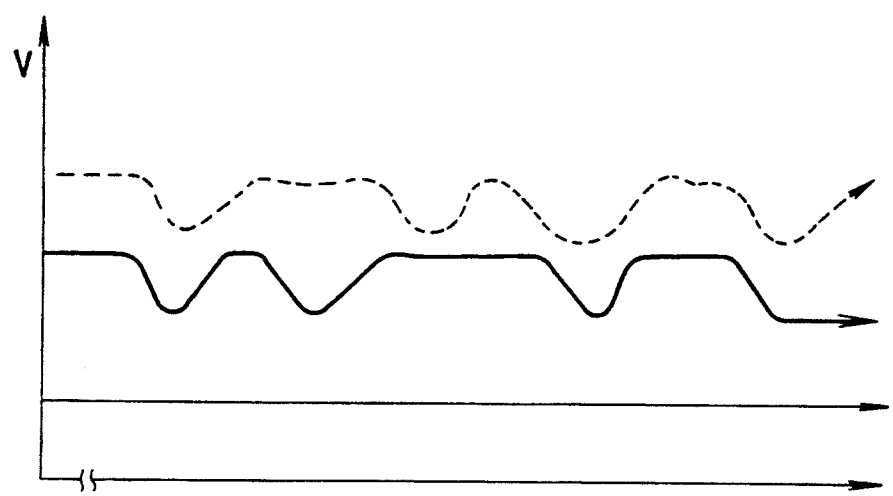
F I G. 40
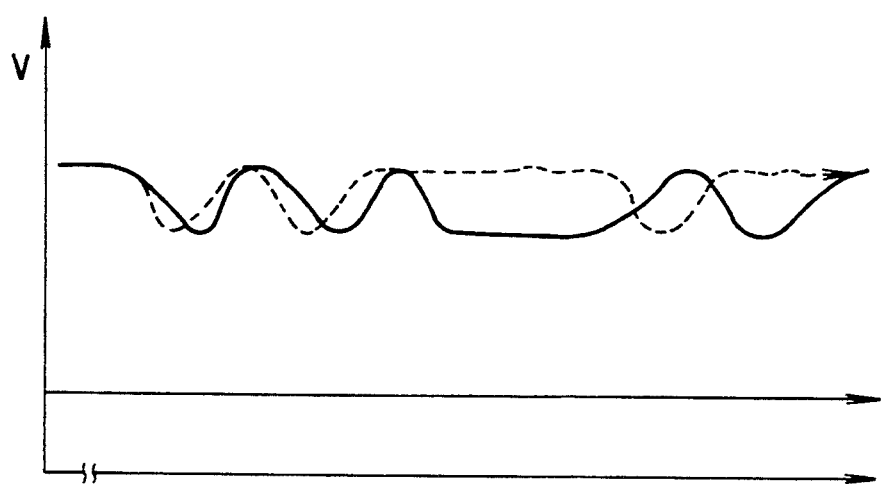
F I G. 41

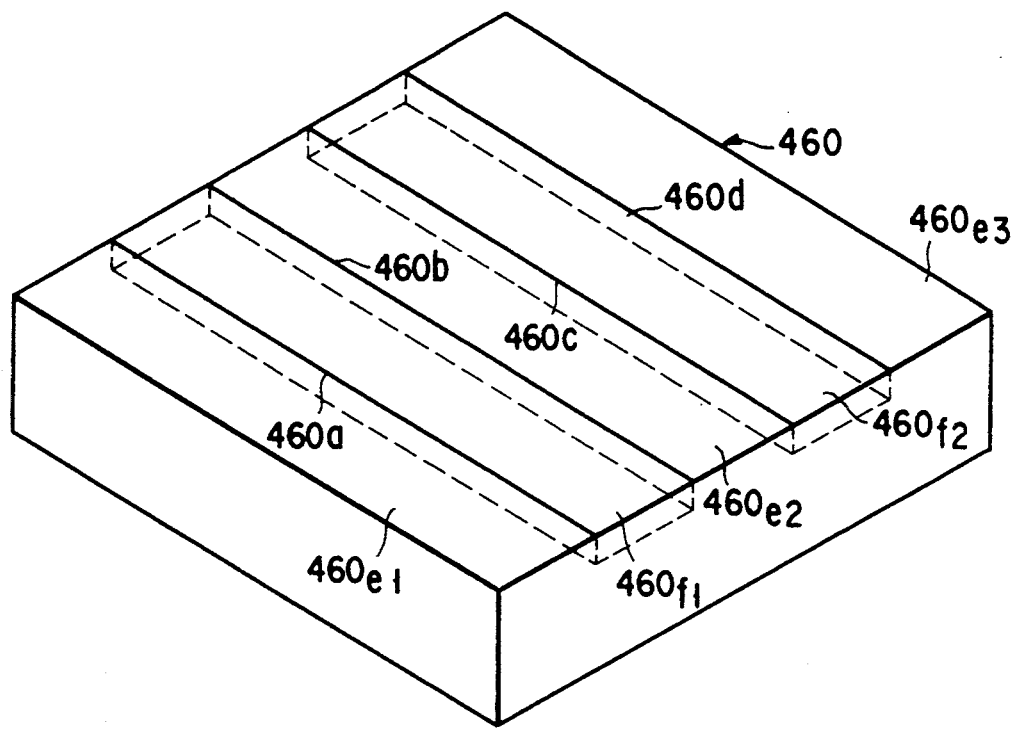
F I G. 46
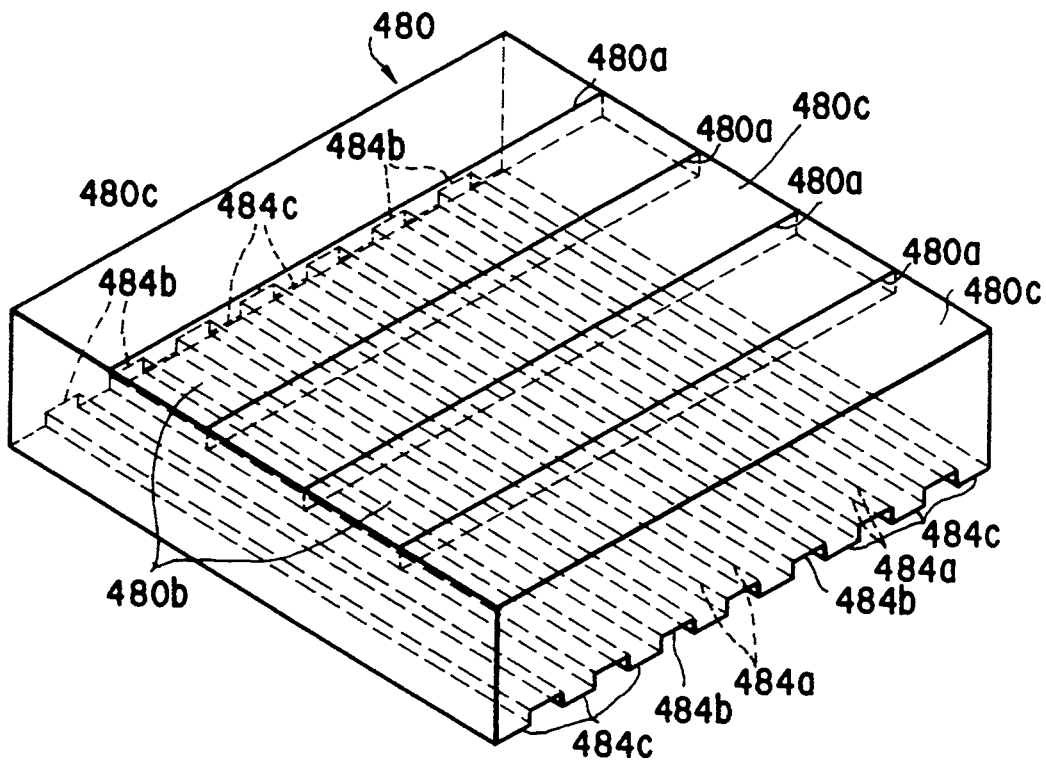
F I G. 48

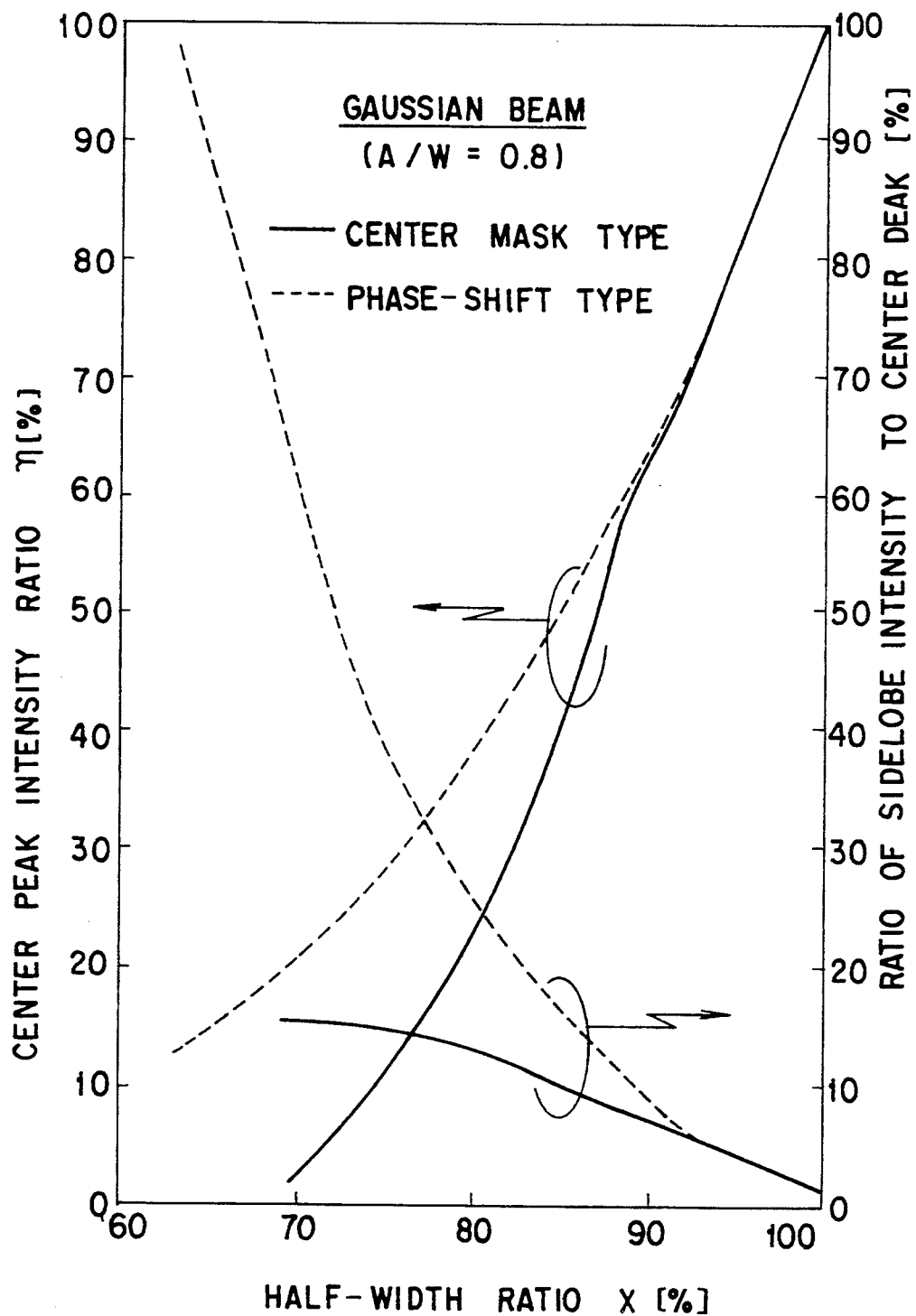
F I G. 51

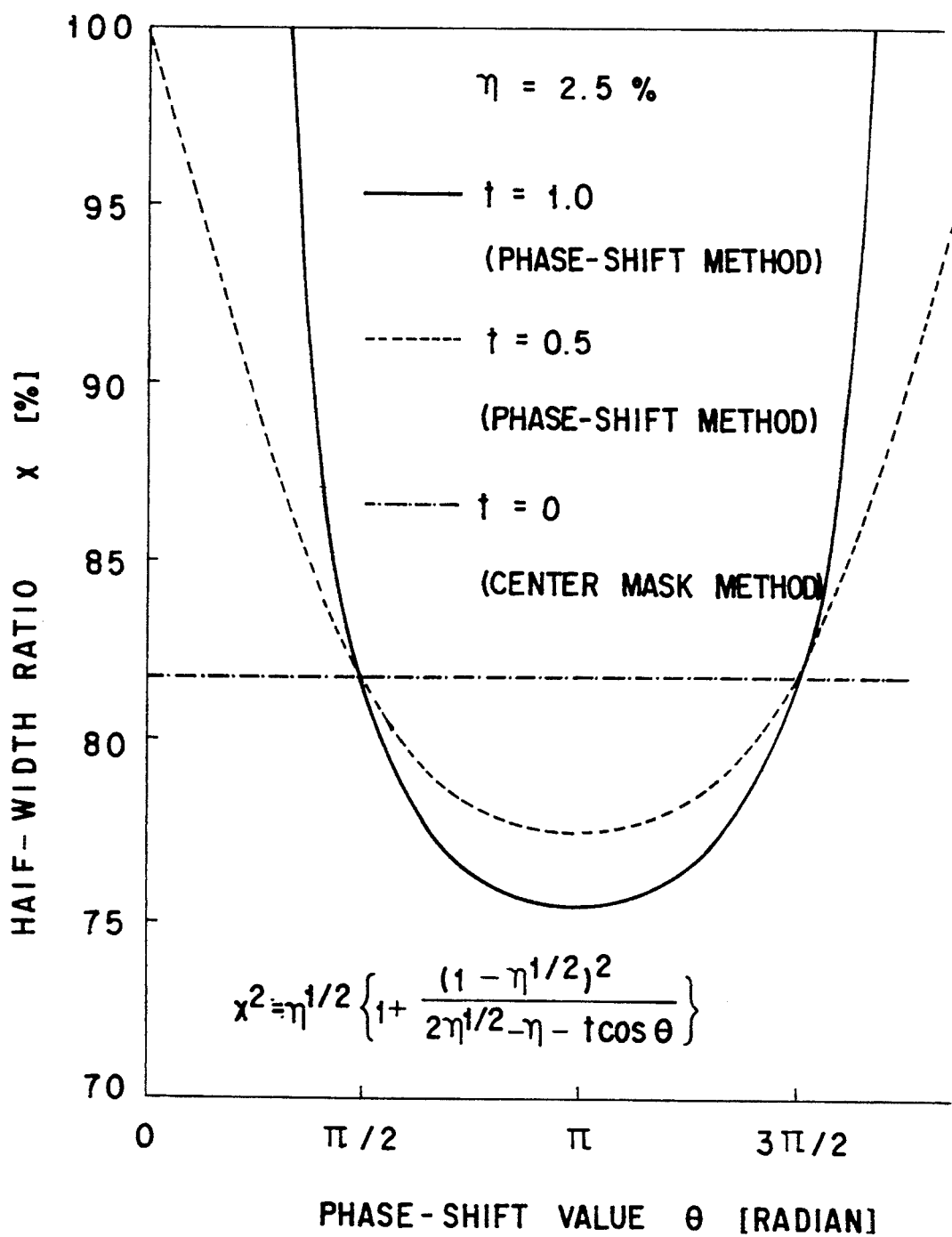
F I G. 52

SUPER-RESOLUTION OPTICAL ELEMENT FOR USE IN IMAGE FORMING APPARATUS

BACKGROUND OF THE INVENTION

1. Field of the Invention

This invention relates to a super-resolution optical element having a plurality of divided portions for use in an optical disk apparatus and an image forming apparatus, and more particularly, to a method reducing a beam spot size and for enhancing light-intensity of a beam spot with the super-resolution optical element.

2. Description of the Related Art

In an optical disk apparatus, information is recorded in an optical disk (recording medium) and information recorded in the disk is read therefrom, by focusing a light beam with a beam waist on the recording surface of the disk. Though it has been required these days to increase the recording density (i.e., the amount of information which can be stored in the optical disk), the recording density is limited by the beam spot size of the beam waist of a light beam. That is, so as to increase the recording density, it is necessary to minimize the beam spot size.

Further, in an image forming apparatus (printer apparatus), a light beam with a beam waist is radiated onto a photoconductor (recording medium), and a latent image corresponding to the light beam is formed on the photoconductor, resulting in a visual image. The gradation, resolving power and half tone density of the visual image are determined by the beam spot size of the beam waist of a light beam used to form a latent image. Hence, it is required to use a light beam of a small beam spot size in order to visualize the gradation, resolving power, and half tone density in more detail.

In an optical microscope, it is know that the higher the magnifying power, the lower the light intensity of the beam spot. This being so, in general, the intensity of light beams emitted from a light source (or voltage to be applied to a light source driver) must be high. However, to emit light beams of a high intensity, a large-size light source is needed, which will generate a great amount of heat.

The beam spot size of a light beam radiated onto an optical disk Rm is reduced up to a limit value determined by the refractive index of an objective lens employed. Specifically, the diameter "W" of the beam spot is limited by the aperture diameter "A" ($A = 2F \times NA$) of the lens, where "F" represents the focal distance of the lens, and "NA" the numerical aperture.

This being so, as is shown in FIG. 53, the minimum pitch at which pits (i.e., data items) can be aligned in an optical disk is generally larger than the diameter "W" of the beam spot (in practice, however, a light beam of $w = 1.25 \times W$ is radiated since its beam spot has a certain energy intensity distribution).

To overcome this, so-called super-resolution methods have been proposed which can provide a beam spot "W" of a diameter smaller than the above-described limit value determined by the refractive index of the objective lens.

For example, there are known a center mask method (M. Born and E. Wolf: Principles of Optics, Pergamon Press Ltd. Oxford, 1975) for masking a central portion of an aperture area (which exists in an optical element such as lens means and through which light beams can pass), and a phase-shift method (J. E. Wilkins, Jr.: J. Oct. Soc. Am., 40 (1950) 22) for concentrically dividing the beam spot of a light beam into two areas, and shifting by 180° the phases of light beams passing through the areas, respectively.

However, it is known that in the center mask method and phase-shift method, the smaller the beam spot size, the greatly lower the intensity (center peak intensity) of the center beam spot and the higher the intensity of the sidelobes. Here, note that in the super-resolution method, since the beam spot has a plurality of sidelobes, i.e., fringes, the center beam spot is actually a coalescence point located in the center of the sidelobes.

U.S. Pat. No. 5,121,378 (filed Jun. 9, 1992) discloses an optical head device employing a super-resolution element.

In the optical disk apparatus, when the intensity of the center beam spot is low, a recording error may occur at the time of recording information in the recording medium, and a reading error may occur at the time of reading information out of the medium. Further, under the same condition, characters may become blurred or solid lines may be broken in the image forming apparatus, and satisfactory observation may not be performed in the microscope since the illumination intensity of an object image (including a virtual image) will be reduced.

Thus, in many cases, the output of a light source must be increased so as to obtain a sufficient intensity of the center beam spot. To increase the output of a light source in the disk apparatus, the light source must be made large, thereby inevitably making heavy an optical head unit in which the light source is mounted. Where the optical head unit is heavy, an access speed may be low. Further, in the image forming apparatus, decay in the light to be radiated onto the recording medium may be increased, and the half tone density and gradation of an image may become imbalanced. Moreover, in the microscope, there may occur undesirable problems in restraining an increase in temperature or in reducing its size.

On the other hand, increasing the intensity of the sidelobes may cause cross talk in the disk apparatus at the time of reading information out of the recording medium. In the image forming apparatus, under the same condition, a ghost image may occur around a real image or the width of a line may be enlarged. Further, in the microscope, the contrast of an object (or virtual) image may be degraded under the same condition.

SUMMARY OF THE INVENTION

It is an object of the invention to provide a super-resolution element capable of reducing the beam spot size of a light beam without reducing the intensity of the center beam spot.

It is another object of the invention to provide a super-resolution element capable of reducing the sidelobe intensity in a reliable manner.

It is a further object of the invention to provide an optical head device capable of reading out data items aligned at a pitch narrower than the beam spot size of a light beam limited by the refractive index of an objective lens.

It is another object of the invention to provide a printer apparatus capable of outputting data with a high resolving power.

According to a first aspect of the invention, there is provided an optical system comprising: means for uniformly passing a light beam therethrough; and phase-changing means formed on part of the passing means and having a thickness differing from that of the passing means, for changing the phase of that part of the light beam which passes therethrough.

According to a second aspect of the invention, there is provided an optical system comprising: means for uniformly passing a light beam therethrough; and phase-changing means formed on part of the passing means and having a reflectance differing from that of the passing means, for changing the phase of that part of the light beam which passes therethrough.

According to a third aspect of the invention, there is provided an optical system comprising: means for uniformly passing a light beam therethrough; and phase-changing means formed on part of the passing means and having a refractive index differing from that of the passing means, for changing the phase of that part of the light beam which passes therethrough.

According to a fourth aspect of the invention, there is provided an optical head device for use in an optical disk apparatus comprising: means for radiating a light beam onto a recording medium; means for detecting a light beam reflected from the recording medium; means, interposed between the recording medium and the detecting means, for converting the light beam, the converting means locally changing the intensity of the light beam directed from the recording medium to the detecting means, to thereby emphasize a high-order component of the light intensity of a reproduction signal from the recording medium; and means, interposed between the radiation means and the recording medium, for changing characteristics of the wavefront of part of the light beam, so as to split the wavefront of the light beam, and to change the beam spot size of the light beam on the recording medium by deviating the phases of light beam components.

According to a fifth aspect of the invention, there is provided an image-forming apparatus comprising: means for generating a light beam; means for deflecting the light beam toward an image bearing member generated from the generating means; and means for changing characteristics of the wavefront of part of the light beam, so as to split the wavefront of the light beam, and to change the beam spot size of the light beam on the image bearing member by deviating the phases of light beam components.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a graph, showing characteristics of the three-portion apodizer element shown in FIG. 3A;

FIG. 5 is a graph, showing other characteristics of the three-portion apodizer element shown in FIG. 3A;

FIG. 6 is a graph, showing the characteristics of a beam waist spot created by a uniform beam having passed through a three-portion apodizer element shown in FIG. 3A;

FIG. 7 is a graph, showing the characteristics of a beam waist spot created by a Gaussian beam having passed through the three-portion apodizer element shown in FIG. 3A;

FIG. 9 is a graph, showing the relation between the half width ratio, the sidelobe intensity, and the relative amplitude (Ac) of a light beam having passed through the central portion of a four-portion apodizer element;

FIG. 12 shows those characteristics of the super-resolution element of FIG. 11A, which are obtained when the element is irradiated with a light beam having a Gaussian intensity distribution while the ratio of the annular light-transmitting portion formed in the element to the central light-transmitting portion thereof is varied;

FIG. 14 is a graph, showing influence on a reproduction signal obtained when the apodizer shown in FIG. 11A is used in the optical disk shown in FIG. 2;

FIG. 16 shows influence (i.e., changes in stroke in the transverse direction of a track) on a reproduction signal obtained when the apodizer shown in FIG. 11A is used in the optical disk shown in FIG. 2;

FIG. 17 is a schematic view, showing a first modification of the super-resolution element of FIG. 1;

FIG. 18 is a schematic view, showing a second modification of the super-resolution element of FIG. 1;

FIG. 21 is a schematic view, showing a first modification of the super-resolution element of FIG. 19;

FIG. 22 is a schematic view, showing a second modification of the super-resolution element of FIG. 19;

FIG. 23 is a schematic view, showing a third modification of the super-resolution element of FIG. 19;

FIG. 24 is a schematic view, showing a first variation of the super-resolution element of FIG. 23;

FIG. 25 is a schematic view, showing a second variation of the super-resolution element of FIG. 23;

FIG. 26 is a schematic view, showing a third variation of the super-resolution element of FIG. 23;

FIG. 27 is a schematic view, showing a fourth variation of the super-resolution element of FIG. 23;

FIG. 28 is a schematic view, showing a fourth modification of the super-resolution element of FIG. 19;

FIG. 31 shows an example of a printer apparatus provided with any one of the above super-resolution elements;

FIG. 35 shows a second modification of the optical head device of FIG. 33;

FIG. 36 is a schematic plan view, showing a photodetector suitable for the optical head devices shown in FIGS. 34 and 35;

FIGS. 38 and 39 are schematic plan views, showing first and second data-storing states of an optical disk from which data is read via the optical head device of FIG. 37, respectively;

FIGS. 40 and 41 are graphs, showing the relation between output signals from the optical head device of FIG. 37 and the first and second data-storing states shown in FIGS. 38 and 39;

FIG. 46 shows a first variation of the light intensity-changing element shown in FIG. 32;

FIG. 48 shows an another embodiment of the light intensity-changing element shown in FIG. 46;

FIG. 51 is a graph, showing the characteristics of a beam waist spot created by a Gaussian beam having passed through the conventional super-resolution element;

FIG. 52 is a graph, showing the relation between the phase-shift value and the half width ratio in the conventional two-portion phase-shifting super-resolution element.

DETAILED DESCRIPTION OF THE PREFERRED EMBODIMENTS

Figure 1:
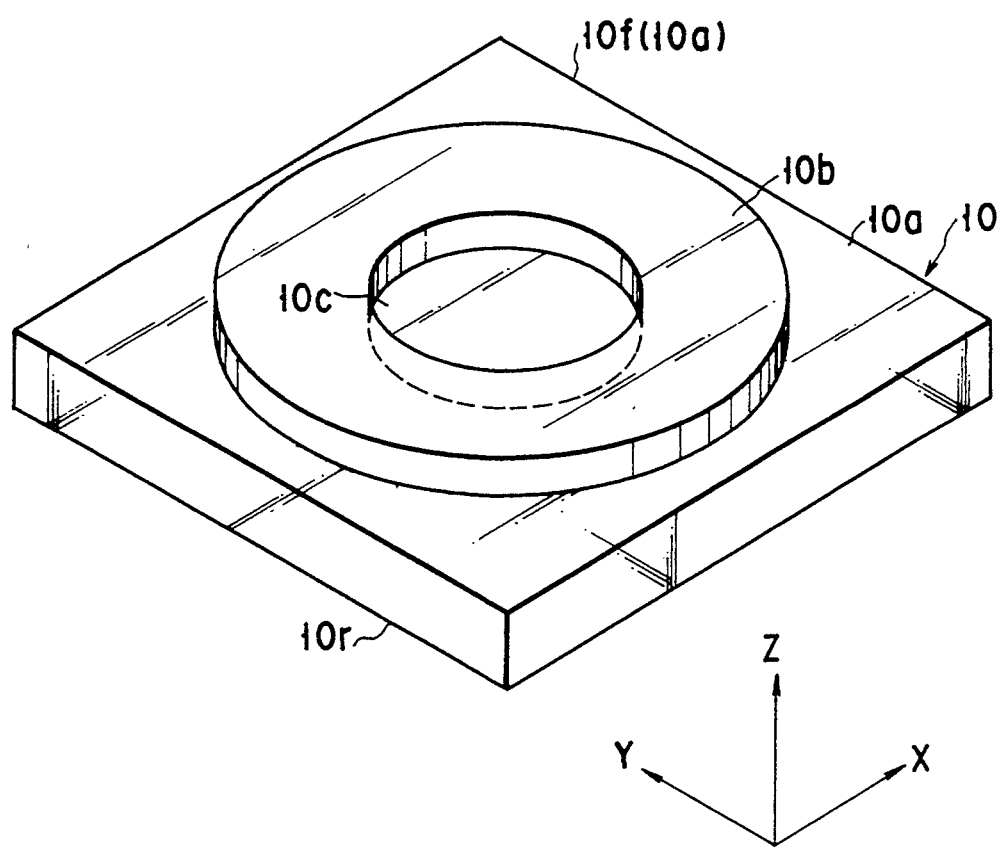
FIG. 1 is a schematic view, showing a super-resolution element (three-portion apodizer) according to a first embodiment of the invention.

FIG. 1 shows a super-resolution element according to a first embodiment of the invention.

A super-resolution element 10 includes a transparent base member which can pass a light beam therethrough. Preferably, the transparent member is made of acrylate, ABS-resin, polycarbonate, or glass.

The super-resolution element 10 has a first (upper) surface 10f and a second (lower) surface 10r. At least one of the first and second surfaces 10f and 10r has an annular projecting portion 10b defined by inner and outer concentric circles, a circular portion 10c defined by the inner concentric circle, and a peripheral portion 10a defined by the outer concentric circle. The portions 10a and 10c and projecting portion 10b form three light-beam-transmitting portions. The surface of the circular portion 10c has the same level as that of the peripheral portion 10a. The surfaces of the portions 10a and 10c are parallel with the surface of the annular projecting portion 10b.

The annular projecting portion 10b is formed on a plane parallel plate (i.e., the base member of the super-resolution element 10) by directly molding a projection member having a desired area and thickness. The projecting portion 10b may be formed by the 2P method, i.e., separately making a projection member and then laminating the member on a plane parallel plate, or by a cutting method. Alternatively, the super-resolution element may be formed by holding a plane parallel plate between casts having a recess with a desired area and thickness, and pressing the plate while heating the same.

When a light beam is emitted into the super-solution element 10 from the lower surface 10r to the upper surface 10f, i.e., in a direction of the Z axis shown in FIG. 1, it is split into first through three beams having characteristics corresponding to the three portions 10a, 10b, and 10c, respectively. The optical path of the peripheral portion 10a has a length equal to that of the circular portion 10c, and the optical path of the annular projecting portion 10b is shorter than those of the portions 10a and 10c.

A phase difference of $\pi$ ($+2n\pi$, n:integer) [rad.] can be made between the first and second light beams, by setting to an optimal value the height of the portion 10b from the portion 10a or 10c. Similarly, a phase difference of $\pi$ (+2m$\pi$, m:integer including m=n) [rad.] can be made between the second and third light beams. Accordingly, the phase difference between the first and third light beams becomes 2l$\pi$ (l:integer including l=n=m) [rad.]. Thus, by virtue of the annular projecting portion 10b, the light beams corresponding to each adjacent two of the portions 10a to 10c can have a phase difference of $\pi$, respectively.

Here, if the areas of the annular projecting portion 10b and circular portion 10c are determined so that the second and third light beams passing through the portions 10b and 10c could have the same intensity, sidelobes can be prevented from occurring around the central beam waist spot of the converged light beam.

Figure 2:
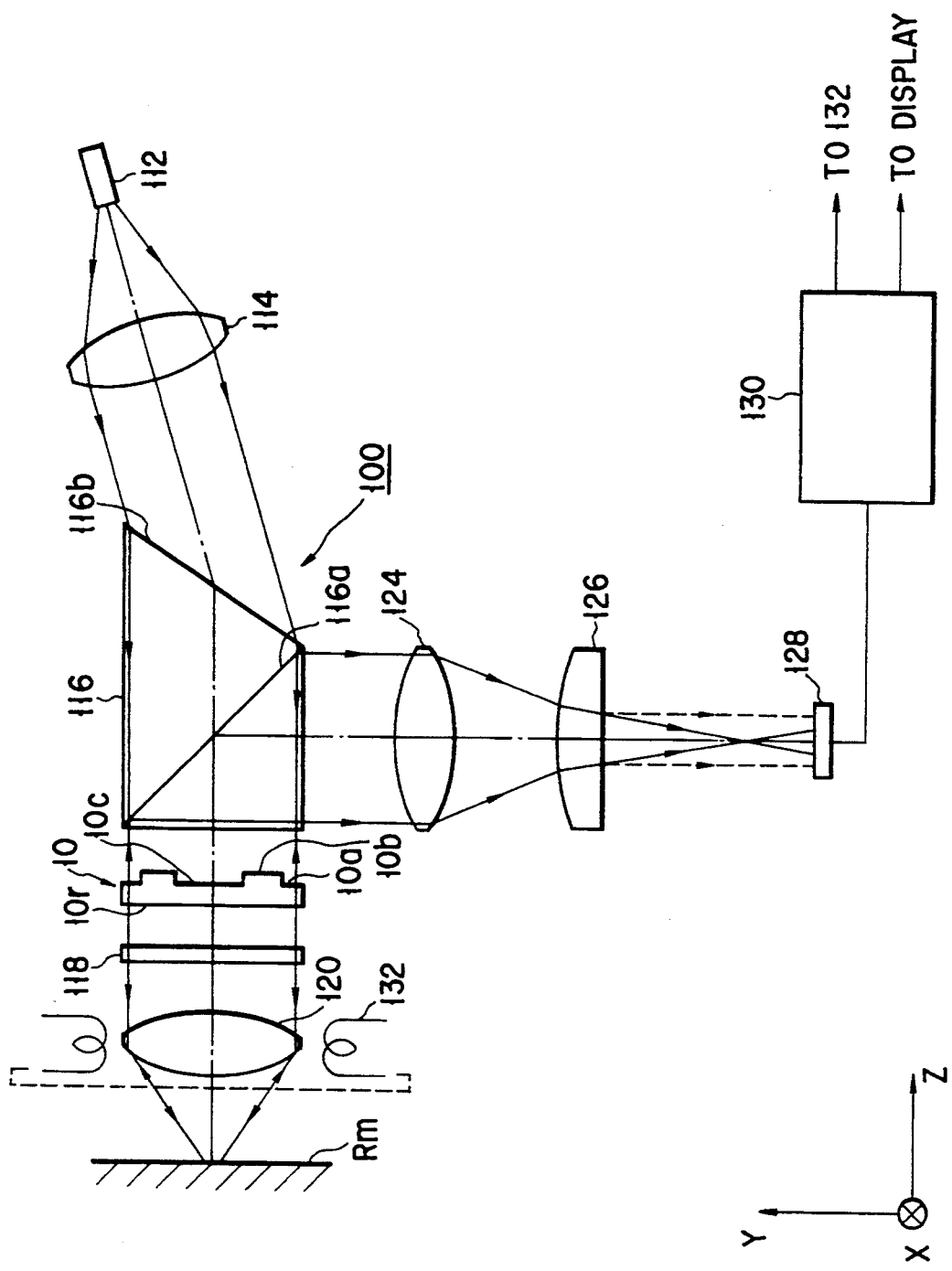
FIG. 2 is a schematic sectional view, showing an optical head device in which the super-resolution element of FIG. 1 is incorporated.

FIG. 2 shows an optical filing apparatus, i.e., an optical disk apparatus, in which the super-resolution element of FIG. 1 is employed, and which is used to record information in an optical disk (recording medium) and to reproduce information therefrom.

An optical disk apparatus 100 has a laser element 112 for emitting a diverging laser beam having an elliptical beam spot (cross section), a polarization beam splitter 116 for correcting the elliptical beam spot of the laser beam to a substantial circle, guiding the laser beam toward an optical disk Rm, and separating a laser beam reflected from the optical disk, from the laser beam directed to the disk Rm, and a photodetector 128 for detecting the separated laser beam and reproducing the same as information stored in the disk Rm.

A collimating lens 114 for converting the diverging laser beam to a parallel laser beam is interposed between the laser element 112 and polarization beam splitter 116. The super-resolution element 10 shown in FIG. 1, a phase-shifting plate 118 for controlling isolation between a light beam towards the disk Rm and a light beam reflects from the disk Rm, and an objective lens 120 for converging the laser beam on the recording surface of the optical disk Rm are interposed between the polarization beam splitter 116 and optical disk Rm in the above order.

Between the polarization beam splitter 116 and photodetector 128, there are interposed a focus lens 124 for converging the laser beam reflected by the splitter 116, onto the photodetector 128, and a cylindrical lens 126 for creating a control laser beam, which is called "focusing/tracking beam" and used to adjust the position of the objective lens 120 so as to converge the laser beam with an optimal beam spot size.

The super-resolution element 10 may be located between the objective lens 120 and optical disk Rm, or between the laser element 112 and polarization beam splitter 116.

The laser beam generated from the laser 112 is converted to a parallel beam by means of the collimating lens 114, and is corrected by the polarization beam splitter 116 to have a generally circular beam spot. The laser beam is transmitted from the splitter 116 to the super-resolution element 10, where the beam is split into the first, second and three beams through the peripheral portion 10a, annular projecting portion 10b, and circular portion 10c, as is explained referring to FIG. 1.

These laser beams are converted to circularly polarized light beams by the phase-shifting plate 118, which are converged by the objective lens 120 onto the recording surface of the optical disk Rm.

The laser beam converged on the recording surface is reflected therefrom at a reflectance corresponding to data recorded in the disk Rm.

The laser beam reflected from the disk Rm again passes the objective lens 120, phase-shifting plate 118, and super-resolution element 10 in this order, thereby returning to the polarization beam splitter 116 and simultaneously reflecting from the surface 116a of the splitter 116 toward the photodetector 128.

In the photodetector 128, the laser beam is converted to an electrical signal, which is in turn output to a signal processing circuit 130, where the data items recorded in the optical disk Rm are reproduced.

The signal processing circuit 130 simultaneously outputs a lens control signal for controlling the position of the objective lens 120, to perform the focusing and the tracking. In response to the lens control signal, a focus/track control coil 132 is energized, and the objective lens 120 is moved to a position, in which it can converge a laser beam with an optimal beam spot size onto a target position of the optical disk Rm. Thus, the data recorded in the target position of the disk can be read out with accuracy.

Then, referring to FIG. 1, the principle of reducing the intensity of sidelobes generated around the central beam spot by the super-resolution element 10, and the principle of increasing the light intensity of the beam spot will be explained in detail.

As is described above, the super-resolution element 10 has concentric border circles defining more than two portions, which can provide the light beam passing through the circular aperture, with a desired intensity ratio or optical characteristics. This super-resolution element having three or more portions is hereinafter referred to as "apodization optical element", and in particular, the super-resolution element shown in FIG. 1 and having three portions is referred to as "three-portion apodizer" and a super-resolution element having two portions is referred to as "conventional element". In the three-portion element, a method (apodization) is used for varying the distribution of amplitude transmittance of light in an annular portion defined by the two concentric circles, relative to the light energy in a central portion of the circular aperture.

With the aim of developing the three-portion element, computer simulation using 2nd-order Fourier transformation and results of 1st-order analysis of algebraic approximate expression was carried out.

First, a square, by which the circular aperture of an objective lens having a focal length and a numerical aperture expressed as F and NA, respectively, was circumscribed, was divided into 200×200 elements. Then, the intensity of a light beam having passed through each element of the square was detected. Specifically, a) a uniform beam having a uniform intensity distribution was applied to each element, and then b) a Gaussian beam was applied thereto, which has a central intensity of $e^{-2}$ and such a Gaussian distribution as has a beam spot size W 1.25 times larger than the aperture diameter A (=2F×NA) of the objective lens.

Second, apodization was created by multiplying, by "0" or "−1", amplitude values, which were obtained as a result of applying the uniform beam and Gaussian beam to each element within the inner border circle. Thereafter, 2nd-order Fourier transformation of the "pupil function" of the objective lens, obtained as a result of the apodization, was performed by use of the Simpson's formula. Thus, the beam spot amplitude distribution of each of the uniform and Gaussian beams was obtained. At this time, a plurality of parameters as regards the beam spot amplitude distribution, such as c) the half-width ratio (of each of the uniform beam and Gaussian beam), d) the center peak ratio, and e) the ratio of the sidelobe intensity to the center peak intensity, were obtained by use of border circles of various diameters.

The half-width ratio is used for the beam waist intensity distribution when one of the super-resolution and apodization is used in the present invention, and when one of them is not used in the conventional method.

The center peak intensity ratio is the intensity at the center of the main spot obtained when one of the super-resolution and apodization is used in the present invention, and when one of them is not used in the conventional method.

The ratio of the sidelobe intensity to the center peak intensity is the sidelobe intensity within the beam waist intensity distribution.

Then, explanations will be made to a super-resolution element without the central portion 10c unlike the element of FIG. 1, i.e., to the conventional super-resolution element having a circular aperture divided into two portions. Computer simulation is performed to trace the relation between the performance values for both of the conventional super-resolution methods.

FIGS. 49A, 49B, 49C, 50 to 52 show results obtained by estimating, in the same manner as in the present invention, the conventional mask method in which a central portion of an aperture is shaded, and the conventional phase-shift method in which the light beam is concentrically split into two beams, and the phases of the split beams are shifted by $\pi + 2n\pi$ [rad.].

As is evident from FIGS. 51 and 52, in each of the conventional methods, the lower the half-width ratio, the significantly lower the center peak intensity ratio becomes, and the higher the ratio of the sidelobe intensity to the center peak intensity. In particular, in the phase-shift method, the ratio of the sidelobe intensity to the center peak intensity significantly increases. These features can be found both when a uniform light beam is input and when a Gaussian beam is input.

With the aim of restraining decreases in the center peak intensity ratio in the conventional methods, a super-resolution element (apodization elements) will be conjectured which can most increase the center peak intensity ratio.

Figure 3A:
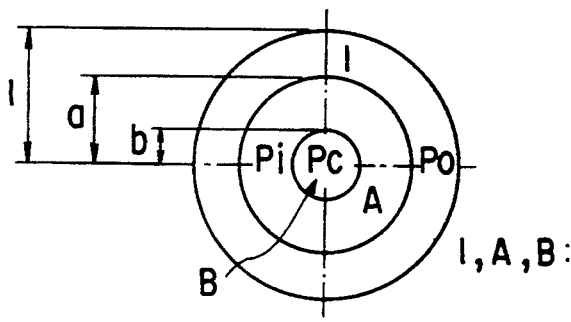
FIG. 3A is a diagram showing a principle of the super-resolution element of FIG. 1.
Figure 3B:
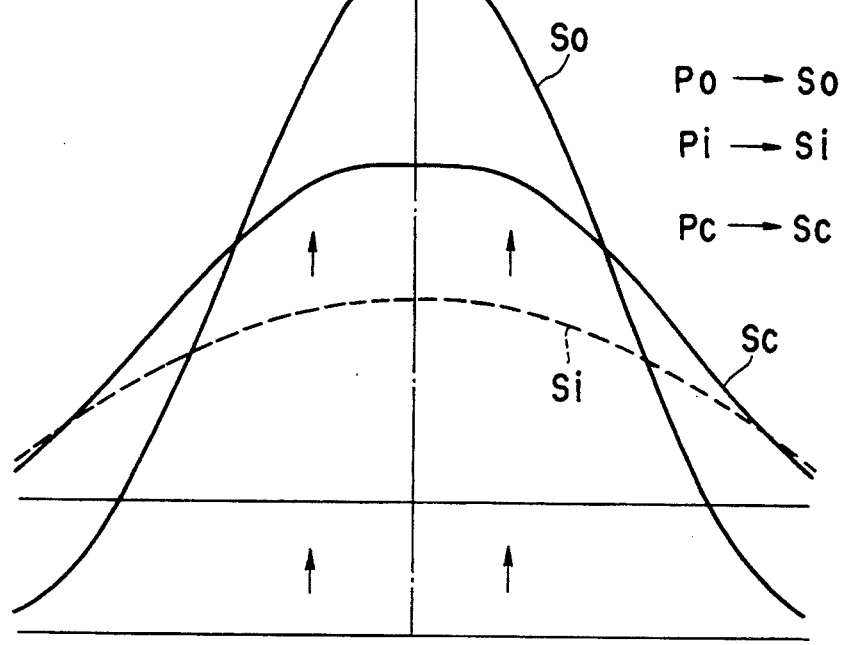
FIGS. 3B and 3C are graphs, showing levels having passed through the super-resolution element of FIG. 3A (principle of the sidelobe intensity reduction performed by the three-portion apodizer)

FIG. 3A is a diagram showing a principle of the three portions super-resolution element of FIG. 1 is incorporated. In FIG. 3A, the amplitude transmittance in the outer portion is set to 1, and the amplitude transmittance in the inner portion is set to T, where T is a complex number falling within a range of $|T| \leq 1$, and when T is a negative real number, the phase of each of the light beams is displaced by $\pi + 2n\pi$[rad.].

Where the focal length of an objective lens is expressed as F, the numerical aperture as NA, the wavelength of a light beam input to the objective lens as $\lambda$, the coordinates of the objective lens's pupil plane as (X, Y), and the coordinates of a beam-converged plane (=beam waist plane) as (x, y), the following equations are given:

$$r = \frac{1}{F \cdot NA} (X^2 + Y^2)^{\frac{1}{2}} \tag{1}$$

$$\gamma = (X^2 + Y^2)^{\frac{1}{2}} \tag{2}$$

In addition, the name g(X, Y) is given to the pupil function which is one of the optical characteristics of the super-resolution element.

When light of uniform intensity distribution is applied to the objective lens, the normalized spot amplitude distribution G(r) in the beam waist plane becomes $$G\left(\frac{NA}{\lambda} \gamma\right) = 2\pi \int_0^1 rg(r)J_0\left(2\pi \frac{NA}{\lambda} r\gamma\right) dr \tag{3}$$

If the following substitution is made $$\rho = (NA\gamma)/\lambda \tag{4}$$

and apply g(r)=1 where $1 \geq g(r) \geq a$, and g(r)=T where $a > g(r) \geq 0$, the following transformation is obtained:

$$G(\rho) = 2\pi \left\{ \int_0^1 rJ_0(2\pi\rho r)dr - (1 - T) \times \int_0^a rJ_0(2\pi\rho r)dr \right\} \tag{5}$$

This can be further transformed using Bessel function, to obtain $$G(\rho) = \frac{1}{\rho} \{J_1(2\pi\rho) - (1 - T)aJ_1(2\pi a\rho)\} \tag{6}$$

Where the center peak intensity ratio is represented by $\eta$, the following is derived from the equation (6):

$$\eta^{\frac{1}{2}} = 1 - (1 - T)a^2 \tag{7}$$

For small values of $\rho$, use the following equation $$J_1(Z) = \left(\frac{Z}{2}\right) \sum_{n=0}^{\infty} \frac{(-1)^n (Z/2)^{2n}}{n!(n+1)!} \tag{A1}$$

$$= 2.0\left(\frac{Z}{4}\right) - 4.0\left(\frac{Z}{4}\right)^3 + 2.7\left(\frac{Z}{4}\right)^5 -$$

$$0.89\left(\frac{Z}{4}\right)^7 + 0.18\left(\frac{Z}{4}\right)^9 + O(Z^{11})$$

to generate an approximate formula to the third order term, then substitute this into the equation (6) to obtain the following:

$$G(\rho) \approx \pi \left\{ [1 - (1 - T)a^2] - \frac{(\pi\rho)^2}{2} [1 - (1 - T)a^4] \right\} \tag{8}$$

If the half-width ration is represented by $\chi$, then the equations (7) and (8) yield the following equation satisfying $\chi$ and $\eta$:

$$\eta - 2\left(1 - \frac{1-T}{2\chi^2}\right)\eta^{\frac{1}{2}} + T \approx 0 \tag{9}$$

For $\eta \geq$, the equation (9) has the following solution:

$$\eta^{\frac{1}{2}} \approx 1 - \frac{1-T}{2\chi^2} + \left\{ \left(1 - \frac{1-T}{2\chi^2}\right)^2 - T \right\}^{\frac{1}{2}} \quad (10)$$

Using the equation (10), the approximate characteristics of $\eta$ vs $\chi$ for $T=0$ and $T=-1$ is included into FIG. 52. Although the $\eta$ value is somewhat low, the curve given by the equation (10) is similar to computer simulation results. According to the equation (10), when $T=0$ and $\chi = 2^{-\frac{1}{2}}$, $\eta = 0$. This means that, for $T=0$, $\chi$ cannot take a value lower than approx. $2^{-\frac{1}{2}}$ (that is, $\chi$ is necessarily $2^{-\frac{1}{2}}$ or more). For $T=-1$, in contrast, $\eta$ approximates 0 as $\chi$ approaches 0. That is, in principle, $\chi$ goes to 0 when $T=-1$.

Solving the equation (9) for $\chi$ yields $$\chi^2 \approx \eta^{\frac{1}{2}} \left( 1 + \frac{(1 - \eta^{\frac{1}{2}})^2}{2\eta^{\frac{1}{2}} - \eta - T} \right) \quad (11)$$

The equation (11) indicates that when $T=-1$, $\chi$ assumes a minimum value, that is, when $T=-1$ and $\chi$ is constant, $\eta$ assumes a maximum value. Further, computer simulation results indicate that when the phase displacement is other than $\pi + 2n\pi$ [rad.], $\eta$ is lower than in the case of $T=-1$.

Figure 49A:
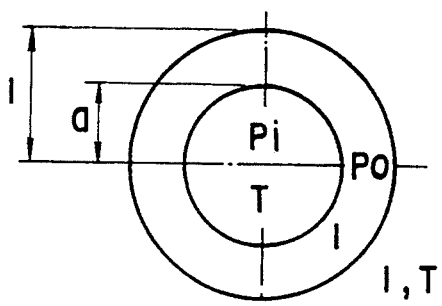
FIG. 49A is a diagram, showing a principle of a conventional two-portions super-resolution element.
Figure 49B:
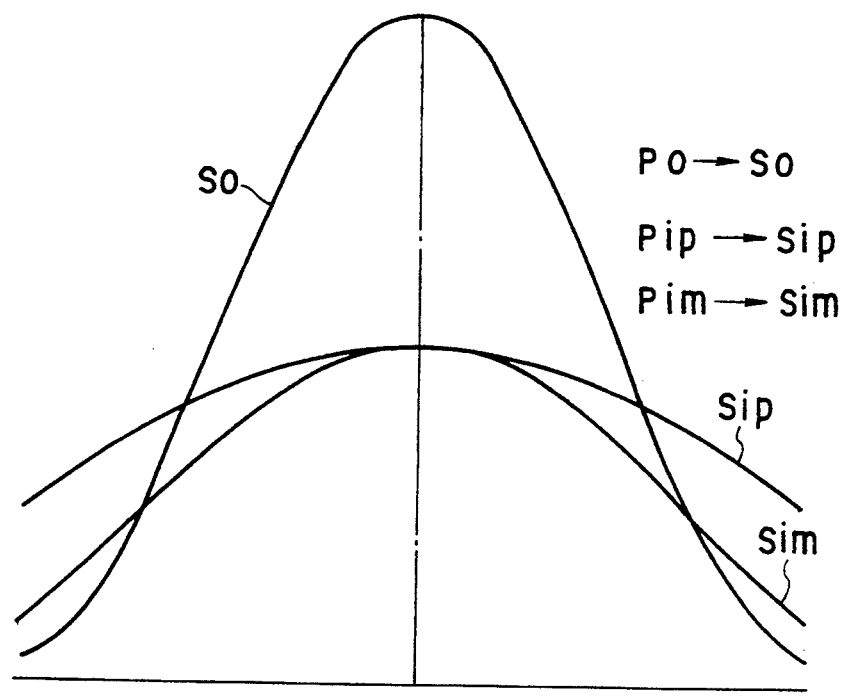
FIGS. 49B and 49C are graphs, showing levels having passed through the super-resolution element shown in FIG. 49A.
Figure 49C:
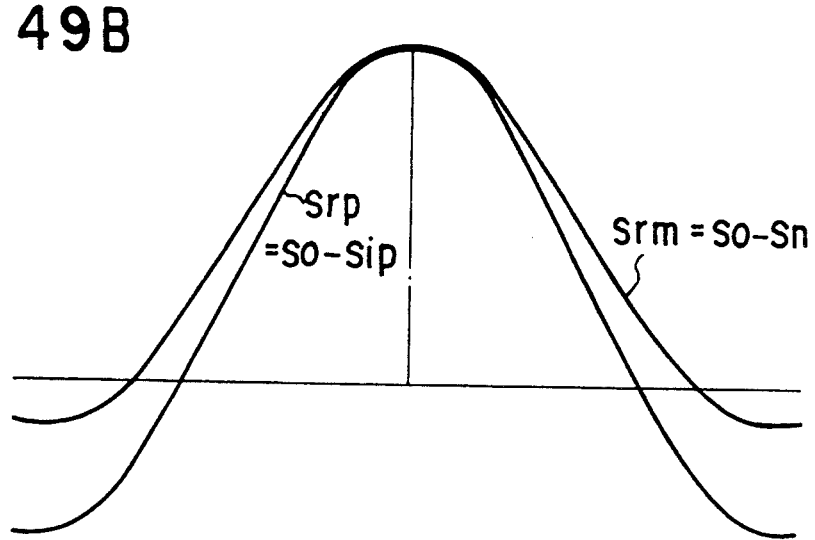
Figure 50:
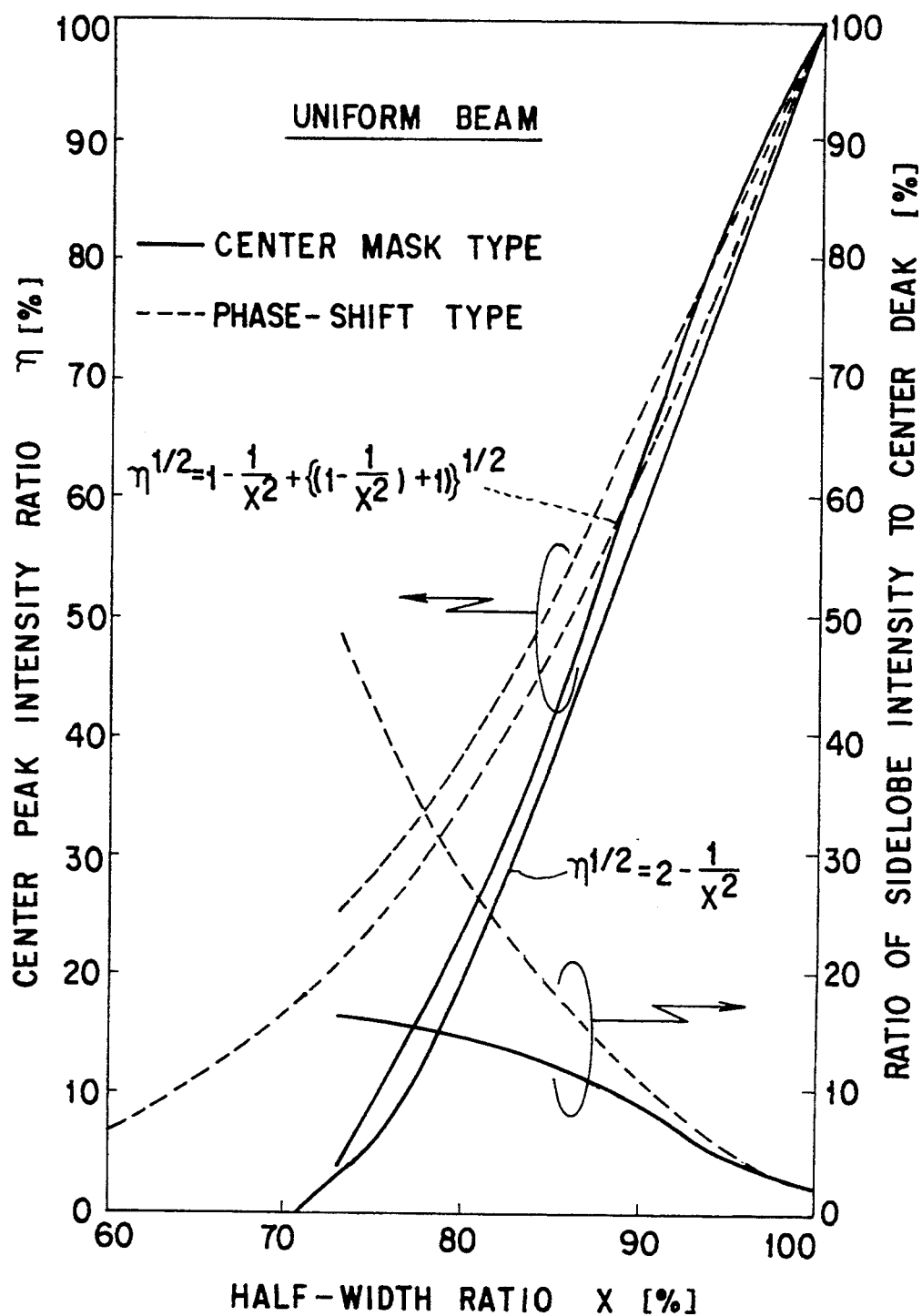
FIG. 50 is a graph, showing the characteristics of a beam waist spot created by a uniform beam having passed through a conventional super-resolution element.
Figure 53:
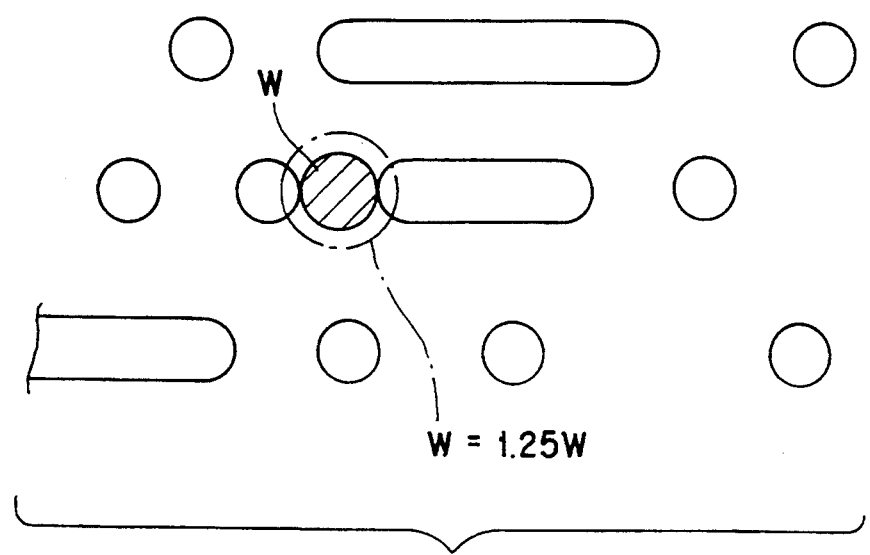
FIG. 53 is a schematic plan view, useful in explaining the relation between the beam spot size of a laser beam passing through the conventional optical head device and the data-storing state of an optical disk.

The equation (5) indicates that the amplitude distribution of the beam spot in FIG. 49A is obtained by subtracting amplitude distribution $S_i$ (generated by light passing through an aperture portion $P_i$ of a radius of a) from amplitude distribution $S_0$ shown in FIG. 49B (generated by light passing through an aperture portion $P_0$ of a radius of 1). Further, the equation (7) indicates that, for a given value of $\eta$, the value of a will be smaller for $T=-1$ than for $T=0$. Thus, a half-width $S_{ip}$ for $T=-1$ will be greater than a half-width $S_{im}$ for $T=0$.

The equation (11) pertains only when T takes a real value. Therefore, a slightly less precise approximate equation that allows T to be complex has been derived. Replacing T with $te^{i\theta}$, the following formula is obtained:

$$\frac{|G(\rho)|^2}{\pi^2} = \frac{1}{(\pi\rho)^2} \{[J_1(2\pi\rho) - (1 - t\cos\theta)aJ_1(2\pi a\rho)]^2 + [t\sin\theta a J_1(2\pi a\rho)]^2\} \quad (12)$$

$$\approx \eta - (\pi\rho)^2\{[1 - (1 - t\cos\theta)a^2](1 - a^2) + a^2\eta\}$$

$$\approx \eta - (\pi\rho)^2 \eta^{\frac{1}{2}} \left( \frac{2\eta^{\frac{1}{2}} - \eta - t\cos\theta}{1 - t\cos\theta} \right)$$

Note that the above calculation involves the following approximate equation, which is applied where a is small:

$$\eta^{\frac{1}{2}} \approx 1 - (1 - t\cos\theta)a^2 \quad (13)$$

Accordingly, the equation (12) provides the following relational equation satisfying the half-width ratio $\chi$:

$$\chi^2 \approx \eta^{\frac{1}{2}} \left( 1 + \frac{(1 - \eta^{\frac{1}{2}})^2}{2\eta^{\frac{1}{2}} - \eta - t\cos\theta} \right) \quad (14)$$

FIG. 52 plots the $\chi$ values calculated by the equation (14) for different $\theta$ and t values, where $\eta = 25\%$. As is shown in FIG. 52, $\chi$ becomes lowest when $\theta = \pi$, $t=1$.

The above results indicate that, for a super-resolution element which splits the wavefront into two parts, the highest center peak intensity ratio is obtained by a phase-shift structure, where the inner and outer portions both have an intensity transmission factor of 100% and where the light between these two portions is phase-shifted $\theta = \pi + 2n\pi$.

The equation (10) can be used, with $T=-1$, as a guideline for indicating the upper limit of the center peak intensity ratio for super-resolution elements that split the wavefront into three or more portions.

Then, a method for reducing the 1st-order sidelobe intensity will be explained.

First, the number of wavefront portions is increased from two to three. This enables the 1st-order sidelobe intensity to be reduced relatively. Here, the basic idea for reducing the 1st-order sidelobe and the structure of a super-resolution element which can increase the center peak intensity ratio will be described.

Substituting $T=-1$ into the equation (6) and using the following formula:

in $0 \leq z \leq 4$; $J_1(Z) = 0.577 \sin(0.866Z)$ in $4 < Z \leq 7$; $J_1(Z) = 0.346 \sin(0.869Z)$ \quad (A5)

the amplitude distribution in the vicinity of the peak of the 1st-order sidelobe is expressed by the following:

$$G(\rho) = \frac{1}{\rho} \{0.346\sin(5.46\rho) - 1.15a\sin(5.44a\rho)\}. \quad (15)$$

For a center peak intensity ratio $\eta$ of 33.3%, for which $a = 0.460$ (by the equation (7), $G(\rho)$ is minimized (shown in FIG. 4) at $$\rho \approx 0.72 \quad (16)$$

At this point, the first term on the right side of the equation (15) has a value of $-0.341$, and the second term has a value of $-0.715$. Because both terms are negative, they have a multiplicative affect on increasing the sidelobe intensity. Further, because the second term is lower than the first term, the beam spot $S_{im}$ formed by light passing through a portion $P_i$ in FIG. 49A significantly serves as a main factor for increasing the sidelobe intensity.

The equation (A5) is obtained by developing the equation (A1) in the following manner:

$$0.577\sin(0.866Z) \approx 2.0\left(\frac{Z}{4}\right) - \quad (A2)$$

$$4.0\left(\frac{Z}{4}\right)^3 + 2.4\left(\frac{Z}{4}\right)^5 - 6.8\left(\frac{Z}{4}\right)^7 + 0.11\left(\frac{Z}{4}\right)^9$$

$$J_1(5 + Z) = \quad (A3)$$

-continued $$0.32 - 0.22\left(\frac{Z}{2}\right) + 0.66\left(\frac{Z}{2}\right)^2 + 0.051\left(\frac{Z}{2}\right)^3 + O(Z^4)$$

$$0.346\sin[0.869(5 + Z)] \approx \quad (A4)$$

$$-0.32 - 0.22\left(\frac{Z}{2}\right) + 0.49\left(\frac{Z}{2}\right)^2 + 0.11\left(\frac{Z}{2}\right)^3$$

The equation (A2) is obtained by making each of lower-order terms of the equation (A1) identical to a corresponding one of its sine function, which is obtained as a result of Taylor expansion. On the other hand, the following equation is given by subjecting the equation (A1) to Maclaurin's expansion and using a known graph:

$$J_0(5) \approx -0.173, \ J_1(5) \approx -0.323 \quad (B1)$$

The equation (A3) is obtained by using the equation (B1) and Bessel's differential equation for the equation (A1). The equation (A4) is obtained by making each of lower-order terms of the equation (A3) identical to a corresponding one of its sine function. The equation (A5) is obtained using the equations (A2) to (A4).

Under the above conditions, the ratio of the 1st-order sidelobe intensity to the center beam spot intensity works out at 34.0%, which is consistent with 34.4% obtained by computer simulation.

The apodizer which can reduce the 1st-order sidelobe intensity will now be explained.

The 1st-order sidelobe intensity can be significantly reduced by adopting a three-portion apodizer structure and adding a positive term to the equation (15).

As is shown in FIG. 3A, the amplitude transmission factors of the outer, middle, and inner portions are set to 1, A, and B, respectively. The beam waist spot amplitude distribution produced by a light source of uniform density distribution can be expressed as follows from the equation (3):

$$G(\rho) = 2\pi \left\{ \int_0^1 rJ_0(2\pi\rho r)dr - (1 - A) \times \right. \quad (17)$$

$$\int_0^a rJ_0(2\pi\rho r)dr + (B - A) \times$$

$$\left. \int_0^b rJ_0(2\pi\rho r)dr \right\}$$

$$= \frac{1}{\rho} \{J_1(2\pi\rho) - (1 - A)aJ_1(2\pi a\rho) +$$

$$(B - A)bJ_1(2\pi b\rho)\}$$

From equations (17) and (A5), the following approximate equation for $\rho = 0.72$ is obtained:

$$G(0.72) \approx 0.801(B-A)b\sin(3.92b) - 0.801(1-A) \times a \sin(3.92a) - 0.341 \quad (18)$$

On the other hand, because b sin $(3.92b) \geq 0$ in the range where $b \leq 0.8$, a positive term can be added to the equation (15) by setting $B - A > 0$.

The three-portion apodizer will now be explained which can not only reduce the sidelobe intensity but also obtain a relatively high center peak intensity ratio.

From the equation (18), the following relation for the center peak intensity ratio $\eta$ can be derived:

$$\eta^{\frac{1}{2}} = 1 - (1 - A)a^2 + (B - A)b^2 \quad (19)$$

Further, by taking $\rho$ from the equations (14) and (A1) to its third order term, the following beam-waist-spot amplitude distribution for the area where $\rho$ is substantially zero:

$$G(\rho) \approx \pi \{[1 - (1 - A)a^2 + (B - A)b^2] - \quad (20)$$

$$\frac{1}{2} (\pi\rho)^2 [1 - (1 - A)a^4 + (B - A)b^4] \}$$

From the equations (19) and (20), the following can be derived:

$$X2 \approx \frac{\eta^{\frac{1}{2}}}{1 - (1 - A)a^4 + (B - A)b^4} \quad (21)$$

The value of the right side of the equation (21) is more strongly affected by the values of a and b, which are raised to the fourth power, than the values of $(1 - A)$ and $(B - A)$. Further, it is known that the value of the right side is more strongly affected by a variation in the value of a than that in the value of b since the value of a is larger than the value of b. Thus, the most significant factor for determining the center peak intensity ratio $\eta$ is the value of a. In order to obtain a small value of a, it is necessary to set A (from the equation (19)) to $-1$ for any fixed value of $\eta$ (shown in FIG. 4).

Moreover, in order to obtain a small first-order sidelobe intensity, the first term of the equation (18) must take a large value. As is evident from the equation (17), the first term of the equation (18) refers to the beam waist spot amplitude distribution Sc created by light passing through the radius b aperture shown in FIG. 3A. As b becomes larger, the relative amplitude in the area of $\rho = 0.72$ becomes smaller. The sidelobe intensity can effectively be reduced by setting $B - A$ large and making b sufficiently small (shown in FIG. 5).

This being so, a phase-shifting structure created under the conditions of $A = -1$ and $B = 1$ is suitable for sufficiently enhancing the center peak intensity ratio while the sidelobe intensity is reduced.

Supposing that $\eta = 33.3\%$ under the above conditions, optimal values of "a" and "b" in the apodizer with the above-described phase-shifting structure are substantially 0.71 and 0.54, respectively (the value of b is obtained from the equation (19)). At this time, the value of G (0.71) becomes substantially 0 from the equation (18).

FIG. 5 shows that, at a center peak intensity ratio $\eta$ of 33.3% and a first-order sidelobe intensity of about 0, the value of a substantially coincides with the calculation result "a = 0.71" obtained from the equations (19) and (20).

Here, since the radius of the outer border circle is the most influential factor on the center peak intensity ratio $\eta$, the beam waist spot's half-width ratio and first-order sidelobe intensity for different radius values were calculated. For a uniform intensity distribution light source, the ratio of b to a can be obtained from the equation (19) by fixing the value of $\eta$. On the other hand, for a Gaussian distribution light source, the equation (3) gives the following relational equation for $\eta$, a, and b:

$$\eta^{\frac{1}{2}} = \{1 - e^{-(1/a)^2} + 2e^{-(a/a)^2} - 2e^{-(b/a)^2}\} / \{1 - e^{-(1/a)^2}\} \quad (22)$$

where $a$ represents a radius at which the energy of the center of the light having the Gaussian intensity distribution is $e^{-2}$. Further, in the case of the phase-type apodizer for shifting the phases of beam components by $\pi + 2n\pi$, when the amplitude distribution of a light beam entering the aperture of an objective lens is set, the polarity of that part of the amplitude distribution which is located only in a ring region corresponding to the range of b−a is inverted.

FIGS. 6 and 7 show beam spot distributions obtained when a uniform intensity distribution light source and a Gaussian distribution light source are used. As is evident from these figures, the first-order sidelobe intensity considerably decreases as the value of a increases. It is confirmed that this effect can be obtained from either the uniform intensity distribution light source or the Gaussian distribution light source. When the first-order sidelobe intensity decreases, the half-width ratio $\chi$ increases slightly.

Figure 8:
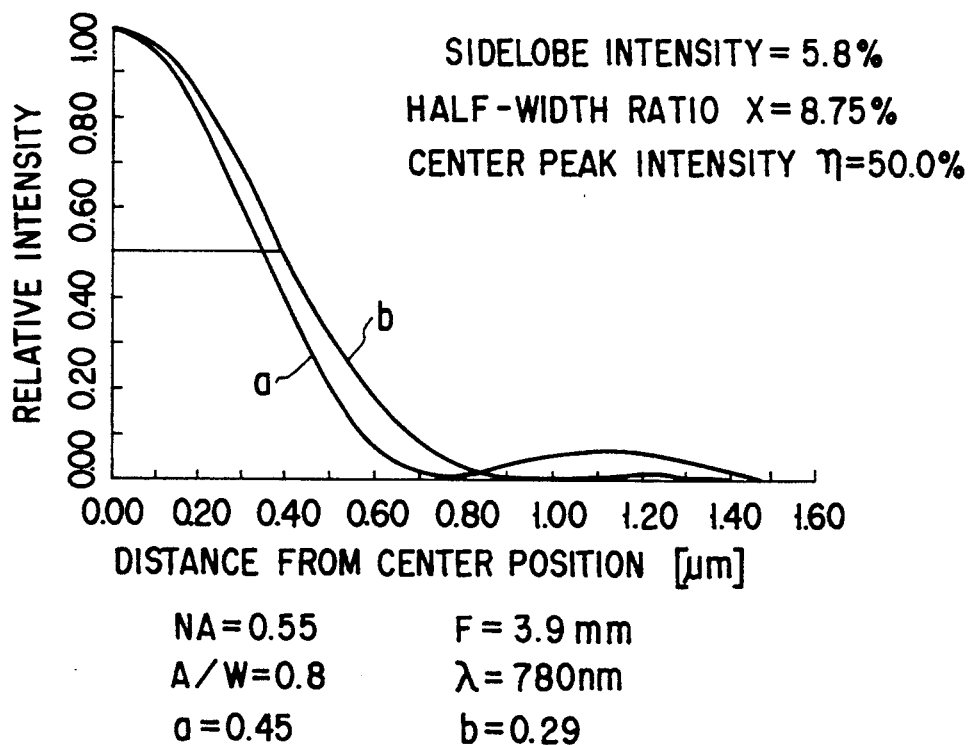
FIG. 8 is a graph showing the intensity distributions of the beam waist spots of Gaussian beams, line (a) indicating the case of using the three-portion apodizer element, and line (b) indicating the case of using no three-portion apodizer element.

In addition, FIG. 8 shows that, at a center peak intensity ratio $\eta$ of 50%, the ratio of the sidelobe intensity to center peak intensity is about 5.8%, the half-width ratio $\chi$ is 87.5%, and the first-order and second-order sidelobe intensities are substantially identical to each other.

Then, an apodizer having four or more portions will be described.

As is explained above, in a three-portion apodizer, the larger the border circle a, the lower the first-order sidelobe intensity, and the higher the second-order sidelobe intensity. Where the first-order and second-order sidelobe intensities are equal to each other, they increase as the center peak intensity ratio $\eta$ decreases.

This means that the second-order sidelobe intensity need be reduced at areas where the center peak intensity ratio $\eta$ is low. Therefore, a description will be given of a method for canceling the amplitude of the second-order sidelobe by light passing through the central portion of a four-portion apodizer.

Suppose that the border circle radiuses of the four-portion apodizer (not shown), which is obtained by adding one border circle to the three-portion apodizer of FIG. 3A, take values a, b, and c, respectively, from the outermost border. In this case, the ratio Ac of the total amplitude of light passing through the aperture of the radius c to the total amplitude of light passing through the annual aperture bounded by a and b is given by:

$$A_c = \{1 - e^{-(c/a)^2}\} / \{e^{-(b/a)^2} - e^{-(a/a)^2}\} \quad (23)$$

where half-width ratios and sidelobe intensities are obtained by computer simulation, supposing that the ratio Ac increases. Each parameter is set, based on a setting method employed in the above-described three-portion apodizer, so that for a fixed peak intensity ratio $\eta$, the values of a and b could be optimized for each value of Ac, and the maximum value of each of the first-, second-, and third-order sidelobe intensities could be minimized. It is a matter of course that the apodizer corresponds to the three-portion apodizer at Ac=0.

Figure 10:
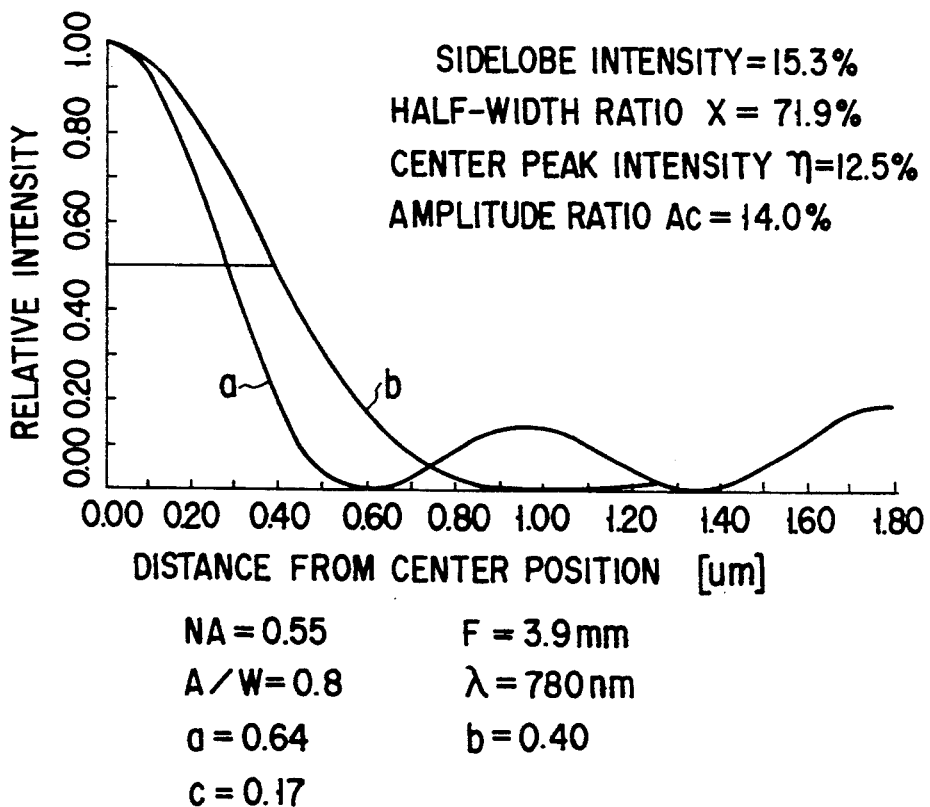
FIG. 10 is a graph showing the intensity distributions of the beam waist spots of Gaussian beams, line (a) indicating the case of using the four-portion apodizer element, and line (b) indicating the case of using no four-portion apodizer element.

FIG. 9 shows calculation results for a Gaussian light source and a center peak intensity ratio of 12.5%. As is evident from FIG. 11, the sidelobe intensity is minimized at Ac=0.14. FIG. 10 shows an example of a beam waist intensity distribution produced by a four-portion apodizer under a Gaussian beam.

Figure 11A:
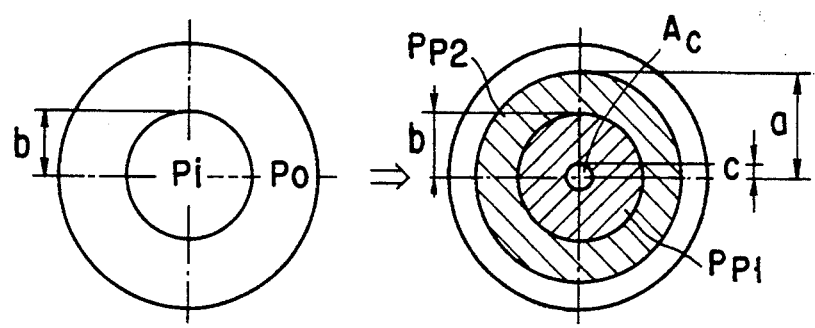
FIG. 11A is a diagram, showing a principle of an another four-portion super-resolution element.
Figure 11B:
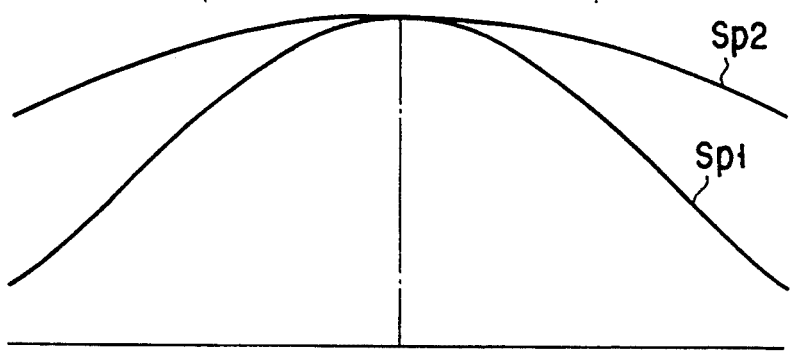
FIGS. 11B to 11D show levels of light beam components having passed through the super-resolution element of FIG. 11A (principle of sidelobe intensity reduction performed by the three-portion apodizer)
Figure 11C:
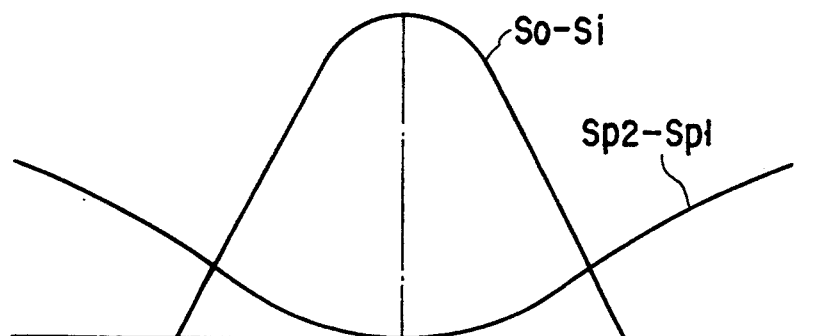
Figure 11D:
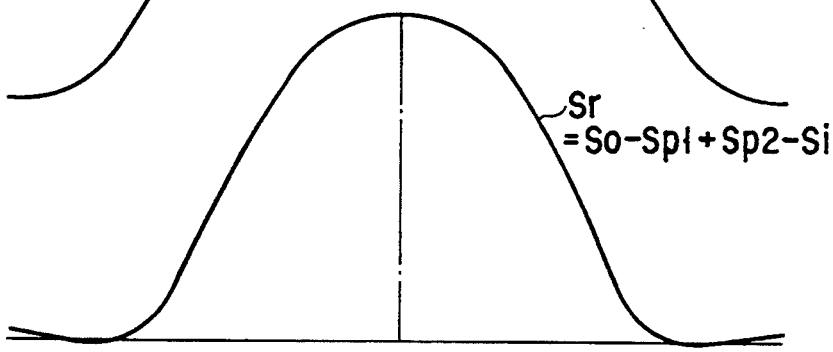

FIGS. 11A to 11D and 12 and 13 show a four-portion apodizer differing from that shown in FIGS. 9 and 10. The apodizer shown in FIG. 11A has four portions defined by concentric border circles, where the phase is shifted so as to maintain a $\pi$ phase difference between the light passing through adjacent portions. In FIG. 11A, the four-portion apodizer, when the apodizer dimensions is set such that the total amplitude of light through annular aperture $P_{p1}$ (bounded by a and b) is equal to the total amplitude of light through annular aperture $P_{p2}$ (bounded by b and c), corrected light having a peak at a point approximating the first-order sidelobe position can be radiated onto the beam waist point, as is shown in FIG. 11C. That is, the corrected light results from interference of adjacent two light beams.

The intensity Ap of the first-order sidelobe which can be reduced by the corrected light is given by:

$$A_p = \{e^{-(b/a)^2} - e^{-(a/a)^2}\} / \{1 - e^{-(1/a)^2}\} \quad (24)$$
$$= \{e^{-(c/a)^2} - e^{-(b/a)^2}\} / \{1 - e^{-(1/a)^2}\}$$

Figure 13:
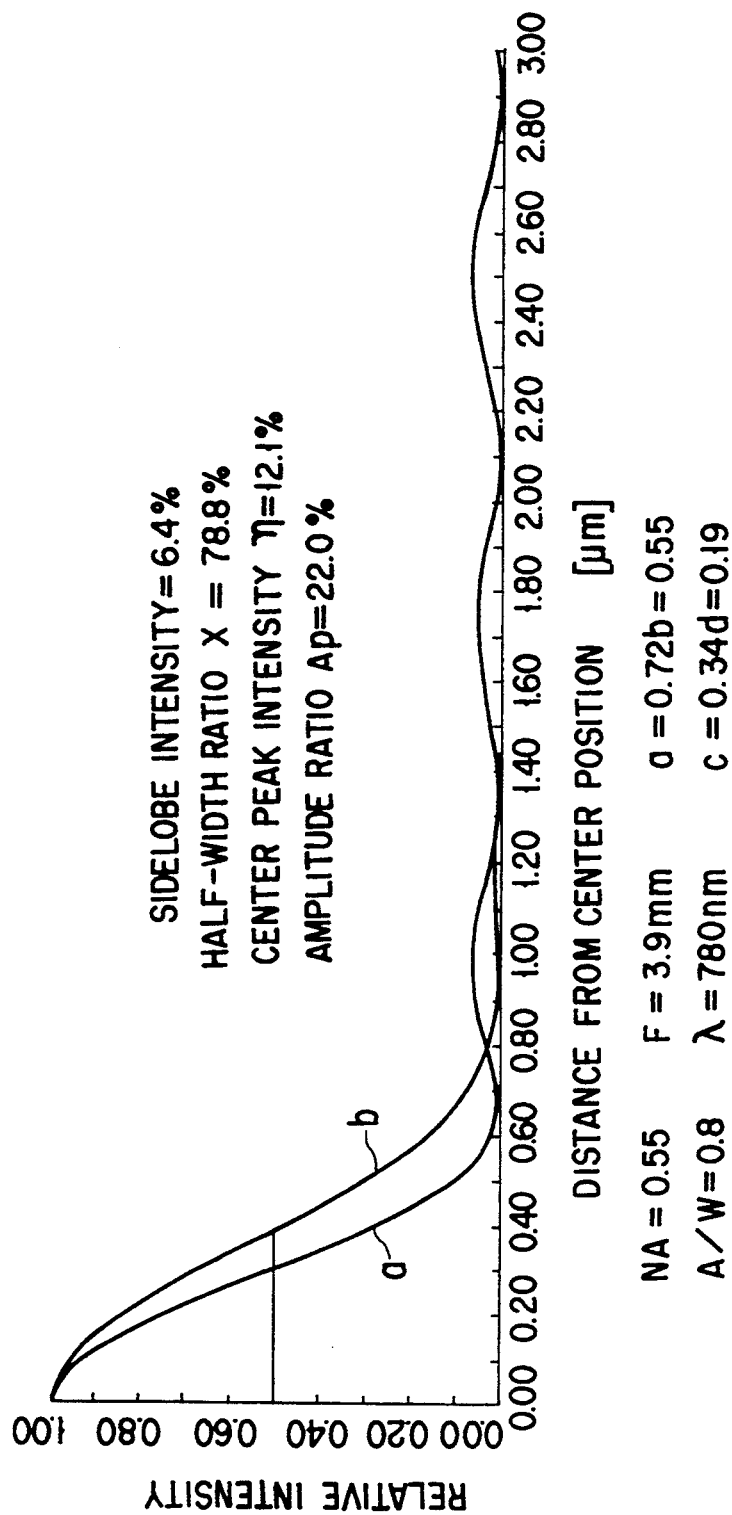
FIG. 13 shows the intensity distributions of the beam waist spots of Gaussian beams, line (a) indicating the case of using the four-portion apodizer element, and line (b) indicating the case of using no four-portion apodizer element.

FIG. 14 shows changes in the first- and second-order sidelobe values for changes in Ap obtained under a Gaussian beam source. The value of b was fixed so as to maintain $\eta$ at a given level. FIG. 13 shows that as Ap increases, the first-order intensity decreases and the third-order intensity increases. Further, it is a matter of course that the four-portion apodizer corresponds to the above-described two-portion apodizer at $Ap \approx 0$.

Figure 15:
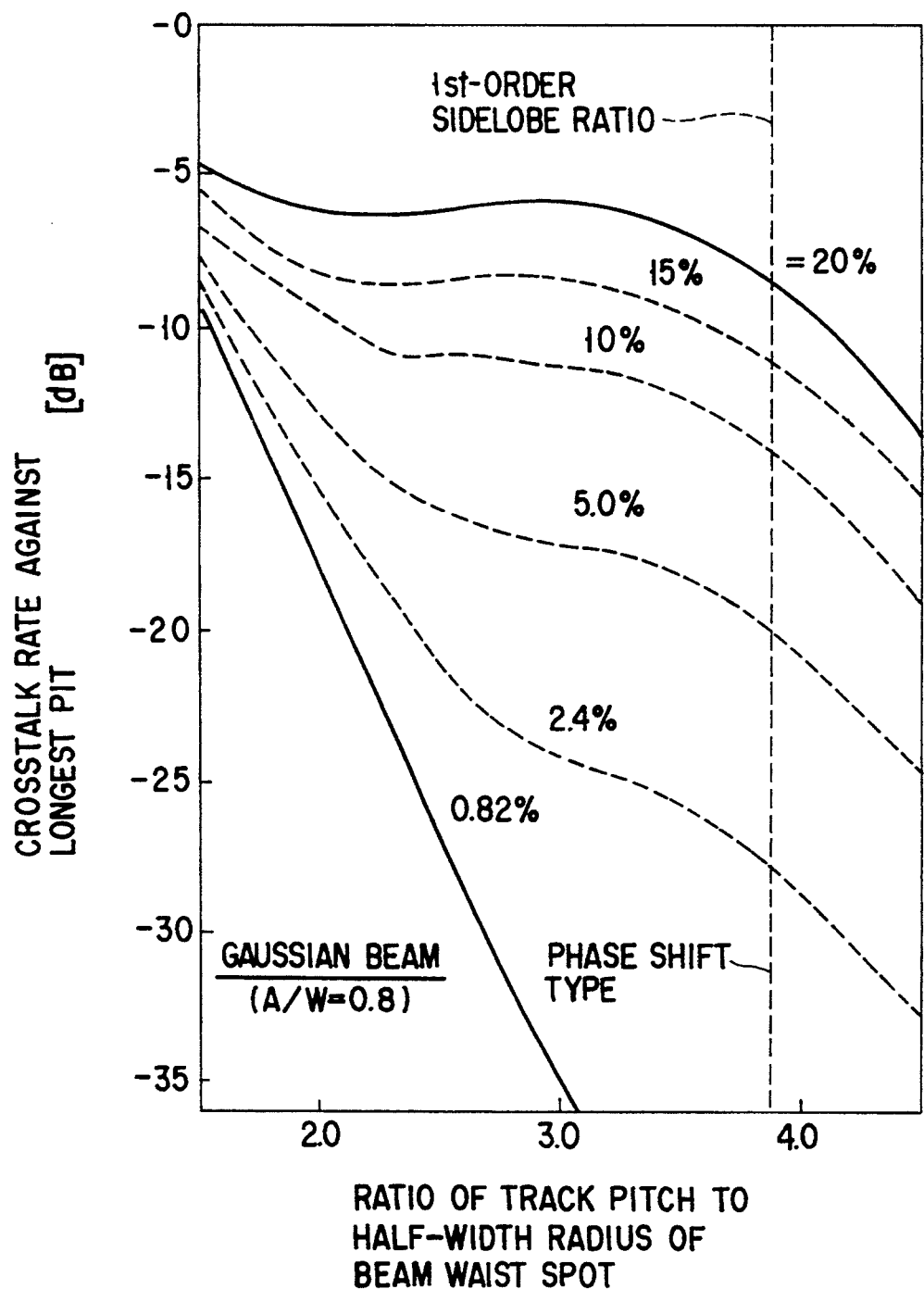
FIG. 15 shows influence (i.e., changes in stroke in the forward direction of a track) on a reproduction signal obtained when the apodizer shown in FIG. 11A is used in the optical disk shown in FIG. 2.

The advantages obtained with the use of the above-described apodizers having a plurality of portions will be specified with reference to FIGS. 15 and 16.

FIG. 15 shows calculation results of the crosstalk rate obtained as the track pitch changes, taking the first-order sidelobe as a parameter. Here, the "crosstalk rate" is defined as the ratio of the retrieval signal produced by a longest pit in the adjacent track to the retrieval signal produced when the beam waist spot is focused as the center of a longest pit in the current track. In FIG. 15, the unit of the track pitch indicated by the abscissa is expressed as a multiple of the beam waist spot's half-width radius. As is evident from FIG. 15, the crosstalk rate is kept low until the track pitch becomes about three times the half-width radius.

FIG. 16 shows calculated crosstalk rates between lines of longest pits and between lines of shortest pits at sparse intervals.

Here, the crosstalk rate vs the first-order sidelobe intensity was calculated for a track pitch 3.875 times the half-width radius of the beam waist spot, assuming that the shortest pit is circular. As a result, it is confirmed that the crosstalk rates for the shortest pits tend to be about 6 dB lower than those for the longest pits, and that the crosstalk rate for the shortest pit is lower than that for the longest pit even if these pits are formed in tracks adjacent to each other.

This being so, the optical disk device can provide that target value of 7% required for reducing the sidelobe intensity which is obtained from FIG. 16, supposing that an average of about −20 dB of crosstalk between tracks adjacent to each other, and about −18 dB for the worst-case pit patterns can be allowed.

As is explained above, a sufficiently converged beam waist spot can be obtained by using the super-resolution element 10 having an uneven surface as shown in FIG. 1. It is confirmed from computer simulation that a four-portion structure in which two or more pairs of concave and convex portions are provided is optimal as the uneven surface of the element 10.

Then, a modification of the super-resolution element shown in FIG. 1 will be explained which has substantially the same function as the element.

FIG. 17 shows a super-resolution element having a projecting portion 170b defined by two border ellipses. In the optical head device shown in FIG. 2, in general, the beam spot of a laser beam supplied from the laser element 22 via the beam entrance of the polarization beam splitter 26 is corrected from an ellipse to a substantial circle. If, on the other hand, the aspect ratio (indicating the ellipticity of the intensity line such as the sectional intensity distribution line) of the laser beam is too high, the laser beam may well be transmitted to the objective lens 30 with its beam spot kept elliptical.

In this case, the beam spot of the laser beam supplied from the beam splitter 26 can be adjusted substantially circular by correcting circular those portions of the border line of each portion which correspond to elliptical components remaining in the beam spot, as the super-resolution element 170 shown in FIG. 17. As shown in FIG. 17, the projecting portion 170b has a shape of an ellipse, which has a major axis corresponding to the major (Y) axis of the beam spot of the laser beam, and a minor axis corresponding to the minor (X) axis of the same. More specifically, the projecting portion 170b has optical characteristics in which the beam spot is converged in the X direction and diffused in the Y direction. As is explained above, if the aspect ratio is relatively low, the laser beam-entrance surface 170b of the polarization beam splitter 170 may have no ellipse-correcting function generally required therein.

FIG. 18 shows an example in which an optical multilayer film 180b for performing local phase change is formed on a transparent flat plate 180. In this case, the laser beam is subjected to multiple reflection on the border surfaces of the layers of the film 180b while passing therethrough, and thus will have phases corresponding to the layers. Locally changing the structure of the film 180b by a vapor deposition method or the like can change the effective optical path length of the laser beam. Alternatively, the effective optical path length may be changed by locally changing the reflectance of the plate 180 made of glass. The change of the reflectance of glass is caused as a result of ion replacement performed by containing heavy ions into the glass plate 180 and heating the plate to thereby diffuse the ions. Further, the laser beam may be input into the reverse side surface 180r of the plate 180, then reflected from the beam entrance surface 180f thereof with an optical reflection film, and thereafter again passed through the reverse side surface 180r to the outside. Moreover, in place of providing a phase difference by the use of the optical multilayer film 180b, the optical transmission of the plate 180 may be changed (by, for example, shading part of light) so as to adjust the amount of light to form a circular beam waist spot.

Figure 19:
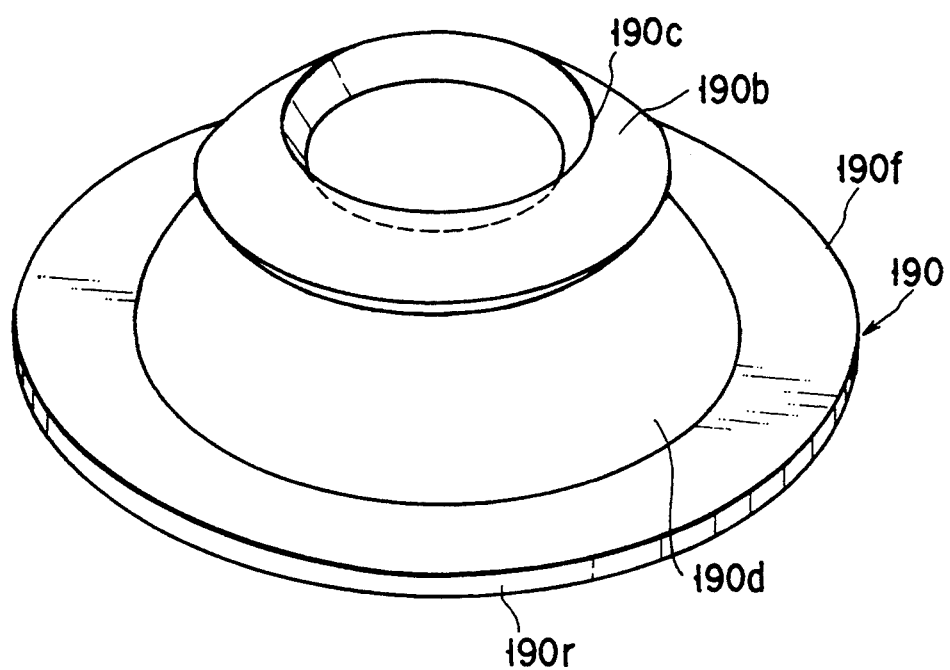
FIG. 19 is a schematic view, showing a super-resolution element according to a second embodiment of the invention.

FIG. 19 shows a super-resolution element 190 includes of the objective lens 120 shown in FIG. 2 and a projecting portion 190b formed on the curved surface thereof.

Specifically, an annular projecting portion 190b defined by two concentric border circles is formed on the main body of the super-resolution element 190 (i.e., the main body of the lens 120), thereby providing three beam-transmitting portions, i.e., the annular projecting portion 190b, a circular concave portion 190c defined inside the portion 190b, and a peripheral concave portion 190a defined outside the portion 190b.

Since the super-resolution element 190 has a refractive power, i.e., curvature and functions as a lens, the surface of the circular concave portion 190c has substantially the same curvature as the surface of the peripheral concave portion 190a. The projecting portion 190b has a curvature selected so that its surface could provide the same refractive power as the surface of each of the portions 190a and 190c. The portion 190b can be formed easily as in the case of the super-resolution element 10 shown in FIG. 1.

When a laser beam is guided from the reverse side 190r of the element 190 to the beam entrance surface 190f thereof in the Z direction, it can be split into three wavefronts having characteristics corresponding to the three portions 190a, 190b, and 190c, as in the case of the super-resolution element 10.

Thus, after the laser beam passes through the element 190, it is separated into first and third beams corresponding to the portions 190a and 190c having the same optical path length, and a second beam corresponding to the portion 190b having a longer optical path length.

As in the case of the first embodiment shown in FIGS. 1, 17, and 18, setting to an optimal value the distance between the annular projecting portion 190b and the other portions 190a and 190c can provide a phase difference of $\pi$ ($+2n\pi$, n:integer) [rad.] between the first and second light beams. Similarly, a phase difference of $\pi$ ($+2m\pi$, m:integer including m=n) [rad.] can be made between the second and third light beams. Accordingly, the phase difference between the first and third light beams becomes $2l\pi$ (l:integer including l=n=m)[rad.].

Figure 20:
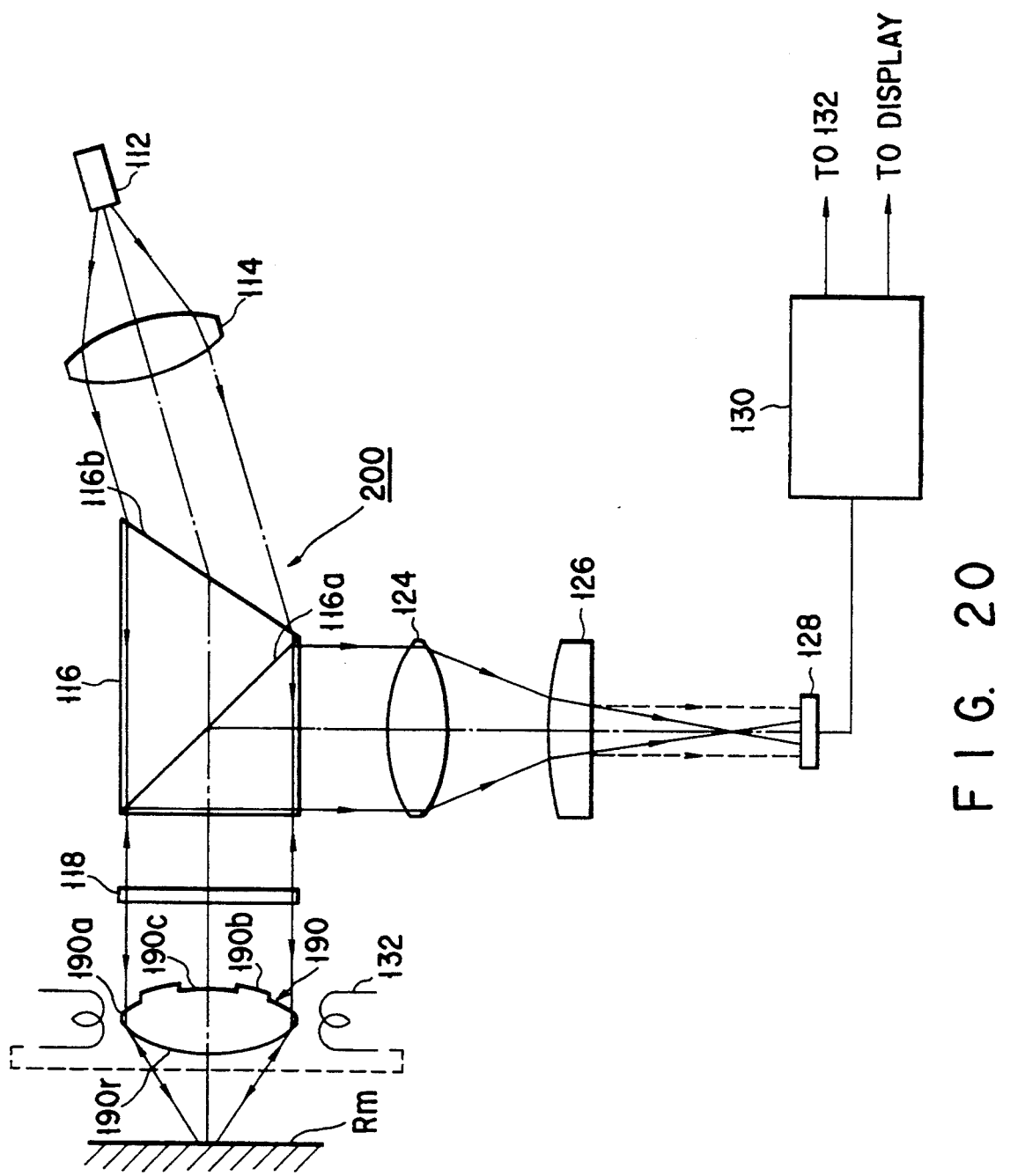
FIG. 20 is schematic view, showing an optical head device provided with the super-resolution element of FIG. 19.

FIG. 20 shows an optical disk apparatus employing the convex type super-resolution element shown in FIG. 19. In FIG. 20, elements substantially identical to those shown in FIG. 2 are denoted by corresponding reference numerals, and detailed explanations thereon are omitted.

An optical disk apparatus 200 is a light source having the laser element 112 for generating a light beam, the polarization beam splitter 116, and the photodetector 128 for detecting a reflected laser beam and reproducing the reflected beam as data stored in an optical disk Rm.

The collimating lens 114 is provided between the laser element 112 and polarization beam splitter 116, and the phase shifting plate 118 and super-resolution element 190 between the polarization beam splitter 116 and optical disk Rm. The element 190 can converge a laser beam with super resolution, as is explained referring to FIG. 20.

Between the polarization beam splitter 116 and photodetector 128, there are interposed the focus lens 124 for converging on the detection surface of the photodetector 128 a laser beam split by the polarization splitter 116, and the cylindrical lens 126 for creating a control laser beam to be used to control the position of the super-resolution element 190 with the aim of focusing and tracking.

The optical disk apparatus 200 operates in substantially the same manner as the optical disk apparatus 100 shown in FIG. 2, thereby reading and writing data from and into the optical disk Rm. Since the super-resolution element 190 functions as an objective lens, data stored in the optical disk Rm can be read out accurately, and data can be written with high recording density.

FIG. 21 shows a modification of the convex type super-resolution element of FIG. 19. As is shown in FIG. 21, a super-resolution element 210 has an optical multilayer film (i.e., phase-changing, refractive index-changing, or light transmittance-changing film) 210b formed on a desired portion of the refractive surface of a convex lens, as in the case of the super-resolution element 180 shown in FIG. 18. Accordingly, a local change in refractive index, a change in phase, or a change in the amount of transmitted light can be performed.

FIG. 22 shows another modification of the super-resolution element of FIG. 19. In this modification, a projecting portion 220b is formed on a lens 220 and defined by a border ellipse. As in the case of FIG. 17, the border line of each portion of the lens 220 is formed elliptical such that it corresponds to the elliptical beam spot of a laser beam. This structure can correct the shape of the beam spot of a laser beam from the beam splitter 116 (shown in FIG. 2 or 20), to a substantial circle. That is, as is shown in FIG. 22, the shape of the projecting portion 220b is an ellipse, which has a major axis corresponding to the major (Y) axis of the beam spot of the laser beam, and a minor axis corresponding to the minor (X) axis of the same. More specifically, the projecting portion 220b has optical characteristics in which the beam spot is converged in the X direction and diffused in the Y direction. Thus, the lens 220 having the elliptical projecting portion 220b can remove elliptical components remaining in the beam spot. Further, as in the case of FIG. 17, if the aspect ratio of the beam spot is relatively low, the laser beam-entrance surface 116b of the beam splitter 116 may have no ellipse-correcting function generally required therein.

If the super-resolution element of the invention is used in an optical microscope, locating the element between the objective lens and the position in which the image (including the virtual image) of an object to be measured can provide a clear image with a high resolution free from interference of peripheral images.

FIG. 23 shows a further embodiment differing from those of FIGS. 1, 17 to 19, 21, and 22.

As is shown in FIG. 23, a super-resolution element 230 is divided by first and second border lines 230a and 230b, which are substantially parallel with each other and define a portion 230c projecting from surface portions 230d. The border lines 230a and 230b are perpendicular to the line of a direction in which data items or pits (not shown) are aligned in the optical disk Rm of FIG. 2 or 20. That is, those border lines are perpendicular to the tangential line of each track (not shown).

In the super-resolution element 230, the above-described super resolution will occur between the projecting portion 230c and the surface portions 230d. Thus, setting to an optimal value the ratio of the area of the projecting portion 230c to those of the surface portions 230d can limit the width of the beam spot of a laser beam having passed through the super-resolution element 230, to a value at which the beam only covers one track of the disk Rm and the pit formed in the track. In this case, the beam spot of a laser beam having passed through the projecting portion 230c will have a shape obtained by cutting both side portions from a circular beam spot. Accordingly, the width (size) of the beam spot can be adjusted to a value at which the pit formed in the track is read out accurately, without reducing the peak level of the intensity of the beam spot.

In a case where the super-resolution element 230 is of a phase-shift type, it is a matter of course in view of the above-described embodiments that the projecting portion 230c has a structure in which the phase of a laser beam component having passed therethrough can differ by $\pi+2n\pi$ [rad.] from that of a laser beam component having passed through each of the surface portions 230d. It is also a matter of course that the projecting portion 230c has a light transmittance lower than the portions 230d in a case where the element 230 is of a light amount-change type. This can reduce the rate of crosstalk which will be secondarily caused from tracks adjacent to the target track by sidelobes occurring around a central beam spot, which generally has a desired size and optical intensity.

FIG. 24 shows a modification of the super-resolution element of FIG. 23.

As is shown in FIG. 24, a super-resolution element 240 is divided by first through fourth border lines 240a to 240d substantially parallel with one another, into three surface portions 240$_{e1}$, 240$_{e2}$ and 240$_{e3}$ and two projecting portions 240$_{f1}$ and 240$_{f2}$ each formed between each adjacent two of the surface portions 240$_{e1}$ and 240$_{e3}$.

The portion 240$_{e2}$ located at the center of the element 240 is perpendicular to the line of a direction in which data items or pits (not shown) are aligned in the optical disk Rm of FIG. 2 or 22. That is, it is perpendicular to the tangential line of each track.

The surface portions 240$_{e1}$ to 240$_{e3}$ are formed such that laser beam components having passed therethrough can have substantially the same phase. On the other hand, the projecting portions 240$_{f1}$ and 240$_{f2}$ are formed such that laser beam components having passed therethrough can have substantially the same phase, and at the same time can have a phase difference of about $\pi+2n\pi$ [rad.] between the laser beam component having passed through the projecting portion 240$_{f1}$ or 240$_{f2}$ and the laser beam component having passed the surface portion 240$_{e1}$, 240$_{e2}$, or 240$_{e3}$.

Accordingly, the beam spot of the laser beam having passed through the super-resolution element 240 has a shape obtained by cutting both side portions from a circular beam spot, and is in a state where the intensity of the sidelobe occurring in the vicinity of the central spot is greatly reduced. Thus, the width (size) of the beam spot can be adjusted to a value at which each pit formed in tracks can be scanned accurately without reducing the peak level of the beam spot intensity.

FIG. 25 shows an another modification of the super-resolution elements shown in FIGS. 1 and 18.

As is shown in FIG. 25, a super-resolution element 250 has a first portion 250b defined inside a first border circle 250a, a second portion 250d defined between the first border circle 250a and a second border circle 250c substantially concentric with the first border circle, and a third peripheral portion 250e defined outside the second border circle 250c.

The first portion 250b allows all laser beams to pass through, the second portion 250d has a light transmittance slightly lower than the first portion 250b, and the third portion 250e has a light transmittance lower than the second portion 250d.

Figure 3C:
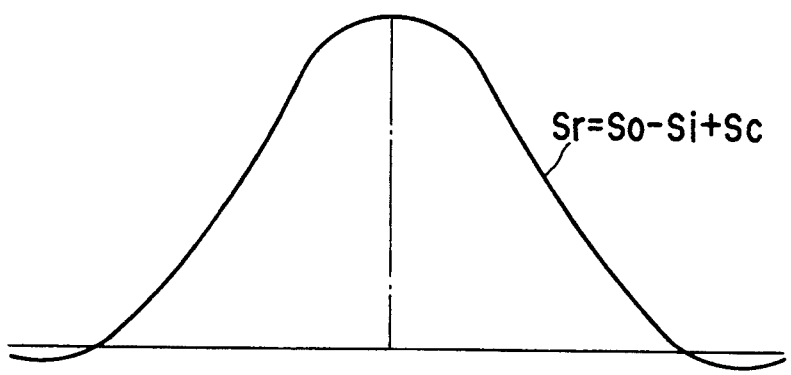

The laser beam having passed through the super-resolution element 250 has characteristics in which the intensity of light is gradually reduced from its center to its periphery. The shape of the laser beam on the optical disk Rm of FIG. 2 or 20 has higher linearity than that shown in FIG. 3C or 11D, and is similar to a right-angled isosceles triangle or a cone. The intensity of the laser beam having passed through the super-resolution element 250 is substantially proportional to current supplied to a semiconductor laser as a light source.

Hence, generally linearly changing the light intensity by the element 250 can easily change the size of a recording mark when multivalued data items are recorded in a recording medium with the use of a laser beam having a plurality of light intensities.

As is shown in FIG. 26, a super-resolution element 260 has a projecting portion 260c defined by first and second border lines 260a and 260b, which are arranged not parallel with each other, and first and second outer portions 260d and 260e defined outside the first and second border lines 260a and 260b, respectively. In the element 260, the projecting portion 260c is located in a direction in which data items or pits (not shown) are aligned in the optical disk 22. That is, the projecting portion 260c is located perpendicular to the tangential direction of each track (not shown).

The beam spot of a laser beam having passed through the super-resolution element 260 is shaped like a deformed oblong, which has an end with a larger radius than the other end, such as a drop of water or an egg. This is advantageous to make uniform the shape, in particular, the width of a recording mark or pit formed in the optical disk. Specifically, the shape of the beam spot of a beam having passed through the element 260 is influenced by the inclinations of the border lines 260a and 260b (i.e., the shape of the projecting portion 260c) and the directions in which these border lines extend. Thus, the intensity of a laser beam necessary to form a pit can be gradually reduced toward the rear end of the pit, by defining the shape of the projecting portion 260c such that the beam spot becomes, on the optical disk, a deformed oblong which has a front end portion corresponding to the front end of the pit and having a diameter larger than its rear end portion.

The above structure can make it possible to do without a conventional complicated beam control to be used to maintain the width of a pit at a predetermined value, for example, a control for changing the intensity of a laser beam between a position corresponding to the front end of a pit and a position corresponding to the rear end of the pit when the pit is formed or recorded.

FIG. 27 shows a modification of the super-resolution element shown in FIG. 26.

As is evident from FIG. 27, a super-resolution element 270 has substantially the same structure as the super-resolution element 260 shown in FIG. 26, except that regions 270c, 270d, and 270e defined by border lines 270a and 270b have shapes differing from the regions 260c, 260d, and 260e, respectively. Accordingly, it is a matter of course that the element 270 has substantially the same function as the element 260.

FIG. 28 shows another modification of the super-resolution element of FIG. 19.

In this modification, a super-resolution element 280 has a projecting hemispherical portion, which has a groove region 286 defined by first and second border lines 282a and 282b curving substantially parallel with each other. More specifically, the element 280 has first and second regions 284a and 284b of substantially the same area and the groove region 286 interposed therebetween. The groove region 286 is perpendicular to the line of a direction in which data items or pits (not shown) are aligned in the optical disk Rm of FIG. 2 or 20. That is, the groove region 286 is perpendicular to the tangential line of each track (not shown). Further, the groove region 286 and first and second regions 284a and 284b have curvatures set so that they can have the same refractive index.

In the super-resolution element 280, super resolution will be realized between the groove region 286 and first and second regions 284a and 284b. Specifically, the phase of each of laser beam components having passed through the regions 284a and 284b is shifted by $\pi + 2n\pi$ [rad.] from the phase of a laser beam component having passed through the groove region 286. Thus, as is explained above, optimizing the ratio of the area of the groove region 286 to that of the region 284a or 284b can limit the spot width of a beam having passed through the element 280 to such a value as covers one track (not shown) and each pit formed in the track.

Since the element 280 has a predetermined curvature, the laser beam having passed therethrough has a beam spot, which has a desired size and a shape obtained by removing both opposite side portions from a circle. Thus, the rate of crosstalk which may occur from tracks adjacent to the target track as a result of occurrence of sidelobes around the central beam spot is reduced.

Figure 29:
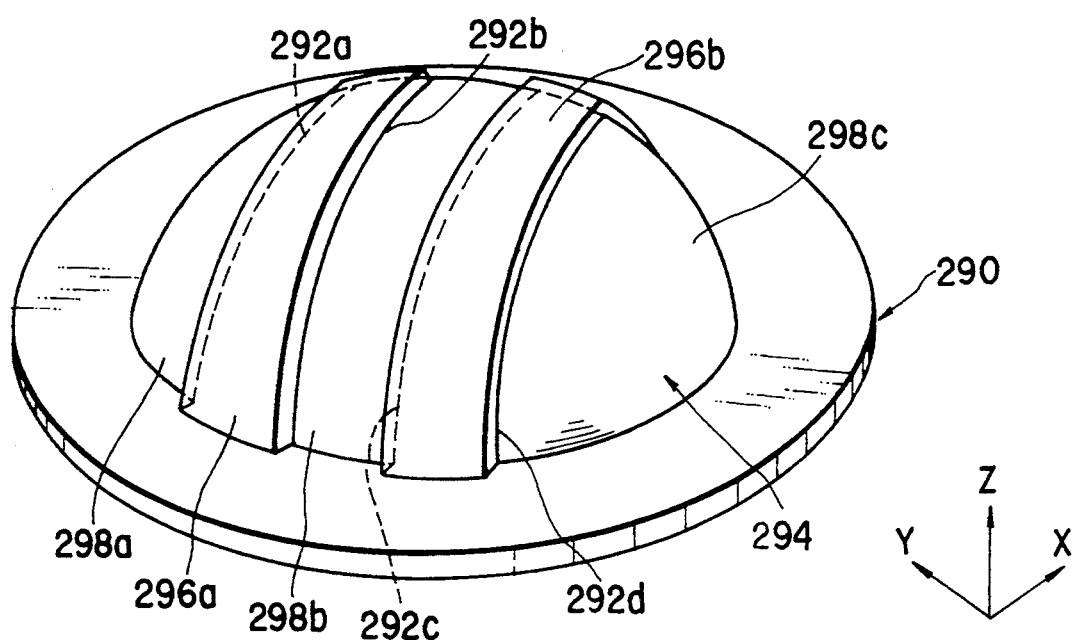
FIG. 29 is a schematic view, showing a first variation of the super-resolution element of FIG. 28.

FIG. 29 shows a modification of the super-resolution element of FIG. 28.

As is shown in FIG. 29, a super-resolution element 290 has a projecting hemispherical portion 294. The hemispherical portion 294 has projecting regions 296a and 296b defined by first through fourth border lines 292a–292d curving generally parallel with one another. Thus, the portion 294 is divided into the two projecting regions 296a and 296b and first through third surface regions 298a, 298b, and 298c. The second surface region 298b located at almost the center of the element 290 is perpendicular to the line of a direction in which data items are aligned in the optical disk Rm of FIG. 2 or 20. That is, the groove region 286 is perpendicular to the tangential line of each track (not shown) in which pits are aligned. The phase of a laser beam component having passed through each of the projecting regions 296a and 296b is shifted by $\pi + 2n\pi$ [rad.] from the phase of a laser beam component having passed through the second surface region 298b. The phase of a beam component having passed through each of the first and third surface regions 298a and 298c is shifted by $\pi + 2n\pi$ [rad.] from the phase of the laser beam component having passed through the projecting region 296a or 296b. It is a matter of course that the phase of the laser beam component having passed through the second surface region 298b is identical to the phase of the laser beam component having passed through each of the first and third surface regions 298a and 298c.

The laser beam having passed through the super-resolution element 20 has a beam spot substantially identical to the element 280 of FIG. 28.

Figure 30:
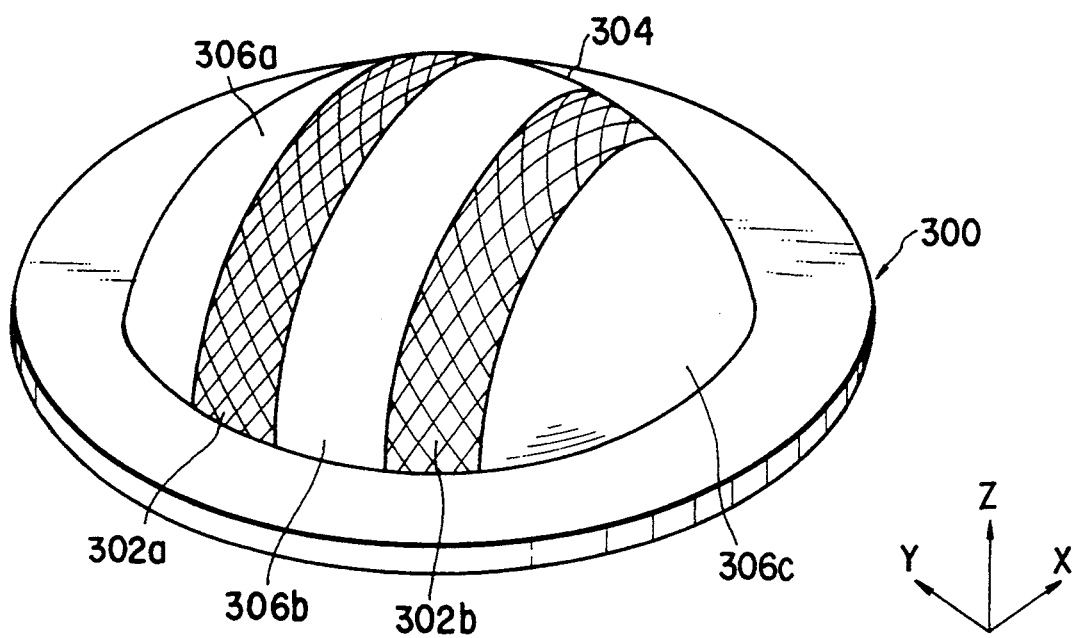
FIG. 30 is a schematic view, showing a second variation of the super-resolution element of FIG. 28.

FIG. 30 shows another modification of the super-resolution element of FIG. 28.

As is shown in FIG. 30, a super-resolution element 300 has optical multilayered strip films 302a and 302b extending in generally parallel with each other on the hemispherical portion 304 of its body. These multilayered films 302a and 302b are phase-varied layers, refractive-index varied layers, or transmittance-varied layers, and are produced in the same manner as the super-resolution element shown in FIGS. 18 and 21. Thus, the element 300 has first through third regions 306a, 306b, and 306c defined by the films 302a and 302b. Like the above-described embodiments, the second region 306b located at substantially the center of the element 300 is perpendicular to the tangential line of each track (not shown).

Like the super-resolution element 290 of FIG. 29, in the super-resolution element 300, the phase of a laser beam component having passed through each of the optical multilayered films 302a and 302b is shifted by $\pi + 2n\pi$ [rad.] from the phase of a laser beam component having passed through the second region 306b. Further, the phase of a laser beam component having passed through each of the first and third regions 306a and 306b is shifted by $\pi + 2n\pi$ [rad.] from the phase of the laser beam component having passed through each of the multilayered films 302a and 302b. The phase of the laser beam component having passed through the second region 306b is substantially identical to the phase of the laser beam component having passed through each of the first and second regions 306a and 306c.

FIG. 31 shows one of the above-described super-resolution elements, which is used as a laser exposer unit incorporated in a laser beam printer apparatus so as to radiate a laser beam to a photoconductor drum.

In FIG. 31, a laser beam printer apparatus 400 has a semiconductor laser element (light source) 402, a deflector unit 406 for deflecting a laser beam output from the laser element 402, a photoconductor drum 412 on which an electrostatic latent image corresponding to the deflected laser beam is formed, and an image output unit (not shown) for visualizing the latent image and printing the same on a record medium.

An H-sync detector 414 for detecting horizontal synchronization of a laser beam (in a main scanning direction, hereinafter referred to) is provided at a location in the vicinity of the photoconductor drum 412, at which the detector does not adversely affect an image-forming region defined on a recording surface of the drum 412.

A first lens group 404 for diminishing the beam spot of the laser beam, output from the laser 402, to a size required in the laser beam printer apparatus is interposed between the laser 402 and the deflector unit 406. Further, a second lens group 408 for controlling all components of the laser beam substantially linearly radiated via the deflector unit 406 to the drum 412, so that they can reach overall portions of the drum 412 at almost the same speed.

The first lens group 404 includes a collimate lens 404a for converting the laser beam, output from the laser 402, to a parallel beam, and a super-resolution element 416 for diminishing the beam spot of the laser beam having passed through the collimate lens 404a, and increasing the intensity of the laser beam, and a cylindrical lens 404b for causing the laser beam, having passed through the element 416, to enter the reflection surface of the deflector unit 406 at right angles thereto. It is a matter of course that the super-resolution element according to any of the above-described embodiments is used as the super-resolution element 416. A refractive power exerting in a direction perpendicular to a direction of deflection (=the rotational direction of the reflection surface, i.e., sub-scanning direction) at the deflector unit 406 is given to the cylindrical lens 404b. The deflector unit 406 includes a polygonal mirror 406a having a plurality of rotatable reflection surfaces, an electrical motor 406b for rotating the polygonal mirror 406a, etc. The reflection surfaces of the mirror 406a is formed flat or non-spherical, depending upon an f$\theta$-lens, hereinafter referred to.

The second lens group 408 includes first and second f$\theta$-lenses 408a and 408b for giving desired optical characteristics to the laser beam, and a mirror 410 for reflecting the laser beam, having passed through the second f$\theta$-lens 408b, toward the photoconductor drum 412. The first f$\theta$-lens 408a is a non-spherical lens, and has substantially the same refractive power as the cylindrical lens 404b, which exerts in substantially the same direction as that of the cylindrical lens 404b (i.e., in the sub-scanning direction). The first f$\theta$-lens 408a reduces the amount of deviation in the position of the laser beam on the photoconductor drum 412, due to the inclination of each reflection surface. The second f$\theta$-lens 408b is a toric lens having a refractive power exerting only in the deflecting direction, i.e., main scanning direction, of the deflector unit 406. The second f$\theta$-lens 408b cooperates with the first f$\theta$-lens 408a to determine the position of the laser beam (which is reflected linearly from each reflection surface of the polygonal mirror 406a) on the recording surface of the photoconductor drum 412 in accordance with the angle of rotation of the reflecting surface.

The photoconductor drum 412 is coupled with a driving mechanism (not shown) for rotating the drum 412 at a desired speed in a desired direction, i.e., in the sub scanning direction perpendicular to the main scanning direction.

The H-sync detector 414 detects that part of the laser beam which is directed from the second f$\theta$-lens 408b to the photoconductor drum 412, and supplies an H-sync signal to a control device (not shown).

When a binary printing signal containing data on image to be printed out is input from an input device (not shown), the laser 402 is turned on/off in accordance with the printing signal. Thus, the laser beam intermittently output from the laser 402 is converted to a parallel beam by the collimate lens 404a, and then is converted to a converged beam with a desired beam spot size by means of the super-resolution element 416. The laser beam having passed through the element 416 is continuously directed to the reflection surfaces of the polygonal mirror 406a, and then continuously reflected therefrom toward the photoconductor drum 412 at a constant angular speed in accordance with rotation of the reflection surfaces. The continuously reflected (i.e., deflected) laser beam is substantially linearly radiated onto the drum 412 via the first and second f$\theta$-lenses. The position of the laser beam on the drum 412 is determined in accordance with rotation of the reflection surfaces of the polygonal mirror 406a.

Since the laser beam is intermittently radiated onto the photoconductor drum 412, an electrostatic latent image corresponding to intermittent image data is formed on the outer surface (i.e., recording surface) of the drum 412. The latent image is visualized by a visualizing agent, such as toner or ink, supplied from a developing device (not shown) or a printing head. The visualized latent image toner or ink is transferred onto a recording sheet of paper, and output as a hard copy.

As is explained above, the super-resolution element 416 can reduce the beam spot size of the laser beam, so that a hard copy of high accuracy and resolution can be obtained. Further, the element 416 can prevent the intensity of the laser beam from reducing, which enables the polygonal mirror 406a to operate at high speed and hence enables the printing speed to increase.

Figure 32:
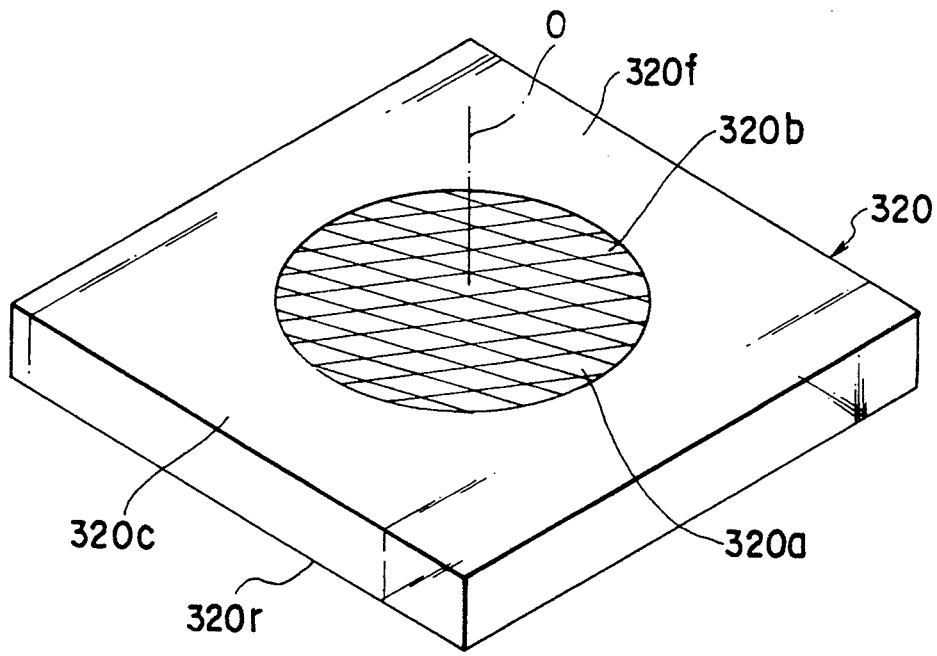
FIG. 32 shows a further embodiment of the invention, employing an optical intensity-changing plate to be used to provide a beam spot of a diameter smaller than a value limited by the refractive index of an objective lens employed.

FIG. 32 shows a light intensity-changing plate for use in any one of the optical disk apparatus and the image forming apparatus.

As is shown in FIG. 32, the light intensity-changing plate (i.e., state-changing means) 320 for causing a local change in optical intensity is made of a transparent material which can pass a laser beam, such as plastic (e.g., transparent acrylic, transparent polycarbonate, or transparent ABS resin) or glass. The optical intensity-changing plate 320 has an optical amount-changing region 320a formed in its upper surface 320f or lower surface 320r.

More specifically, the optical amount-changing region 320a is formed inside a border circle 320b surrounding the optical path O in which a laser beam Lf (or a reflected laser beam Lr) passes. An optical amount control material, such as carbon black, silicon, or a thin metal is deposited or coated in the optical amount-changing region 320a, for shading or absorbing the laser beam or scattering the same in its entrance direction. The optical amount control material may be impregnated in the transparent plate body of the plate 320. Further, the refractive index of the control material can be locally changed by ion substitution. A region 320c outside the border circle 320b (hereinafter referred to as "peripheral region") has the same optical characteristics as the transparent plate body.

Figure 33:
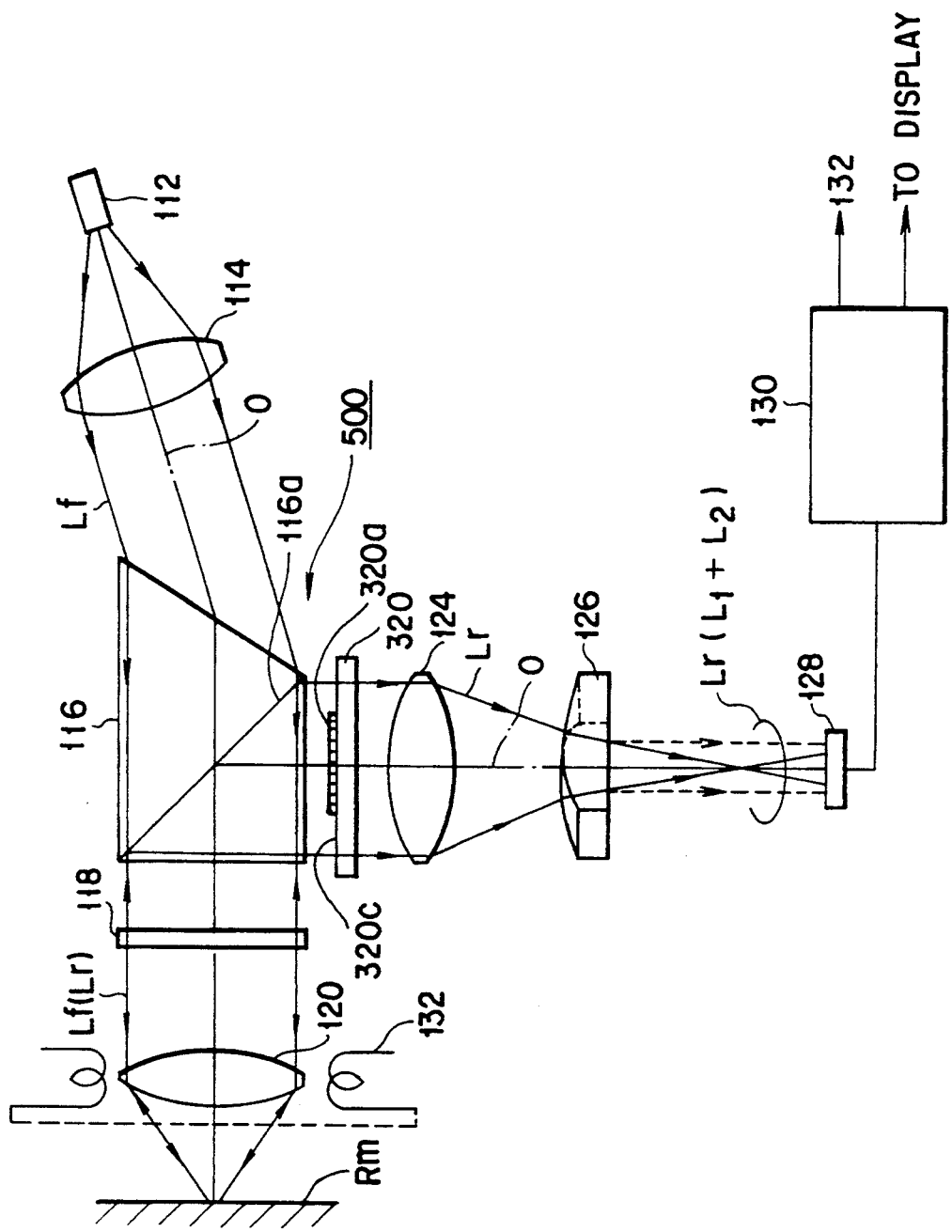
FIG. 33 shows an optical head device employing the optical head device of FIG. 23 and differing from those of FIGS. 2 and 20.

FIG. 33 shows an example in which the optical intensity-changing plate 320 shown in FIG. 32 is combined with the optical head device shown in FIG. 2. Like the above-explained embodiments, a like element is denoted by a like reference numeral, and a detailed explanation thereon is omitted.

An optical head device 500 includes the semiconductor laser 112 for generating a laser beam Lf with an elliptical beam spot So toward the optical disk Rm, and the polarization splitter 116 for directing the laser beam Lf toward the disk Rm, and splitting a laser beam Lr reflected by the disk Rm, from the beam Lf. The collimate lens 114 for converting the laser beam Lf to a parallel beam is interposed between the laser 112 and polarization beam splitter 116. An objective lens 120 is interposed between the splitter 116 and disk Rm.

In a direction in which the reflected laser beam Lr split by the polarization beam splitter 116 passes, the photodetector 128 for converting the reflected laser beam Lr to an electrical signal is located. The focus lens 124 and cylindrical lens 126 are located in the order between the splitter 116 and detector 128. The optical intensity-changing plate 320 shown in FIG. 32 is interposed between the splitter 116 and lens 124 at a portion in the far field (in which Fraunhofer's refraction can occur) of a laser beam having passed through the objective lens 120.

The laser beam Lf generated by the laser 112 is converted to a parallel beam by the collimate lens 114, and corrected by the polarization beam splitter 116 to have a substantially circular beam spot. The beam Lf having passed through the splitter 116 enters into the objective lens 120, where it is converged and radiated onto the recording surface of the optical disk Rm.

The laser beam radiated onto the recording surface is reflected therefrom. The reflectance of that portion of the recording surface onto which the beam is radiated locally varies in accordance with whether or not data is stored therein. The reflected laser beam Lr again passes through the objective lens, and returns to the polarization beam splitter 116, where it is reflected toward the optical intensity-changing plate 320, cylindrical lens 126, and photodetector 128.

In the plate 320, the beam spot size of the laser beam Lr is made smaller than a value limited by the refractive index of the objective lens 120, and then the beam Lr is guided onto the detection surface of the photodetector 128.

Specifically, when the reflected laser beam Lr has entered the optical intensity-changing plate 320 from its lower side 320r to the upper side 320f in the Z direction, the plate 320 splits the beam Lr into two wavefronts having characteristics corresponding to the optical amount-changing region 320a and peripheral region 320c, respectively. That is, the beam Lr is split into a first laser beam component L1 having passed through the optical amount-changing region 320a and having its intensity reduced, and a second laser beam component L2 having passed through the peripheral region 320c. Thus, by virtue of the super resolution effect on the first and second laser beam components L1 and L2 having passed through the optical amount-changing plate 320, the intensity of a higher-order beam component of the laser beam (L1+L2=Lr) is emphasized, so that the beam Lr can have a beam spot with a substantially effective energy distribution, which is smaller than a beam spot obtained by the conventional device.

The laser beam Lr is transmitted from the photodetector 128 to the signal processing circuit 130, where it is reproduced as data stored in the optical disk Rm, as in the optical head devices shown in FIGS. 2 and 20. Further, the lens coil 132 is energized to appropriately control the distance between the objective lens 120 and optical disk Rm and positions thereof.

Figure 34:
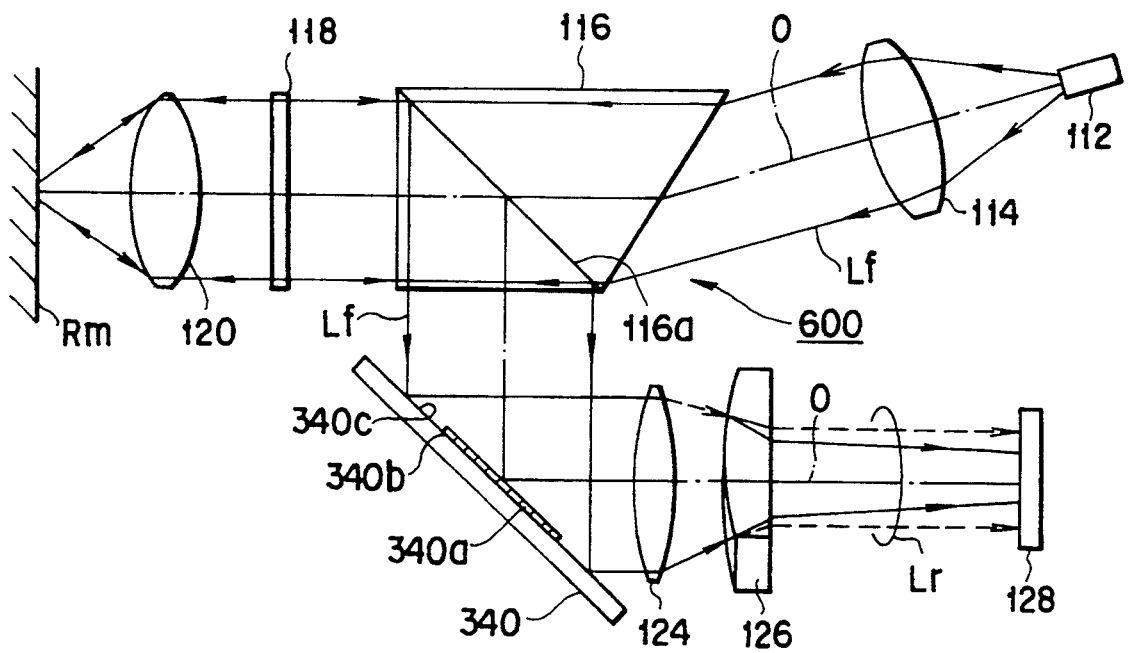
FIG. 34 shows a first modification of the optical head device of FIG. 33.

FIG. 34 shows an optical head device which differs from the apparatus shown in FIG. 33. In FIG. 34, too, a like element is denoted by a like reference numeral, and a detailed explanation thereon is omitted.

An optical head device 600 includes the semiconductor laser 112, the collimate lens 114, the polarization beam splitter 116, and the objective lens 120, which are arranged in this order toward the optical disk Rm, and further a reflection-type optical intensity-changing plate 340, the focus lens 124, the cylindrical lens 126, and the photodetector 128, which are located diverging from the splitter 116.

The reflection-type optical intensity-changing plate 340 has a reflection member with a locally-varied reflectance, provided on a desired surface of an optical intensity-changing plate body made of a material with high surface smoothness. For example, the plate 340 consists of a glass plate having one surface provided with a low-reflectance region 340a inside a border circle 340b, and a high-reflectance region 340c outside the circle 340b. Forming the low-reflectance region 340a inside the high-reflectance region 340c enables the plate 340 to have substantially the same function as the plate 320 shown in FIG. 32.

The plate 340 may consist of an optical glass plate provided only with the border circle 340b and the high-reflectance region 340c outside the circle 340b, or may containing a metal mirror having a central portion with a lower reflectance than the other portion.

The laser beam Lf is radiated from the laser 112 onto the recording surface of the optical disk Rm, and then reflected therefrom at a reflectance which varies in accordance with whether or not data is stored therein. The laser beam Lr reflected from the optical disk Rm is guided via the polarization beam splitter 116 onto the optical intensity-changing plate 340, where the beam spot size of the laser beam Lr is made smaller than a value limited by the refractive index of the objective lens 120. Then, the beam Lr is guided onto the detection surface of the photodetector 128. The beam Lr having passed through the plate 340 is split into two wavefronts (i.e., first and second laser beam components L1 and L2) having characteristics corresponding to the low-reflectance region 340a and high-reflectance region 340c, respectively. By virtue of the super resolution effect of the first and second beam components L1 and L2, the beam Lr (L1+L2) has a beam spot Sa smaller than a natural beam spot Ss. This beam Lr passes through the cylindrical lens 126 functioning as an astigmatizer for focusing and tracking, and is guided to the photodetector 128.

Then, the laser beam Lr is transmitted from the detector 128 to the signal processing circuit 130, where it is reproduced as data stored in the disk Rm, as in the optical head devices shown in FIGS. 2, 20, and 32.

FIG. 35 shows an optical head device which differs from those shown in FIGS. 33 and 34. In FIG. 35, an element similar to that shown in FIG. 33 is denoted by a corresponding reference numeral, and a detailed explanation thereon is omitted.

An optical head device 700 includes the semiconductor laser 112, a polarization wedge prism 716 having a first surface 716a (facing the laser 112) provided with a polarization reflection layer 350, and an image-forming objective lens 718 for converging the laser beam Lf generated from the laser 112, onto the optical disk Rm, and causing the laser beam Lr reflected from the disk Rm, to be converged onto the photodetector 128 which is located in a direction in which the laser beam Lr passes via the prism 716. The prism 716 has a second surface (beam-emitting surface) 716b provided with an optical intensity-changing mask 352 as shown in the partial side view. The prism 716 is located between the optical disk Rm and the beam-emitting surface 716b at a portion in the far field of the objective lens 120, as in the optical intensity-changing plate 320 shown in FIG. 33.

In the optical intensity-changing mask 352, an optical amount control member for shading or absorbing the laser beam, such as a thin metal layer or a silicon layer, is deposited or coated in the region inside the border circle 352b, thereby forming an optical amount-changing region 352a for partially shading or reducing the laser beam Lr passing the prism 716. In addition, the mask 352 is also provided with first and second shading regions 352c and 352d for performing focusing (a so-called double edge method) in an optical head device employing a wedge prism. As shown in the partial side view of FIG. 35, the first and second shading regions 352c and 352d are located corresponding to point-symmetrically-located two regions of that detection surface of the photo-detector 128 which is divided into four square regions defined about the optical axis O.

The laser beam Lf radiated from the laser 112 is guided onto the recording surface of the optical disk Rm via the polarization reflection layer 350 formed on the beam entrance surface of the polarization wedge prism 716. The reflectance of the beam-radiated portion of the disk Rm varies in accordance with whether or not data is stored therein. The beam Lr obtained as a result of reflection of the beam Lf on the disk Rm is guided onto the optical intensity-changing mask 352 through the layer 350 and prism 716. That part of the beam Lr which corresponds to the optical amount-changing region 352a is shaded (or has its intensity reduced) by it, and those parts of the beam Lr which correspond to the first and second shading regions 352c and 352d are divided by them for focusing. The resultant laser beam is guided onto the photodetector 128.

Then, the laser beam Lr is supplied from the detector 128 to a signal processing circuit (not shown), and re-produced as data stored in the disk Rm. Further, a lens coil (not shown) is energized to appropriately control the distance between the image-forming objective lens 718 and optical disk Rm and their positions.

In FIGS. 33 to 35, a mask member equivalent to the shading mask 352 may be provided on the photodetector 128. That is, the optical intensity-changing plates 320 and 340 shown in FIGS. 32 and 33, and the optical intensity-changing mask 352 shown in the partial side view of FIG. 35 may be formed integrally as one piece on the detection surface of the photodetector 128. An example of the detector 128 will now be described with reference to FIG. 36.

As is shown in FIG. 36, an optical photodetector 828 has four detection regions 828a–828d provided for focusing. These regions are defined by first and second lines 828i and 828ii which intersect each other at right angles at the optical axis O. An optical intensity-changing mask 360 is formed on the detection regions 828a–828d, and has a shading region 360a formed around the optical axis O and including the same, for shading or absorbing the laser beam Lr. The region 360a is formed by depositing or coating an optical amount control member (e.g., a thin metal layer or a silicon layer) in a region inside a border circle 360b. The region 360a shades or absorbs the beam Lr, and hence functions like the optical intensity-changing plates 320 and 340 shown in FIGS. 32 and 33. Thus, an optical head device of a more simple structure can be obtained by using the photodetector 828 (FIG. 36) in any of the optical head devices 500, 600, and 700 (FIGS. 33 to 35), in place of the photodetector 128.

Figure 37:
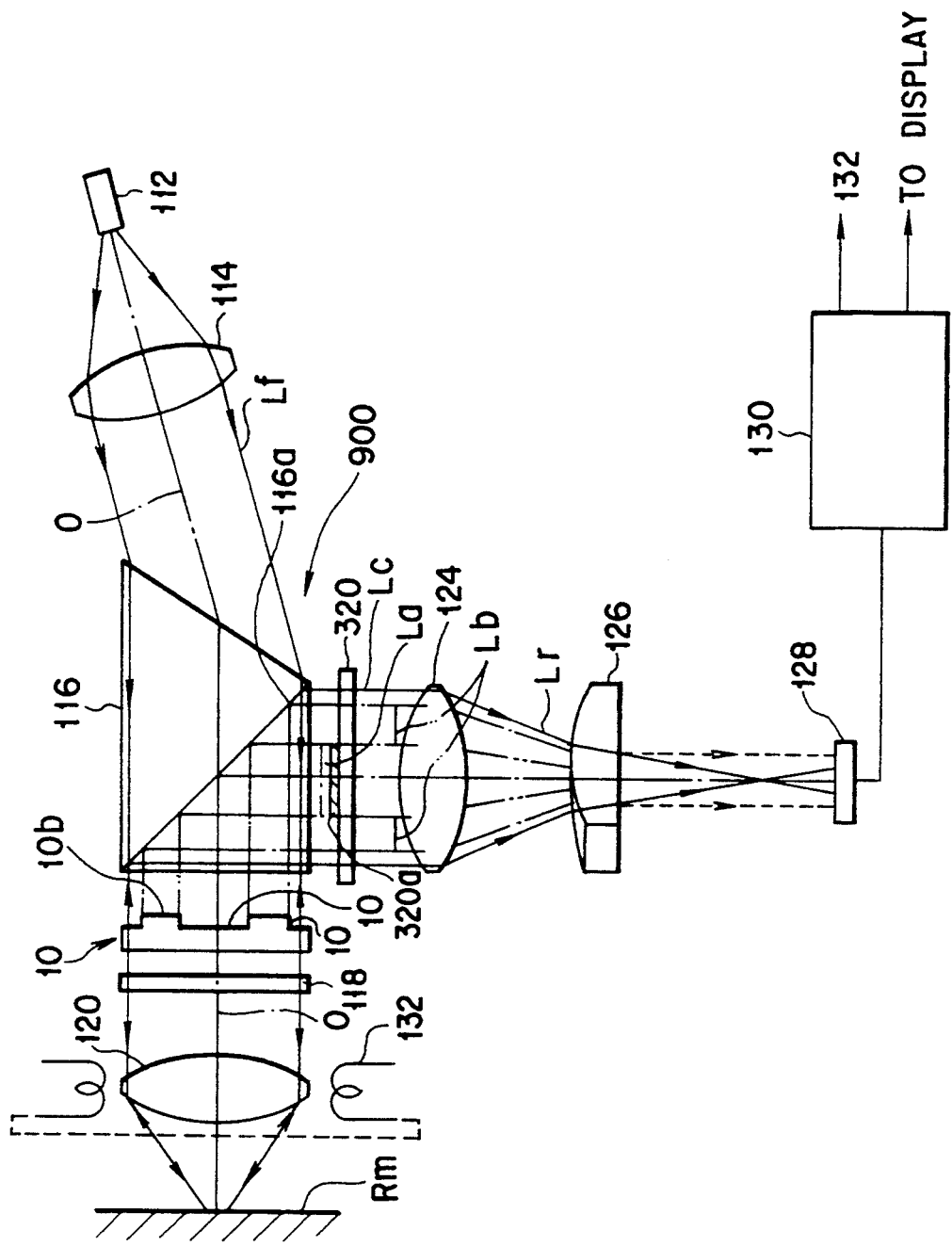
FIG. 37 shows a third modification of the optical head device of FIG. 33.

FIG. 37 shows an optical head device differing from those shown in FIGS. 33 to 35. In FIG. 37, an element similar to that shown in FIG. 33 is designated by a corresponding reference numeral, and a detailed explanation thereon is omitted.

An optical head device 900 includes the semiconductor laser 112, the polarization beam splitter 116, the collimate lens 114 interposed therebetween, the optical disk Rm, and the three-portions apodizer (wavefront characteristics-changing means) 10 shown in FIG. 1 and objective lens 120 interposed between the splitter 116 and disk Rm.

The photodetector 128 is located in a direction in which the laser beam split by the polarization beam splitter 116 passes. The focus lens 124 and cylindrical lens 126 are interposed in this order between the splitter 116 and photodetector 128. There is provided between the splitter 116 and focus lens 124 the optical intensity-changing plate 320 (FIG. 32) for locally changing the optical intensity distribution of the optical disk Rm (i.e., locally changing the intensity of the laser beam Lr). As explained above referring to FIG. 1, in the apodizer 10, the laser beam Lf or Lr is subjected to wavefront splitting. As a result, the phases of each adjacent pair of the components (e.g., La, Lb, and Lc) of the laser beam Lf or Lr are changed from each other.

The beam Lf emitted from the laser 112 passes through the collimate lens 114 and polarization beam splitter 116, and enters the apodizer 10. The beam Lf is subjected to wavefront splitting while passing through the apodizer 10, with the result that three laser beam components are obtained—a first component La having passed through a circular concave portion 10c, a second component Lb having passed through a convex portion 10b, and a third component Lc having passed through a peripheral concave portion 10a. The phase difference between each adjacent two of the components La, Lb, and Lc is $\pi + 2n\pi$ (n:integer) [rad.]. As a result, the laser beam Lf is converted to a beam having a beam spot Ss (see FIG. 38 or 39) of a diameter smaller than that limited by defraction limit, and first and second sidelobes S1 and S2 surrounding the beam spot Ss. The converted beam Lf passes through the objective lens 120, and then reaches the recording surface of the optical disk Rm.

The beam Lf is reflected from the disk Rm. The reflectance of that portion of the disk Rm from which the beam is reflected varies in accordance with whether or not data is stored therein. The laser beam Lr reflected from the disk Rm returns to the objective lens 120, again passes through the apodizer 10, and then reaches the polarization beam splitter 116.

The laser beam Lr is then reflected from the splitter 116 toward the cylindrical lens 126 and photodetector 128, thereby passing through the optical intensity-changing plate 320 ad cylindrical lens 126 in this order, and reaching the detection surface of the detector 128.

The detector 128 converts the laser beam Lr to an electrical signal, which is supplied to the signal processing circuit 130. The circuit 130 reproduces the signal as data stored in the disk Rm, and simultaneously generates an objective-lens control signal for focusing and tracking. In accordance with the control signal, a lens coil (not shown) is energized to thereby appropriately control the distance between the lens 120 and disk Rm and their positions.

A signal to be supplied to the signal processing circuit 130 when data items (pits) stored in the optical disk Rm are read by the optical head device 900 shown in FIG. 37 will be explained hereinbelow. That is, the difference between the head device 900 and the head device 100 shown in FIG. 2 will be explained.

FIGS. 38 to 41 are views, useful in explaining the relation between the density of data items (pits) stored in the optical disk Rm and a signal input to the signal processing circuit 130.

FIG. 38 shows a case where the density of data items (pits) stored in the disk Rm is high (i.e., many pits exist between the beam spot Ss and the first and second sidelobes S1 and S2 of the laser beam Lf). In this case, if no optical intensity-changing plate 320 is used (i.e., only the apodizer 10 is employed), the intensities of all the reflected beam components are reduced because of influence of the sidelobes S1 and S2, thereby reducing the level of the output signal as indicated by the solid line in FIG. 40.

On the other hand, FIG. 39 shows a case where the density of data items (pits) stored in the disk Rm is low (i.e., only few pits exist between the beam spot Ss and the first and second sidelobes S1 and S2 of the laser beam Lf). In this case, undesirable reflection of light (reflection from those portions of the recording surface in which no data is stored) is increased by the sidelobes S1 and S2, thereby increasing the level of the output signal as indicated by the broken line in FIG. 40.

In the above cases, jitter of the output signal, i.e., deviation of the signal level from the threshold level, is increased when the output signal is expressed by a binary number.

As is evident from FIG. 41, the use of the apodizer 10 and optical intensity-changing plate 320 can cause the beam spot size of the laser beam Lr, directed to the photodetector 126, to be smaller than the spot size limited by defraction limit, thereby increasing the intensity of the beam spot. Accordingly, the output signal has substantially the same level irrespective of whether the density of data items is high or low. This can restrain the above-described jitter.

Figure 42:
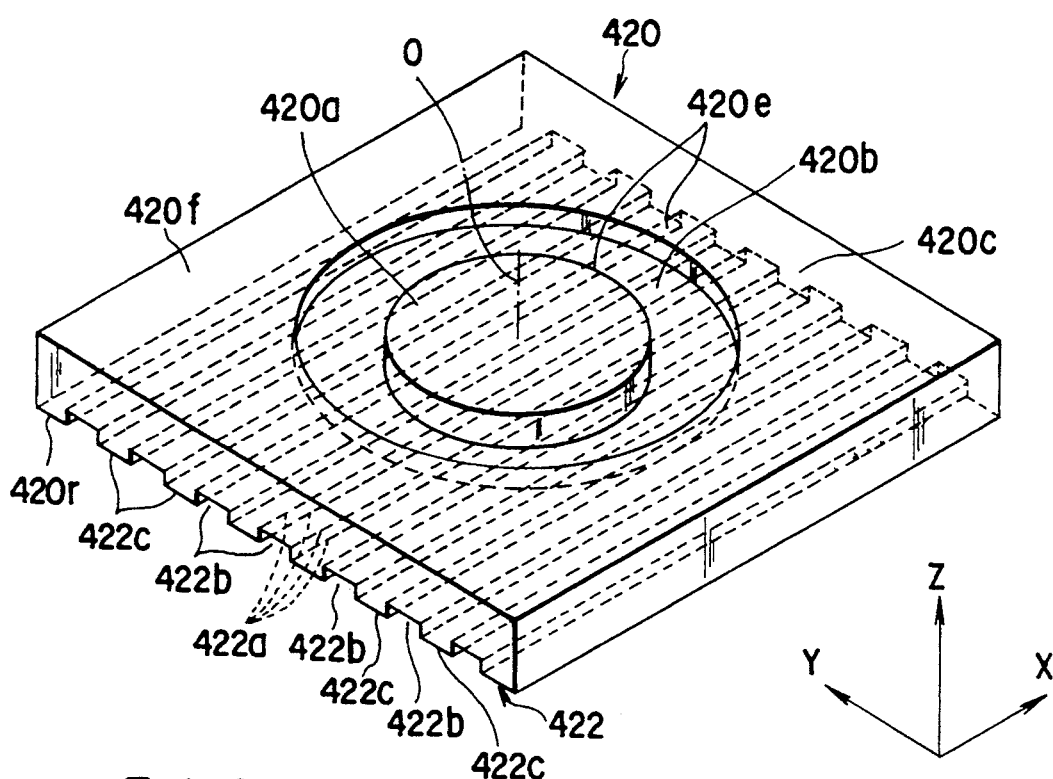
FIG. 42 shows a third modification of the super-resolution element shown in FIG. 1.

FIG. 42 shows a modification which has a structure remarkably differing from the other modifications.

In FIG. 42, an apodizer 420 is made of a transparent material, such as plastic (e.g. transparent acrylic, transparent polycarbonate, or transparent ABS resin) or glass. The apodizer 420 has an annular groove portion (or projecting portion) 420b formed in its upper surface 420f or lower surface 420r. The groove portion 420b is defined by two border circles 420e formed substantially concentrically about the optical axis O. Thus, a circular projecting portion 420a and a peripheral projecting portion 420c are formed inside and outside the groove portion 420b, respectively. The projecting portions 420a and 420c have substantially the same level.

A grating 422 is formed in a surface opposite to the surface having the groove (or projecting) portion 420b formed therein. The grating 422 has a plurality of convex and concave portions 422b and 422c defined by border lines 422a and arranged alternately in parallel with one another and at a desired angle to the direction in which a laser beam L output from a laser element is polarized. The convex portions 422c have the same level as the upper surface 420f (or the lower surface 420r). The grating 422 is formed integral with the apodizer 420 body by holding the body (transparent plate body) between mold components having a desired area, thickness, and convex (concave) portions, and heating and pressurizing the body. Further, the grating can be formed by any other known method for forming an apodizer.

Each part of the apodizer 420 has substantially the same structure and function as one shown in FIG. 1, and hence a detailed explanation thereon is omitted. The use of the grating 422 can enhance the focusing accuracy of an optical head device in which the double edge method is utilized, as is explained above referring to FIG. 35.

Figure 43:
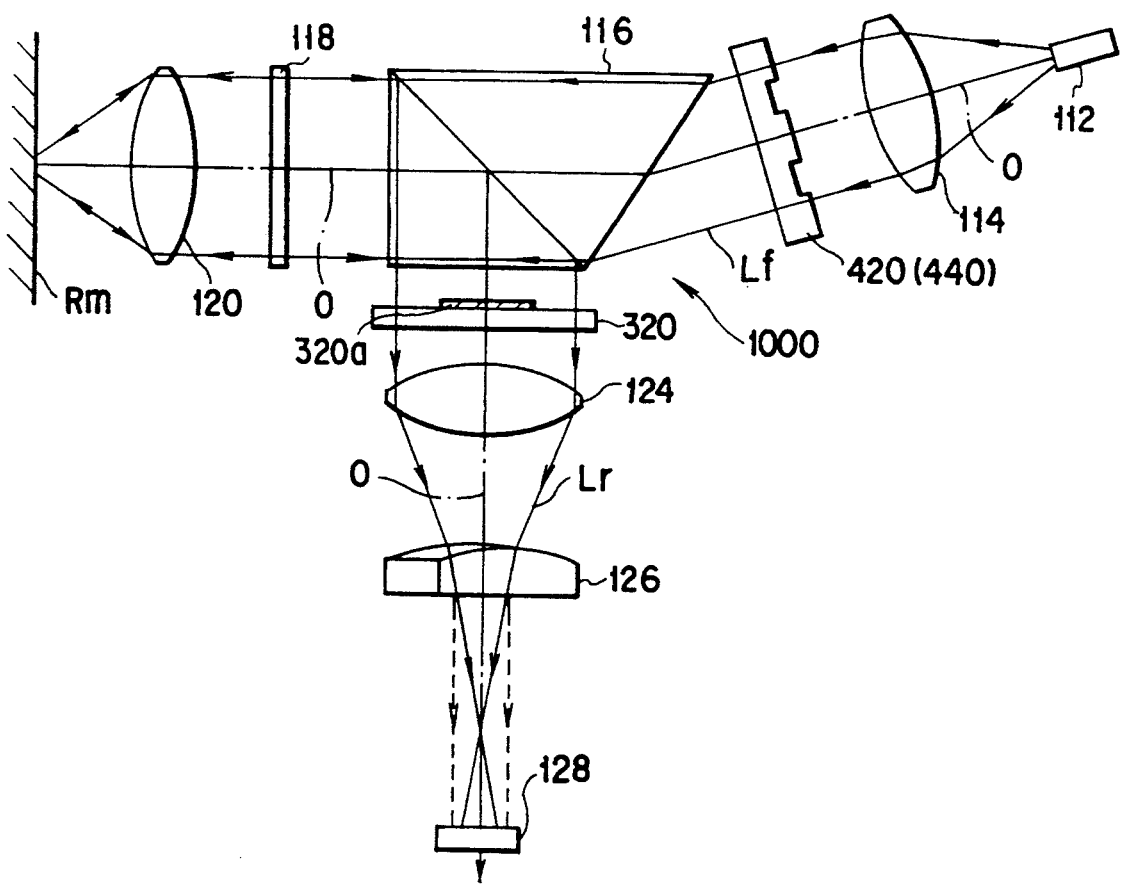
FIG. 43 is a schematic plan view, showing another optical head device employing the optical intensity-changing plate of FIG. 32 and differing from the above head devices.

FIG. 43 shows an example of an optical head device obtained by employing the apodizer 420 of FIG. 42 in the head device of FIG. 37. This head device has a structure substantially identical to that shown in FIG. 37. Thus, in FIG. 43 a like element is denoted by a like reference numeral, and a detailed explanation thereon is omitted.

An optical head device 1000 includes the semiconductor laser 112 and polarization beam splitter 116, and the collimate lens 114 and apodizer 420 are arranged in this order therebetween. The objective lens 120 is interposed between the splitter 116 and optical disk Rm. The order of the positions of the collimate lens 114 and apodizer 420 can be changed as in the other optical head devices.

The photodetector 128 is located in a direction in which the laser beam Lr split by the polarization beam splitter 116 passes. The optical intensity-changing plate 320, focus lens 124, and cylindrical lens 126 are interposed in this order between the splitter 116 and photodetector 128.

In the optical head device shown in FIG. 43, data items (pits) are read out of the optical disk Rm in the same manner as in the head device 900 shown in FIG. 37, and therefore an explanation as regards the manner of data reading is omitted.

Figure 44:
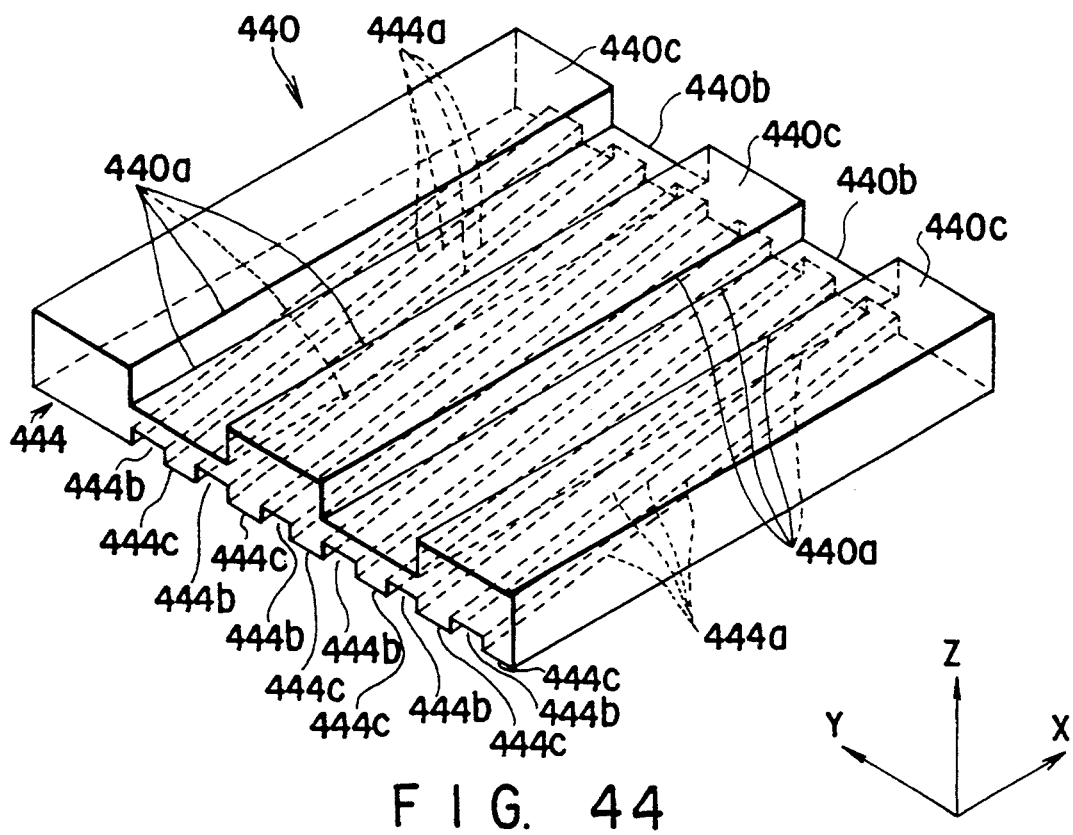
FIG. 44 shows a first variation of the super-resolution element shown in FIG. 42.

FIG. 44 shows a modification of the apodizer shown in FIG. 42.

As is shown in FIG. 44, an apodizer 440 has one surface provided with a plurality of concave portions 440b and convex portions 440c, which are defined by border lines 440a and extend in parallel with one another. Occurrence of undesirable crosstalk from pits (data items) formed in tracks adjacent to the target track can be prevented by aligning the direction in which the concave and convex portions 440b and 440c extend, with the direction in which data items (pits) are arranged in the optical disk Rm.

A grating 444 similar to the grating 422 of FIG. 42 is formed in the other surface of the apodizer 440. As is evident from FIGS. 42 and 44, the grating 444 differs from the grating 422 in that it has concave portions 444b and convex portions 444c defined by border lines 444a and extending at an angle to the X-direction. That is, the grating 444 extends over the grating 422 at a desired angle thereto so that each of the border lines 444a is not parallel with each of the border lines 440a.

The apodizer 440 can restrain an undesirable signal component which may occur at the time of reproducing data from the optical disk Rm. For example, it can reduce the rate of crosstalk occurring from tracks adjacent to the target track, or can prevent the amount of light reflected from the target track from being increased by the sidelobes S1 and S2.

Figure 45:
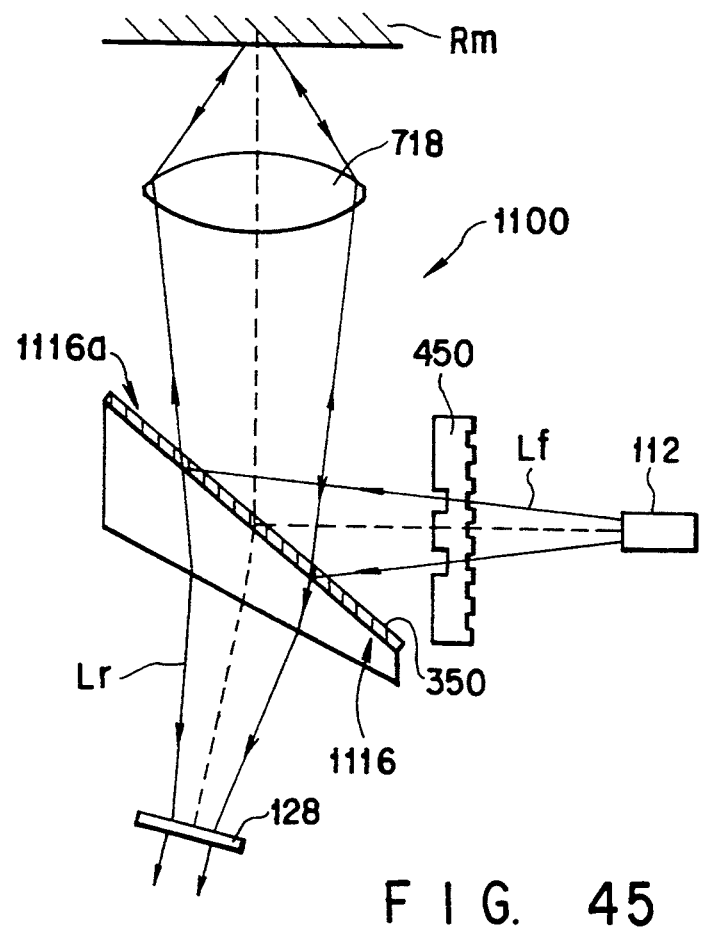
FIG. 45 shows an optical head device suitable for the super-resolution elements of FIGS. 42 and 44, according to a second variation of the super-resolution element shown in FIG. 42.

FIG. 45 shows an example, in which an apodizer having a grating as shown in FIG. 42 or 44 is incorporated in the optical head device shown in FIG. 35. An element similar to that shown in FIG. 35 is denoted by a corresponding reference numeral, and a detailed explanation thereon is omitted.

An optical head device 1100 includes the semiconductor laser 112, a polarization wedge prism 1116 having a surface 1116a (facing the laser 112) and the polarization reflection layer 350 (shown in FIG. 35) provided on the surface 1116a, the image-forming objective lens 718, and the photodetector 128. Further, an apodizer 450 is interposed between the laser 112 and prism 1116.

The apodizer 450 has a grating formed integral therewith as one piece, as shown in FIGS. 42 and 44. The apodizer 450 is adapted to cause the beam spot of the laser beam Lf, directed from the laser 112 to the optical disk Rm, to have an optimal shape, and to restrain an undesirable signal component contained in the laser beam Lr directed from the disk Rm to the photodetector 128.

The laser beam Lf is radiated from the laser 112 onto the recording surface of the optical disk Rm via the polarization reflection layer 350. The reflectance of that portion of the recording surface onto which the beam is radiated locally varies in accordance with whether or not data is stored therein. The laser beam Lr reflected from the disk Rm is guided to the photodetector 128 through the polarization wedge prism 1116.

Then, the laser beam Lr is supplied to a signal processing circuit (not shown), where it is reproduced as data stored in the disk Rm. Further, a lens coil (not shown) is energized to appropriately control the distance between the image-forming objective lens 718 and the disk Rm, and their positions.

FIG. 46 shows a modification of the light intensity-changing element of FIG. 32.

As is shown in FIG. 46, the light intensity-changing element 460 is divided by first through fourth border lines 460a to 460d substantially parallel with one another, into three surface portions $460_{e1}$, $460_{e2}$ and $460_{e3}$ and two intensity-changing portions $460_{f1}$ and $460_{f2}$ each formed between each adjacent two of the surface portions $460_{e1}$ and $460_{e3}$.

The portion $460_{e2}$ located at the center of the element 460 is perpendicular to the line of a direction in which data items or pits (not shown) are aligned in the optical disk Rm of FIG. 2 or 22. That is, it is perpendicular to the tangential line of each track.

The surface portions $460_{e1}$ to $460_{e3}$ are formed such that laser beam components having passed therethrough can have substantially the same phase. On the other hand, the intensity-changing portions $460_{f1}$ and $460_{f2}$ are formed such that laser beam components having passed therethrough can have substantially the same phase, and can be locally changed the refractive index by ion substitution.

Accordingly, the beam spot of the laser beam having passed through the light intensity-changing element 460 has a shape obtained by cutting both side portions from a circular beam spot, and is in a state where the intensity of the sidelobe occurring in the vicinity of the central spot is greatly reduced. Thus, the width (size) of the beam spot can be adjusted to a value at which each pit formed in tracks can be scanned accurately without reducing the peak level of the beam spot intensity.

Figure 47:
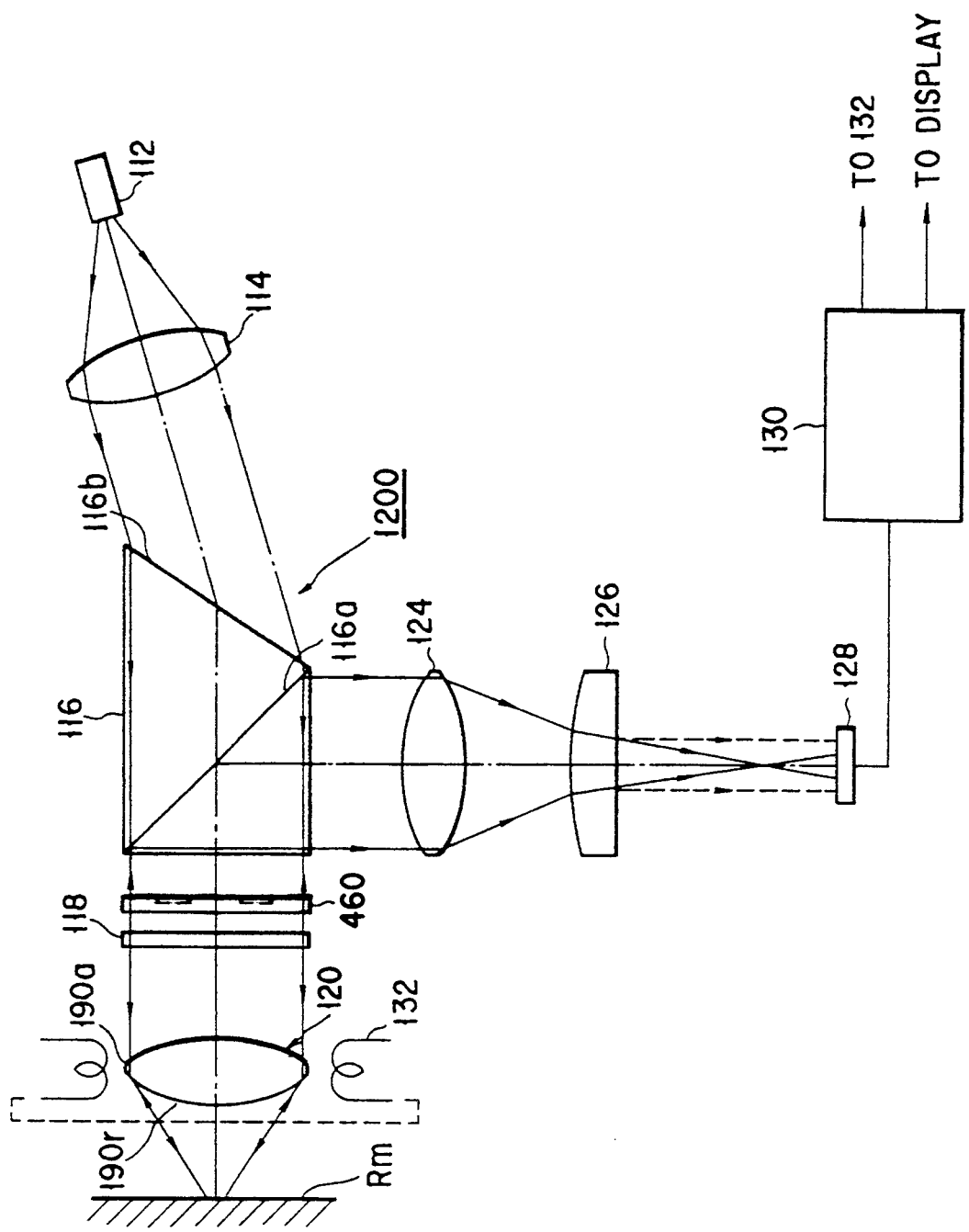
FIG. 47 shows an optical head device suitable for the light intensity-changing elements shown in FIG. 46.

FIG. 47 shows an another embodiment of the optical head in which the optical intensity-changing plate 460 shown in FIG. 46. Like the above-explained embodiments, a like element is denoted by a like reference numeral, and a detailed explanation thereon is omitted.

An optical head device 1200 includes the semiconductor laser 112 for generating a laser beam Lf with an elliptical beam spot So toward the optical disk Rm, and the polarization splitter 116 for directing the laser beam Lf toward the disk Rm, and splitting a laser beam Lr reflected by the disk Rm, from the beam Lf. The collimate lens 114 for converting the laser beam Lf to a parallel beam is interposed between the laser 112 and polarization beam splitter 116. An objective lens 120 is interposed between the splitter 116 and disk Rm.

In a direction in which the reflected laser beam Lr split by the polarization beam splitter 116 passes, the photodetector 128 for converting the reflected laser beam Lr to an electrical signal is located. The focus lens 124 and cylindrical lens 126 are located in the order between the splitter 116 and detector 128. The optical intensity-changing plate 460 shown in FIG. 46 is interposed between the splitter 116 and objective lens 120 at a portion in the far field (in which Fraunhofer's refraction can occur) of a laser beam having passed through the objective lens 120.

The laser beam Lf generated by the laser 112 is converted to a parallel beam by the collimate lens 114, and corrected by the polarization beam splitter 116 to have a substantially circular beam spot. The beam Lf having passed through the splitter 116 and the plate 460 enters into the objective lens 120, where it is converged and radiated onto the recording surface of the optical disk Rm.

The laser beam radiated onto the recording surface is reflected therefrom. The reflectance of that portion of the recording surface onto which the beam is radiated locally varies in accordance with whether or not data is stored therein. The reflected laser beam Lr again passes through the objective lens 120 and the plate 460, and returns to the polarization beam splitter 116, where it is reflected toward the cylindrical lens 126, and photodetector 128.

In the plate 460, the beam spot size of the laser beam Lr is made smaller than a value limited by the refractive index of the objective lens 120.

Specifically, when the reflected laser beam Lr has entered the optical intensity-changing plate 460 from its lower side 460r to the upper side 460r in the Z direction, the plate 460 splits the beam Lr into two wavefronts having characteristics corresponding to the optical amount-changing region $460_{f1}$ and $460_{f2}$ and peripheral region $460_{e2}$, respectively. That is, the beam Lr is split into first and third laser beam components L1 and L3 having passed through the light intensity-changing region $460_{f1}$ and $460_{f2}$ and having its intensity reduced, and a second laser beam component L2 having passed through the peripheral region $460_{e2}$. Thus, by virtue of the super resolution effect on the first and second laser beam components L1, L2 and L3 having passed through the light intensity-changing plate 460, the intensity of a higher-order beam component of the laser beam (L1+L2+L3=Lr) is emphasized, so that the beam Lr can have a beam spot with a substantially effective energy distribution, which is smaller than a beam spot obtained by the conventional device.

The laser beam Lr is transmitted from the photodetector 128 to the signal processing circuit 130, where it is reproduced as data stored in the optical disk Rm, as in the optical head devices shown in FIGS. 2 and 20. Further, the lens coil 132 is energized to appropriately control the distance between the objective lens 120 and optical disk Rm and positions thereof.

FIG. 48 shows a modification of the light intensity-changing element shown in FIGS. 32 and 46.

As is shown in FIG. 48, an apodizer 480 has one surface provided with a plurality of light intensity-changing portions 480b and surface portions 480c, which are defined by border lines 480 and extend in parallel with one another. Occurrence of undesirable crosstalk from pits (data items) formed in tracks adjacent to the target track can be prevented by aligning the direction in which the surface and intensity-changing portions 440b and 440c extend, with the direction in which data items (pits) are arranged in the optical disk Rm.

A grating 484 similar to the grating 422 of FIG. 42 is formed in the other surface of the light intensity-changing element 480. The grating 484 differs from the grating 422 in that it has concave portions 484b and surface portions 484c defined by border lines 484a and extending at an angle to the Y-direction.

The light intensity-changing element 480 can restrain an undesirable signal component which may occur at the time of reproducing data from the optical disk Rm. For example, it can reduce the rate of crosstalk occurring from tracks adjacent to the target track, or can prevent the amount of light reflected from the target track from being increased by the sidelobes S1 and S2.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An optical system comprising:
    means for uniformly passing a light beam therethrough; and
    phase-changing means formed on part of the passing means and having a thickness differing from that of the passing means, for changing the phase of that part of the light beam which passes therethrough;
    wherein the phase-changing means includes means for changing the phase of the part of the light beam passing therethrough to deviate by $\pi+2n\pi$ measured in radians from the phase of the other part of the light beam passing through the remaining part of the passing means.

2. The system according to claim 1, wherein the phase-changing means is formed such that the part of the light beam having passed therethrough can have substantially the same intensity as the other part of the light beam having passed through the remaining part of the passing means.

3. The system according to claim 1, wherein the phase-changing means includes at least three portions such that the light beam passing through the passing means can be split into at least three beam components, and each adjacent pair of the beam components can have phases differing from each other.

4. The system according to claim 3, wherein the phase-changing means is formed such that beam components having passed through at least two portions of the passing means have substantially the same intensity.

5. The system according to claim 4, wherein the phase-changing means includes a region defined by at least two linear border lines.

6. The system according to claim 5, wherein the linear border lines are not parallel with each other.

7. The system according to claim 4, wherein the phase-changing means is shaped substantially elliptical so as to change the shape of the cross section of a beam component passing therethrough.

8. The system according to claim 3, wherein the passing means has a curvature.

9. The system according to claim 8, wherein the phase-changing means is formed such that the part of the light beam having passed therethrough can have substantially the same intensity as the other part of the light beam having passed through the remaining part of the passing means.

10. The system according to claim 3, wherein the passing means has concave and same surface portions arranged in parallel with one another.

11. The system according to claim 10, wherein the phase-changing means is formed such that the part of the light beam having passed therethrough can have substantially the same intensity as the other part of the light beam having passed through the remaining part of the passing means.

12. The system according to claim 1, wherein the phase-changing means is formed on a plane plate.

13. The system according to claim 1, wherein the phase-changing means is formed on a surface of a convex lens.

14. An optical system comprising:
   means for uniformly passing a light beam therethrough; and
   phase-changing means formed on part of the passing means and having a reflectance differing from that of the passing means, for changing the phase of that part of the light beam which passes therethrough;
   wherein the phase-changing means changes the reflectance by absorbing the part of the light beam to be reflected therefrom.

15. The system according to claim 14, wherein the phase-changing means is formed such that the part of the light beam having been reflected therefrom can have substantially the same intensity as the other part of the light beam having passed through the remaining part of the passing means.

16. The system according to claim 15, wherein the phase-changing means includes into at least three portions such that the light beam passing through the passing means is split into at least three beam components, and each adjacent pair of the at least three beam components have phases differing from each other.

17. An image-forming apparatus comprising:
   means for generating a light beam;
   means for deflecting the light beam toward an image bearing member generated from the generating means; and
   means for changing characteristics of the wavefront of part of the light beam, so as to split the wavefront of the light beam, and to change the beam spot size of the light beam on the image bearing member by deviating the phases of light beam components.

18. The apparatus according to claim 17, wherein the changing means is formed such that the light beam components have substantially the same intensity.

19. The apparatus according to claim 18, wherein the changing means includes means for changing the phase of the wave front of the light beam to deviate by $\pi+2n\pi$ each other.

20. The apparatus according to claim 18, wherein the changing means is made of a material which can reflect the light beam thereon, and has regions of different reflectances, a light beam component having passed through one of the regions having substantially the same intensity as a light beam having passed through the other region.

21. An optical system comprising:
   means for uniformly passing a light beam therethrough; and
   phase-changing means formed on part of the passing means and having a refractive index differing from that of the passing means, for changing the phase of that part of the light beam which passes therethrough;
   wherein the phase-changing means includes means for changing the phase of the part of the light beam passing therethrough to deviate by $\pi+2n\pi$ measured in radians from the phase of the other part of the light beam passing through the remaining part of the passing means.

22. The system according to claim 21, wherein the phase-changing means is formed such that the part of the light beam having passed therethrough can have substantially the same intensity as the other part of the light beam having passed through the remaining part of the passing means.

23. The system according to claim 21, wherein the phase-changing means includes at least three portions such that the light beam passing through the passing means is split into at least three beam components, and each adjacent pair of the at least three beam components have phases differing from each other.

24. The system according to claim 23, wherein the phase-changing means is formed such that beam components having passed through at least two portions of the passing means have substantially the same intensity.

25. The system according to claim 24, wherein the phase-changing means includes a region defined by at least two linear border lines.

26. The system according to claim 25, wherein the linear border lines are not parallel with each other.

27. The system according to claim 24, wherein the phase-changing means is shaped substantially elliptical so as to change the shape of the cross section of a beam component passing therethrough.

28. The system according to claim 23, wherein the passing means has a curvature.

29. The system according to claim 28, wherein the phase-changing means is formed such that the part of the light beam having passed therethrough can have substantially the same intensity as the other part of the light beam having passed through the remaining part of the passing means.

30. The system according to claim 23, wherein the passing means has concave and same surface portions arranged in parallel with one another.

31. The system according to claim 30, wherein the phase-changing means is formed such that the part of the light beam having passed therethrough can have substantially the same intensity as the other part of the light beam having passed through the remaining part of the passing means.

* * * * *